United States Patent [19]
Woodward

[11] 3,835,130
[45] Sept. 10, 1974

[54] 2-THIA-CEPHAM AND CEPHEM-4-CARBOXYLIC ACIDS

[75] Inventor: Robert Burns Woodward, Cambridge, Mass.

[73] Assignee: Ciba-Geigy Corporation, Ardsley, N.Y.

[22] Filed: Oct. 29, 1971

[21] Appl. No.: 193,993

[30] Foreign Application Priority Data
Nov. 3, 1970   Switzerland................ 16231/70

[52] U.S. Cl. ............................. 260/243 C, 424/246
[51] Int. Cl. .............................. C07d 99/24
[58] Field of Search .................. 260/243 C

*Primary Examiner*—Donald G. Daus
*Assistant Examiner*—Jose Tovar
*Attorney, Agent, or Firm*—Joseph G. Kolodny

[57] ABSTRACT

The invention concerns 7-amino-2-thiacepham-4-carboxylic acid and 7-amino-2-thiaceph-3-em-4-carboxylic acid compounds and their N-acyl derivatives. These compounds, particularly the latter ones have antibacterial properties. The invention also concerns process for the manufacture of such compounds and intermediates and starting materials useful in such process.

4 Claims, No Drawings

2-THIA-CEPHAM AND CEPHEM-4-CARBOXYLIC ACIDS

The present invention provides 2-thiacepham-4-carboxylic acid and 2-thiaceph-3-em-4-carboxylic acid compounds of the formula (I)
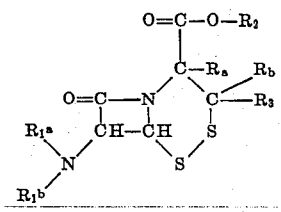

in which $R_1^a$ represents hydrogen or an amino protective group $R_1^A$, and $R_1^b$ represents hydrogen or an acyl residue Ac or $R_1^a + R_1^b$ form a bivalent amino protective group; $R_2$ represents hydrogen or a residue $R_2^A$ which, together with the —C(=O)—O—grouping, forms a protected carboxyl group; $R_3$ represents hydrogen or an organic residue linked through a carbon atom, and each of the groups $R_a$ and $R_b$ stands for hydrogen or $R_a + R_b$ represent a covalent carbon-carbon bond, as well as their S-oxides, or salts of such compounds with salt-forming groups.

An amino protective group $R_1^A$ is a group replaceable by hydrogen, in the first place an acyl group Ac, or a triarylmethyl, especially the trityl group, or an organic silyl group or it may be an organic stannyl group. A group Ac is in the first place the acyl residue of an organic carboxylic or sulphonic acid, especially the acyl residue of a possibly substituted aliphatic, cycloaliphatic, cycloaliphatic-aliphatic, aromatic, araliphatic, heterocyclic or heterocyclic-aliphatic carboxylic acid (including formic acid) or it may be the acyl residue of a carbonic acid semiderivative.

A bivalent amino protective group formed by the residues $R_1^a + R_1^b$ is more especially the bivalent acyl residue of an organic dicarboxylic acid, in the first place the diacyl residue of an aliphatic or aromatic dicarboxylic acid, or the acyl residue of an α-aminoacetic acid which is preferably substituted in the α-position, for example by an aromatic or heterocyclic residue, in which the amino group is linked with the nitrogen atom through a methylene residue which is preferably substituted and contains, for example lower alkyl, such as two methyl groups.

A further bivalent amino protective group represented by the residues $R_1^a + R_1^b$ is, for example, an organic ylidene residue, especially a possibly substituted ylidene-hydrocarbon residue which is easy to eliminate under hydrolytic conditions, preferably an aliphatic, cycloaliphatic, cycloaliphatic-aliphatic or araliphatic residue, in the first place a mono- or disubstituted methylene residue in which the substituents represent possibly substituted hydrocarbon residues, especially mono- or divalent aliphatic, or possibly also aromatic hydrocarbon residues, for example a lower alkylmethylene or di-lower alkylmethylene or in the first place the 1-isobutylidene or isopropylidene residue.

A protected carboxyl group of the formula —C(=O)—O—$R_2^A$ is in the first place an esterified carboxyl group but it may also be a conventionally mixed anhydride group.

The group $R_2^A$ may represent an organic residue which, together with the —C(=O)—O—grouping, forms a preferably easily eliminable esterified carboxyl group; such residues are, for example, aliphatic, cycloaliphatic, cycloaliphatic-aliphatic, aromatic or araliphatic residues, especially possibly substituted hydrocarbon residues of this kind, as well as heterocyclic or heterocyclic-aliphatic residues.

A residue $R_2^A$ which, together with the —C(=O)—O—grouping, forms a preferably mixed anhydride group is more especially the acyl residue of an organic such as an aliphatic, cycloaliphatic, cycloaliphatic-aliphatic, aromatic or araliphatic carboxylic acid or of a carbonic acid semiderivative, such as a carbonic acid semiester.

An organic residue $R_3$ is, for example, an aliphatic, cycloaliphatic, cycloaliphatic-aliphatic, aromatic or araliphatic residue linked through a carbon atom, especially a corresponding, optionally substituted hydrocarbon residue of this kind, or it may be a heterocyclic or heterocyclic-aliphatic residue linked through a carbon atom.

The general definitions used above and in the following description have, for example, the following meanings.

An aliphatic residue, including the aliphatic residue of a corresponding organic carboxylic acid, as well as an appropriate ylidene residue, is an optionally substituted mono- or divalent aliphatic hydrocarbon residue, especially a lower alkyl group, or a lower alkenyl or lower alkinyl residue, or it may be a lower alkylidene group which may contain, for example up to 7, preferably up to 4, carbon atoms. Such residues may, if desired, be mono-, di- or polysubstituted by functional groups, for example by free, etherified or esterified hydroxyl or mercapto groups, such as lower alkoxy, lower alkenyloxy, lower aklylenedioxy, possibly substituted phenoxy or phenyl-lower alkoxy, lower alkylthio or possibly substituted phenylthio or phenyl-lower alkyl thio, lower alkoxy-carbonyloxy or lower alkanoyloxy groups, by halogen, or by oxo, nitro, possibly substituted amino groups, for example di-lower alkylamino, lower alkyleneamino, oxa-lower alkylene amino or aza-lower alkyleneamino, furthermore acylamino such as lower alkanoylamino, possibly substituted carbamoylamino, ureidocarbonylamino or guanidinocarbonylamino, azido, acyl such as lower lower alkanoyl or benzoyl, possibly functionally modified carboxyl such carboxyl in salt-form, esterified carboxyl such as lower alkoxycarbonyl, possibly substituted carbamoyl such as N-lower alkyl- or N,N-di-lower alkyl-carbamoyl, also possibly substituted ureidocarbonyl or guanidinocarbonyl, or cyano, possibly functionally modififed sulpho such as sulphamoyl or sulpho in salt-form.

The bivalent aliphatic residue of an aliphatic carboxylic acid is, for example, lower alkylene or lower alkenylene, which, if desired, may be mono-, di- or polysubstituted, for example, like an aliphatic residue mentioned above.

A cycloaliphatic or cycloaliphatic-aliphatic residue, including the cycloaliphatic or cycloaliphatic-aliphatic residue in a corresponding organic carboxylic acid or an appropriate cycloaliphatic or cyclialiphatic-aliphatic ylidene residue is a possibly substituted mono- or divalent cycloaliphatic or cycloaliphatic-aliphatic hydrocarbon residue, for example mono-, bi- or polycyclic cycloalkyl or cycloalkenyl, also cycloalkylidene or cycloalkyl-lower alkyl or -lower alkenyl or cycloalkenyl-lower alkyl or -lower alkenyl; also cycloalkyl-lower alkylidene or cycloalkenyl-lower alkylidene, in which cycloalkyl and cycloalkylidene contain, for example, up to 12, such as 3 to 8, preferably 3 to 6 cyclic carbon atoms, whereas cycloalkenyl contains, for example, up to 12, such as 3 to 8, for example 5 to 8, preferably 5 or 6 cyclic carbon atoms as well as 1 or 2 double bonds, and the aliphatic portion of a cycloaliphatic-aliphatic residue may contain, for example, up to 7, preferably up to 4, carbon atoms. If desired, the above-mentioned cycloaliphatic or cycloaliphatic-aliphatic residues may be mono-, di- or polysubstituted, for example, by possibly substituted aliphatic hydrocarbon residues, such as the above-mentioned possibly substituted lower alkyl groups, or else, for example, like the above-mentioned hydrocarbon residues, by functional groups.

The aromatic residue, including the aromatic residue of a corresponding carboxylic acid, is a possibly substituted aromatic hydrocarbon residue, for example a mono-, bi- or polycyclic aromatic hydrocarbon residue, especially phenyl, or biphenylyl or naphthyl which, if desired, may be mono-, di- or polysubstituted, for example, like the above-mentioned aliphatic and cycloaliphatic hydrocarbon residues.

The divalent aromatic residue of an aromatic carboxylic acid is in the first place 1,2-arylene, especially 1,2-phenylene, which may be mono-, di- or polysubstituted, for example, like the afore-mentioned aliphatic and cycloaliphatic hydrocarbon residues.

The araliphatic residue, including the araliphatic residue in a corresponding carboxylic acid, as well as an araliphatic ylidene residue, is, for example, a possibly substituted araliphatic hydrocarbon residue, such as a possibly substituted aliphatic hydrocarbon residue which contains, for example, up to 3, possibly substituted mono-, bi- or polycyclic aromatic hydrocarbon residue and is in the first place phenyl-lower alkyl or phenyl-lower alkenyl or phenyl-lower alkinyl, or it may represent phenyl-lower alkylidene; such residues contain, for example, 1, 2 or 3 phenyl groups and may be mono-, di- or polysubstituted in the aromatic and/or aliphatic portion, for example, like the above-mentioned aliphatic and cycloaliphatic residues.

Heterocyclic groups, also those in heterocyclic-aliphatic residues, including heterocyclic or heterocyclic-aliphatic groups in corresponding carboxylic acids, represent bicyclic or polycyclic, aza-, thia-, oxa-, thiaza, thiadiaza-, oxaza-, diaza, triaza- or tetrazacyclic residues of aromatic character, as well as appropriate partially or wholly saturated residues. If desired, these heterocyclic residues may be mono-, di- or polysubstituted, for example like the above-mentioned cycloaliliphatic residues. The aliphatic portion in heterocyclic-aliphatic residues has, for example, the meaning indicated for the corresponding cycloaliphatic-aliphatic or araliphatic residues.

The acyl residue of a carbonic acid semiderivative is preferably the acyl residue of a corresponding semiester in which the organic residue of the ester group represents a possibly substituted aliphatic, cycloaliphatic, aromatic or araliphatic hydrocarbon residue or a heterocyclic-aliphatic residue, in the first place the acyl residue of a lower alkyl-semiester of carbonic acid which, if desired, may be substituted, for example in the α- or β-position, or of a carbonic acid lower alkenyl, cycloalkyl, phenyl or phenyl-lower alkyl semiester which may be substituted in the organic residue. Acyl residues of a carbonic acid semiester may also be appropriate residues of lower alkyl-semiesters of carbonic acid in which the lower alkyl portion contains a heterocyclic group, for example one of the above-mentioned heterocyclic groups of aromatic character, in which, if desired, both the lower alkyl residue and the heterocyclic group may be substituted. The acyl residue of a carbonic acid semiderivative may also be a possibly N-substituted carbamoyl group, such as a possibly halogenated N-lower alkyl-carbamoyl group.

A suitable lower alkyl group is, for example, methyl, ethyl, n-propyl, isopropyl, n-butyl, isobutyl, secondary or tertiary butyl, and also n-pentyl, isopentyl, n-hexyl, isohexyl or n-heptyl, while lower alkenyl may be, for example, vinyl, allyl, isopropenyl, 2- or 3-methallyl or 3-butenyl, lower alkinyl, for example propargyl or 2-butinyl, and lower alkylidene, for example isopropylidene or isobutylidene.

Lower alkylene is, for example, 1,2-ethylene, 1,2- or 1,3-propylene or 1,4-butylene, while lower alkenylene is, for example, 1,2-ethenylene or 2-buten-1,4-ylene.

Cycloalkyl is, for example, cyclopropyl, cyclobutyl, cyclopentyl, cyclohexyl or cycloheptyl, or adamantyl, cycloalkenyl, for example cyclopropenyl, 1-, 2- or 3-cyclopentenyl, 1-, 2- or 3-cyclohexenyl, 3-cycloheptenyl or 1,4-cyclohexadienyl, and cycloalkylidene, for example cyclopentylidene or cyclohexylidene. Cycloalkyl-lower alkyl or -lower alkenyl is, for example, cyclopropyl, cyclopentyl, cyclohexyl or cycloheptyl-methyl, -1,1- or -1,2-ethyl, -1,1-, -1,2- or -1,3-propyl, -vinyl or -allyl, while cycloalkenyl-lower alkyl or -lower alkenyl is, for example, 1-, 2- or 3-cyclopentenyl, 1-, 2- or 3-cyclohexenyl or 1-, 2- or 3-cycloheptenyl-methyl, -1,1- or 1,2-ethyl, -1,1-, -1,2- or -1,3-propyl, -vinyl or -allyl. Cycloalkyl-lower alkylidene is, for example, cyclohexylmethylene, and cycloalkenyl-lower alkylidene is, for example, 3-cyclohexenylmethylene.

Naphthyl is 1- or 2-naphthyl, and biphenylyl is, for example, 4-biphenylyl.

Phenyl-lower alkyl or phenyl-lower alkenyl is, for example, benzyl, 1- or 2-phenylethyl, 1-, 2- or 3-phenylpropyl, diphenylmethyl, trityl, 1- or 2-naphthylmethyl, styryl or cinnamyl; phenyl-lower alkylidene is, for example, benzylidene.

Heterocyclic residues are in the first place possibly substituted heterocyclic residues of aromatic character, for example corresponding monocyclic, monoazacyclic, monothiacyclic or monooxacyclic residues such as pyrryl, for example 2-pyrryl or 3-pyrryl, pyridyl, for example 2-, 3- or 4-pyridyl, also pyridinium, thienyl is, for example, 2- or 3-thienyl, or furyl, for example 2-furyl, bicyclic monoazacyclic, monooxacyclic or monothiacyclic residues such as indolyl, for example 2- or 3-indolyl, quinolinyl, for example 2- or 4-quinolinyl, isoquinolinyl, for example 1-isoquinolinyl, benzofuranyl, for example 2- or 3-benzofuranyl, or bensothienyl, for example 2- or 3-benzothienyl, monocyclic diazacyclic, triazacyclic, tetrazacyclic, thiacyclic, thiadiazacyclic or oxacyclic residues such as imidazolyl, for example 2-imidazolyl, pyrimidinyl, for example 2- or 4-pyrimidinyl, triazolyl, for example 1,2,4-triazol-3-yl, tetrazolyl, for example 1- or 5-tetrazolyl, oxazolyl, for example 2-oxazolyl, isoxazolyl, for example 3-isoxazolyl, thiazolyl, for example 2-thiazolyl, isothiazolyl, for example 3-isothiazolyl or 1,2,4- or 1,3,4-thiadiazolyl, for example 1,2,4-thiadiazol-3-yl or 1,3,4-thiadiazol-2-yl, or bicyclic diazacyclic, oxazacyclic or thiazacyclic residues such as benzimidazolyl, for example 2-benzimidazolyl, benzoxazolyl, for example 2-benzoxazoyl or benzthiazolyl, for example 2-benzthiazolyl; suitable partially or wholly saturated residues are, for example tetrahydrothienyl such as 2-tetrahydrothienyl, tetrahydrofuryl such as 2-tetrahydrofuryl, or piperidyl, for example 2- or 4-piperidyl. Heterocyclic-aliphatic residues are heterocyclic groups, especially those mentioned above, containing lower alkyl or lower alkenyl. The above-mentioned heterocyclyl residues may be substituted, for example by possibly substituted aliphatic hydrocarbon residues, especially by lower alkyl such as methyl or by functional groups, for example as indicated above for the aliphatic hydrocarbon residues.

Lower alkoxy is, for example, methoxy, ethoxy, n-propoxy, isopropoxy, n-butoxy, isobutoxy, secondary or tertiary butoxy, n-pentoxy or tertiary pentoxy. These groups may be substituted as, for example, in halogen-lower alkoxy, especially 2-halogen-lower alkoxy, for example 2,2,2-trichloro-, 2-bromo- or 2-iodoethoxy. Lower alkenyloxy is, for example, vinyloxy or allyloxy. Lower alkylenedioxy is, for example, methylenedioxy, ethylenedioxy or isopropylidenedioxy. Cycloalkoxy is, for example, cyclopentyloxy, cyclohexyloxy or adamantyloxy; phenyl-lower alkoxy is, for example, benzyloxy or 1- or 2-phenylethoxy, or heterocyclyloxy or heterocyclyl-lower alkoxy, for example pyridyl-lower alkoxy such as 2-pyridyl-methoxy, furyl-lower alkoxy such as furfuryloxy, or thienyl-lower alkoxy such as 2-thenyloxy.

Lower alkylthio is, for example, methylthio, ethylthio or n-butylthio; lower alkenylthio, for example, allylthio, and phenyl-lower alkylthio is, for example, benzylthio, and mercapto groups etherified by heterocyclyl residues or heterocyclyl-aliphatic residues are especially imidazolylthio, for example 2-imidazolylthio, thiazolylthio, for example 2-thiazolylthio, 1,2,4- or 1,3,4-thiadiazolylthio, for example 1,2,4-thiadiazol-3-ylthio or 1,3,4-thiadiazol-2-ylthio, or tetrazolylthio, for example 1-methyl-5-tetrazolylthio.

Esterified hydroxyl groups are in the first place halogens, for example fluorine, chlorine, bromine or iodine, or lower alkanoyloxy, e.g. acetyloxy or propionyloxy.

Lower alkoxycarbonyl is, for example, methoxycarbonyl, ethoxycarbonyl, n-propoxycarbonyl, isopropoxycarbonyl, tertiary butoxycarbonyl or tertiary pentoxycarbonyl.

N-lower alkyl-carbamoyl or N,N-di-lower alkylcarbamoyl is, for example N-methylcarbamoyl, N-ethylcarbamoyl, N,N-di-methylcarbamoyl or N,N-diethylcarbamoyl; N-lower alkylsulphamoyl, is for example N-methylsulphamoyl or N,N-dimethylsulphamoyl.

A carboxyl or sulpho group present in the form of an alkali metal salt is, for example, a carboxyl or sulpho group present in the form of a sodium or potassium salt.

Lower alkylamino or di-lower alkylamino is, for example, methylamino, ethylamino, dimethylamino or diethylamino, lower alkyleneamino, for example pyrrolidino or piperidino, oxa-lower alkyleneamino, for example morpholino, and aza-lower alkyleneamino, for example piperazinoamino or 4-methylpiperazino. Acylamino is preferably carbamoylamino, lower alkylcarbamoylamino such as methylcarbamoylamino, ureidocarbonylamino, guanidinocarbonylamino, lower alkanoylamino such as acetylamino or propionylamino, possibly also phthalimido, or sulphoamino which may be in the form of a salt, such as an alkali metal salt, for example a sodium salt or an ammonium salt.

Lower alkanoyl is, for example, acetyl or propionyl.

Lower alkenyloxycarbonyl is, for example, vinyloxycarbonyl, and cycloalkoxycarbonyl and phenyl-lower alkoxycarbonyl is, for example, adamantyloxycarbonyl, benzyloxycarbonyl, diphenylmethoxycarbonyl or α-4-biphenylyl-α-methyl-ethoxycarbonyl. Lower alkoxycarbonyl, in which lower alkyl contains, for example, a monocyclic, monoaza-, monooxa- or monothiacyclic group, is, for example, furyl-lower alkoxycarbonyl such as furfuryloxycarbonyl, or thienyl-lower alkoxycarbonyl, for example 2-thenyloxycarbonyl.

An acyl group Ac is more especially an acyl residue of an organic carboxylic acid or of a carbonic acid semiderivative (occurring in nature or accessible by a biological, semisynthetic or fully synthetic process) in a preferably pharmacologically active N-acyl derivative of 6-aminopenicillanic acid or of a 7-amino-cephalosporanic acid compound, or it is an easily eliminable acyl residue, especially of a carbonic acid semiderivative.

An acyl residue Ac present in a pharmacologically active N-acyl derivative of 6-aminopenicillanic acid or of 7-amino-cephalosporanic acid is in the first place a group of the formula (IA) 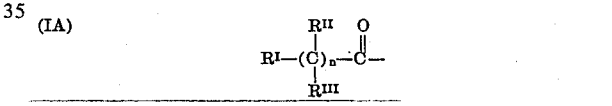

in which $n$ represents 0 and $R^I$ stands for hydrogen or a possibly substituted cycloaliphatic or aromatic hydrocarbon residue or for a possibly substituted heterocyclic residue which is preferably of aromatic character, for a functionally modified, preferably etherified, hydroxyl or mercapto group or for a possibly substituted amino group; or in which $n = 1$, $R^I$ represents hydrogen or a possibly substituted aliphatic, cycloaliphatic, cycloaliphatic-aliphatic, aromatic or araliphatic hydrocarbon residue or a possibly substituted heterocyclic or heterocyclyl-aliphatic residue, in which the heterocyclic residue is preferably of aromatic character and/or contains a quaternary nitrogen atom, a possibly functionally modified, preferably etherified or esterified hydroxyl or mercapto group, a possibly functionally modified carboxyl group, an acyl group, a possibly substituted amino group or an azido group, and each of the residues $R^{II}$ and $R^{III}$ represents hydrogen; or in which $n = 1$, $R^I$ stands for a possibly substituted aliphatic, cycloaliphatic, cycloaliphatic-aliphatic, aromatic or araliphatic hydrocarbon residue or a possibly substituted heterocyclic or heterocyclyl-aliphatic residue in which the heterocyclic residue preferably has aromatic character, $R^{II}$ represents a possibly functionally modified, preferably etherified hydroxyl or mercapto group, a possibly substituted amino group, a possibly functionally modified carboxyl or sulpho group, an azido group or a halogen atom, and $R^{III}$ stands for hydrogen; or in which $n = 1$, each of the residues $R^I$ and $R^{II}$ represents a functionally modified, preferably etherified or esterified hydroxyl group or a possibly functionally modified carboxyl group, and $R^{III}$ stands for hydrogen; or in which $n = 1$, $R^I$ represents hydrogen or a possibly substituted aliphatic, cycloaliphatic, cycloaliphatic-aliphatic, aromatic or araliphatic hydrocarbon residue and $R^{II} + R^{III}$ represent a possibly substituted aliphatic, cycloaliphatic, cycloaliphatic-aliphatic or araliphatic hydrocarbon residue linked with the carbon atom through a double bond; or in which $n = 1$ and $R^I$ represents a possibly substituted aliphatic, cycloaliphatic, cyclcoaliphatic-aliphatic, aromatic or araliphatic hydrocarbon residue or a possibly substituted heterocyclic or heterocyclyl-aliphatic residue in which heterocyclic residues are preferably of aromatic character, $R^{II}$ represents a possibly substituted aliphatic, cycloaliphatic, cycloaliphatic-aliphatic, aromatic or araliphatic hydrocarbon residue and $R^{III}$ represents hydrogen or a possibly substituted aliphatic, cycloaliphatic, cycloaliphatic-aliphatic, aromatic or araliphatic hydrocarbon residue.

In the above-mentioned acyl groups of the formula IA $n$ is, for example, O and $R^I$ stands for hydrogen or for a cycloalkyl group containing 5 to 7 cyclic carbon atoms which may be substituted, preferably in the 1-position by an amino group or by a sulphoamino group which may be present in the form of a salt, for example an alkali metal salt, or for a phenyl, naphthyl or tetrahydronaphthyl group which may be substituted, preferably by hydroxyl, lower alkoxy, for example methoxy and/or halogen, for example chlorine, a heterocyclic group which may be substituted, for example, by lower alkyl, for example methyl and/or phenyl, which themselves may carry substituents such as a halogen, for example chlorine, such as a 4-isoxazolyl group or an N-substituted amino group which may be substituted by a lower alkyl residue which may be substituted, for example, by a halogen such as chlorine; or in which $n = 1$, $R^I$ is a lower alkyl group which may contain a phenyloxy, amino and/or carboxyl group which is possibly substituted, preferably by a halogen such as chlorine; the phenyloxy, amino and/or carboxyl group may be substituted inter alia by hydroxyl and/or halogen, for example chlorine; it may also be a lower alkenyl group, a possibly substituted phenyl group containing hydroxyl, halogen, for example chlorine and/or a possibly substituted phenyloxy; a pyridyl, pyridinium, thienyl, 1-imidazolyl or 1-tetrazolyl group which may be substituted, for example, by amino or aminomethyl, a possibly substituted lower alkoxy group, a phenyloxy group which may be substituted, for example, by hydroxyl and/or halogen such as chlorine, a lower alkylthio or lower alkenylthio group, a phenylthio, 2-imidazolylthio, 1,2,4-triazol-3-ylthio, 1,3,4-triazol-2-ylthio, 1,2,4-thiadiazol-3-ylthio group which may be substituted, for example, by a lower alkyl such as methyl, being inter alia a 5-methyl-1,2,4-thiadiazol-3-ylthio, 1,3,4-thiadiazol-2-ylthio such as 5-methyl-1,3,4-thiadiazol-2-ylthio, or 5-tetrazolylthio such as 1-methyl-5-tetrazolylthio group, a halogen, especially chlorine or bromine atom, a possibly functionally modified carboxyl group such as lower alkoxycarbonyl, cyano or a carbamoyl group which may be N-substituted, for example by phenyl, a possibly substituted lower alkanoyl or benzoyl group, or an azido group, and $R^{II}$ and $R^{III}$ stand for hydrogen; or in which $n = 1$, $R^I$ stands for a phenyl or thienyl group which may be substituted, for example by hydroxyl and/or halogen, for example chlorine; it may also be a 1,4-cyclohexadienyl group, $R^{II}$ represents a possibly substituted amino group, for example a possibly substituted carbamoylamino group such as guanidinocarbonylamino, or a sulphamino group which may be present in the form of a salt, for example an alkali metal salt, an azido group, a carboxyl group which may, if desired, be in the form of a salt, for example an alkali metal salt or in esterified form, for example as a lower alkoxycarbonyl group, a cyano group, a sulpho group, a possibly substituted lower alkoxy or phenyloxy group or represents a halogen, for example chlorine or bromine atom and $R^{III}$ stands for hydrogen; or in which $n = 1$, $R^I$ and $R^{II}$ each represents a halogen, for example bromine, or lower alkoxycarbonyl, for example methoxycarbonyl, and $R^{III}$ stands for hydrogen; or in which $n = 1$ and each of the groups $R^I$, $R^{II}$ and $R^{III}$ stands for a lower alkyl group, for example methyl.

Such acyl residues Ac are, for example, formyl, cyclopentylcarbonyl, α-aminocyclopentylcarbonyl or α-aminocyclohexylcarbonyl (with a possibly substituted amino group, e.g. a sulphoamino group possibly present in form of a salt, or an acyl residue which is preferably easily eliminable, for example by treatment with an acid reagent such as trifluoroacetic acid, preferably a suitable acyl residue of a carbonic acid semiester such as tertiary butoxycarbonyl, or of a carbonic acid semiamide such as carbamoyl or N-methylcarbamoyl, or an amino group substituted by a trityl residue), 2,6-dimethoxybenzoyl, tetrahydronaphthoyl, 2-methoxynaphthoyl, 2-ethoxynaphthoyl, benzoyloxycarbonyl, hexahydrobenzyloxycarbonyl, 5-methyl-3-phenyl-4-isoxazolylcarbonyl, 3-(2-chlorophenyl)-5-methyl-4-isoxazolylcarbonyl, 3-(2,6-dichlorophenyl)-5-methyl-4-isoxazolylcarbonyl, 2-chloroethylaminocarbonyl, acetyl, propionyl, butyryl, hexanoyl, octanoyl, acrylyl, crotonyl, 3-butenoyl, 2-pentenoyl, methoxyacetyl, methylthioacetyl, butylthioacetyl, allylthioacetyl, chloroacetyl, bromoacetyl, dibromoacetyl, 3-chloropropionyl, 3-bromopropionyl, aminoacetyl or 5-amino-5-carboxylvaleryl (containing an amino group which may be substituted, for example, as indicated above and/or a possibly functionally modified carboxyl group which may be present in form of a salt, such as a sodium salt, or in form of an ester such as a lower alkyl, for example methyl or ethyl ester), azidoacetyl, carboxyacetyl, methoxycarbonylacetyl, ethoxycarbonylacetyl, bismethoxycarbonylacetyl, N-phenylcarbamoylacetyl, cyanoacetyl, α-cyanopropionyl, 2-cyano-3,3-dimethylacrylyl, phenylacetyl, α-bromophenylacetyl, α-azido-phenylacetyl, 3-chlorophenylacetyl, 4-aminomethylphenylacetyl, containing an amino group which may be substituted, for example as indicated above), phenylacylcarbonyl, phenyloxyacetyl, 4-trifluoromethyl-phenyloxyacetyl, benzyloxyacetyl, phenylthioacetyl, bromophenylthioacetyl, 2-phenyloxypropionyl, α-phenyloxyphenylacetyl, α-methoxyphenylacetyl, α-ethoxyphenylacetyl, α-methoxy-3,4-dichlorophenylacetyl, α-cyanophenylacetyl, especially phenylglycyl, 4-hydroxyphenylglycyl, 3-chloro-4-hydroxyphenylglycyl or 3,5-dichloro-4-hydroxyphenylglycyl (the amino group in these residues may be substituted, for example as indicated above), furthermore benzylthioacetyl, benzylthiopropionyl, α-carboxyphenylacetyl (in which the carboxyl group may be functionally modified, for example as indicated above), 3-phenylpropionyl, 3-(3-cyanophenyl)-propionyl, 4-(3-methoxyphenyl)-butyryl, 2-pyridylacetyl, 4-amino-pyridinium-acetyl in which the amino group may be substituted, for example as indicated above), 2-thienylacetyl, 2-tetrahydrothienyl-acetyl, α-carboxy-2-thienylacetyl or α-carboxy-3-thienyl-acetyl (in which the carboxyl group may be functionally modified, for example as indicated above), α-cyano-2-thienylacetyl, α-amino-2-thienylacetyl or α-amino-3-thienylacetyl (in which the amino group may be substituted, for example as indicated above), α-sulpho-phenylacetyl (in which the sulpho group may be functionally modified, for example like a carboxyl group), 3-thienylacetyl, 2-furylacetyl, 1-imidazolylacetyl, 1-tetrazolylacetyl, 3-methyl-2-imidazolyl-thioacetyl, 1,2,4-triazol-3-ylthioacetyl, 1,3,4-triazol-2-ylthioacetyl, 5-methyl-1,2,4-thiadiazol-3-ylthioacetyl, 5-methyl-1,3,4-thiadiazol-2-ylthioacetyl or 1-methyl-5-tetrazolylthioacetyl.

A readily eliminable acyl residue Ac, especialy of a carbonic acid semiester, is in the first place an acyl residue eliminable by treatment with an acid, for example with trifluoroacetic acid, of a carbonic acid semiester such as a lower alkoxycarbonyl residue which is preferably multibranched in α-position, for example tertiary butoxycarbonyl or tertiary pentoxycarbonyl, furthermore preferably polycyclic cycloalkoxycarbonyl, for example adamantyloxycarbonyl, possibly substituted phenyl-lower alkoxycarbonyl, in the first place α-phenyl-lower alkoxycarbonyl which is preferably multibranched in α-position, for example diphenylmethoxycarbonyl or α-4-biphenylyl-α-methyl-ethoxycarbonyl, or furyl-lower alkoxycarbonyl, in the first place α-furyl-lower alkoxycarbonyl, for example furfuryloxycarbonyl.

A divalent acyl group formed by the residues $R_1^A + R_1^b$ is, for example, the acyl residue of a lower alkanedicarboxylic or lower alkenedicarboxylic acid such as succinyl, or of an ortho-aryldicarboxylic acid such as phthaloyl.

Another divalent residue formed by the groups $R_1^A + R_1^b$ is, for example, a 1-oxo-3-aza-1,4-butylene residue which contains, for example, preferably in position 2 a possibly substituted phenyl or thienyl and which may contain in the 4-position one or preferably two lower alkyl groups, being for example the 4,4-dimethyl-2-phenyl-1-oxo-3-aza-1,4-butylene residue.

A group $R_2^A$ may represent, for example, the residue $R_2^a$ which, together with the —C(=O)—O-grouping, forms an esterified carboxyl group which is easy to eliminate in acid conditions, for example by treatment with trifluoroacetic acid or formic acid. Such a residue $R_2^a$ is in the first place a methyl group which may be polysubstituted by possibly substituted hydrocarbon residues or is monosubstituted by a carbocyclic aryl group containing substituents that give off electrons or by a heterocyclic group of aromatic character which contains oxygen or sulphur atoms as cycle members, or in a polycycloaliphatic hydrocarbon residue it may represent a cycle member or in an oxa- or thiacycloaliphatic residue the cycle member representing the α-position to the oxygen or sulphur atom.

Preferred polysubstituted methyl groups $R_2^a$ are, for example, tertiary butyl, tertiary pentyl, benzhydryl, 4,4'-dimethoxy-benzhydryl or 2-(4-biphenylyl)-2-propyl; a methyl group $R_2^a$ containing the above-mentioned substituted aryl group or the heterocyclic group is, for example, 4-methoxybenzyl or 3,4-dimethoxy-benzyl or 2-furyl respectively. A polycycloaliphatic hydrocarbon residue in which the methyl group $R_2^a$ represents a preferably triple-branched cyclic member is, for example, adamantyl such as 1-adamantyl, and an above-mentioned oxa- or thiacycloaliphatic residue $R_2^a$ is 2-tetrahydrofuryl, 2-tetrahydropyranyl or 2,3-dihydro-2-pyranyl or a corresponding sulphur analogue.

The residue $R_2^A$ may also represent a residue $R_2^b$ which, together with the —C(=O)—O-grouping, forms an esterified carboxyl group which can be eliminated hydrolytically, for example under weakly basic or acid conditions. Such a residue $R_2^b$ is preferably a residue which with the —C(=O)—O-grouping forms an activated ester, such as nitrophenyl, for example 4-nitrophenyl or 2,4-dinitrophenyl, nitrophenyl-lower alkyl, for example 4-nitrobenzyl, polyhalogenophenyl, for example 2,4,6-trichlorophenyl or 2,3,4,5,6-pentachlorophenyl, furthermore cyanomethyl as well as acylaminomethyl, for example phthaliminomethyl or succinyliminomethyl, trityl or bis-aryloxy-methyl, for example bis-(4-methoxy-phenyloxy)-methyl.

The group $R_2^A$ may also represent the residue $R_2^c$ which stands for an arylmethyl group in which aryl is preferably a monocyclic, preferably substituted, aromatic hydrocarbon residue. Such a residue forms together with the —C(=O)—O-grouping an esterified carboxyl group which splits off easily on being irradiated, preferably with ultraviolet light, under neutral or acid conditions. The substituent in such an aryl residue is preferably a lower alkoxy group, for example methoxy (which in the preferred phenyl residue is in the first place in position 3, 4 and/or 5) and/or especially nitro (in the preferred phenyl residue preferably in position 2). Such residues $R_2^c$ are in the first place 3- or 4-methoxybenzyl, 3,5-dimethoxybenzyl, 2-nitrobenzyl or 4,5-dimethoxy-2-nitrobenzyl.

The group $R_2^A$ may also represent a residue $R_2^d$ which together with the carboxyl grouping —C(=O)—O- forms an esterified carboxyl group eliminable under physiological conditions, in the first place lower alkanoyloxymethyl, for example acetyloxymethyl or pivaloyloxymethyl.

An acyl residue which together with the —C(=O)—O-grouping forms a mixed anhydride group eliminable under preferably hydrolytic conditions is, for example, the acyl residue of one of the above-mentioned organic carboxylic acids or carbonic acid semiderivatives, such as lower alkanoyl, for example acetyl, or lower alkoxycarbonyl, for example ethoxycarbonyl.

An organic residue $R_3$ is in the first place an aliphatic, cycloaliphatic, cycloaliphatic-aliphatic, aromatic or araliphatic hydrocarbon residue which may contain, for example, the afore-mentioned substituents such as lower alkyl, free, etherified or esterified hydroxyl groups such as lower alkoxy or halogen atoms, trifluoromethyl groups, possibly substituted amino groups or possibly functionally modified carboxyl or sulpho groups, more especially an appropriate lower alkyl, phenyl or phenyl-lower alkyl residue, or a monocyclic azacyclic, oxacyclic or thiacyclic residue which may be substituted for example as indicated above, preferably one of aromatic character such as an appropriate pyridyl, furyl or thienyl residue.

S-Oxides are in the first place S-monoxides, especially the 2-oxides of compounds of the formula I.

Salts are more especially those of compounds of the formula I in which $R_2$ represents hydrogen and in the first place metal or ammonium salts, preferably appropriate, pharmaceutically acceptable, non-toxic salts, such as alkali metal and alkaline earth metal salts, for example sodium, potassium, magnesium or calcium salts, as well as ammonium salts with ammonia or a suitable organic amine, especially an aliphatic, cycloaliphatic, cycloaliphatic-aliphatic or aliphatic primary, secondary or tertiary mono-, di- or polyamine, such as a lower alkylamine, for example triethylamine, hydroxy-lower alkylamine, for example 2-hydroxyethylamine, bis-(2-hydroxyethyl)-amine or tri-(2hydroxyethyl)-amine, a basic aliphatic carboxylic acid ester, for example 4-aminobenzoic acid-2-diethylamino-ethyl ester, an alkyleneamine, for example 1-ethyl-piperidine, a cycloalkylamine, for example bicyclohexylamine, or a benzylamine, for example N,N-dibenzyl-ethylenediamine, furthermore a base of the pyridine type, for example pyridine, collidine or quinoline. Compounds of the formula I, in which for example $R_1{}^a$ and $R_1{}^b$ stand for hydrogen or those which contain in a residue $R_1{}^a$ or $R_1{}^b$ a basic group, can likewise form acid addition salts, for example with inorganic acids, such as hydrochloric, sulphuric or phosphoric acid, or with suitable organic carboxylic or sulphonic acids, for example with trifluoroacetic acid. Compounds of the formula I, in which $R_2$ stands for hydrogen and in which $R_1{}^a$ and $R_1{}^b$ stand for hydrogen or those which contain a basic group in a residue $R_1{}^a$ and $R_1{}^b$ may also be present in form of an inner salt, that is to say in the zwitterionic form.

The compounds of the formula I possess valuable pharmacological properties or may be used as intermediates for the manufacture of pharmaceuticals. Compounds of the formula I, in which $R_1{}^a$ is an acyl residue present in a pharmacologically active N-acyl derivative of 6-amino-penam-3-carboxylic acid or 7-amino-ceph-3-em-4-carboxylic acid compounds and $R_1{}^b$ stands for hydrogen and $R_2$ represents hydrogen or an organic residue $R_2{}^A$ which is easy to eliminate under physiological conditions, and in which $R_3$, $R_a$ and $R_b$ have the meanings indicated above, act against microorganisms, such as Gram-positive bacteria, for example *Staphylococcus aureus* and Gram-negative bacteria, for example *Escherichia coli* and more especially also against penicillin-resistant bacteria when used in a dilution of up to 0.0001 μ/ml. In this connection it should be noted that in contrast to known 7-acylamino-ceph-3-em-4-carboxylic acid compounds which act against microorganisms an isomerisation of the double bond, which with the known compounds in the ceph-3-em series occurs readily and leads to the pharmacologically little active ceph-2-em compounds, cannot occur with compounds of the formula I, in which $R_a + R_b$ form a covalent bond. Accordingly, the new compounds are used correspondingly, for example in the form of antibiotically active medicaments and in doses from about 0.005 g/kg to about 0.05 g/kg.

Compounds of the formula I, in which $R_1{}^a$ and $R_1{}^b$ stand for hydrogen or both together for a bivalent amino protective group and $R_2$ represents hydrogen, or in which $R_1{}^a$ represents hydrogen or an amino protective group $R_1{}^A$ and $R_1{}^b$ stands for hydrogen or $R_1{}^a + R_1{}^b$ represent a bivalent amino protective group and $R_2$ represents an organic residue which, together with the —C(=O)—O-grouping, forms an esterified carboxyl group which preferably is easy to eliminate, and in which $R_3$, $R_a$ and $R_b$ have the meanings indicated above, are valuable intermediates which are simple to convert into the pharmacologically active compounds, for example as described below. Especially valuable are compounds of the formula I, in which $R_1{}^a$ stands for hydrogen or for an acyl residue present in an especially pharmacologically active, such as highly active, N-acyl derivative accessible by fermentative (that is to say naturally occurring) or biologically, semisynthetic or fully synthetic processes of a 6-aminopenicillanic acid or 7-amino-cephalosporanic acid compound or for an easily eliminable acyl residue of a carbonic acid semiderivative, especially of a carbonic acid semiester; $R_1{}^b$ stands for hydrogen; $R_2$ is hydrogen or an organic residue $R_2{}^A$ which together with the —C(=O)—O-grouping forms an esterified carboxyl group which is easy to eliminate with an acid reagent or hydrolytically or under physiological conditions or for an esterified carboxyl group convertible thereinto, being, for example, tertiary butyl, diphenylmethyl, 4,4'-dimethoxy-diphenylmethyl, trityl or bis-(4-methoxy-phenyloxy)-methyl or acetyloxymethyl or pivaloyloxymethyl, and in which $R_3$, $R_a$ and $R_b$ have the meanings indicated above, or S-oxides thereof as well as salts of such compounds with salt-forming groups.

In a compound of the formula I, in which $R_a$ and $R_b$ have the meanings defined above or preferably $R_a + R_b$ represent a covalent carbon-carbon bond, the group $R_1{}^a$ stands in the first place for hydrogen or for an acyl residue present in an N-acyl derivative, which is accessible by fermentation (that is to say naturally occurring) or by synthesis, of a 6-aminopenam-3-carboxylic acid or 7-amino-ceph-3-em-4-carboxylic acid compound such as a possibly substituted phenylacetyl or phenyloxyacetyl residue, or for a possibly substituted lower alkanoyl or lower alkenoyl residue, for example 4-hydroxy-phenylacetyl, hexanoyl, octanoyl, 3-hexenoyl, 5-amino-5-carboxy-valeryl, n-butylthioacetyl or allylthioacetyl and more especially phenylacetyl or phenyloxyacetyl, an acyl residue occurring in highly active N-acyl derivatives of 6-amino-penam-3-carboxylic acid or 7-amino-ceph-3-em-4-carboxylic acid compounds, such as formyl, 2-chloroethylcarbamoyl, cyanoacetyl or 2-thienylacetyl, especially phenylglycyl in which phenyl is phenyl possibly substituted by hydroxyl and/or a halogen, for example chlorine and, for example, phenyl, 3- or 4-hydroxyphenyl, 3-chloro-4-hydroxyphenyl or 3,5-dichloro-4-hydroxyphenyl, and in which the amino group may be substituted and may represent, for example, a sulphoamino group possibly present in form of a salt or an amino group which contains as substituent a possibly substituted carbamoyl such as a possibly substituted ureidocarbonyl group, for example ureidocarbonyl or $N^3$-trichloromethylureidocarbonyl, or a possibly substituted guanidinocarbonyl group, for example guanidinocarbonyl, or an acyl residue which is easy to eliminate, for example by treatment with an acid reagent, such as trifluoroacetic acid, preferably an appropriate acyl residue of a carbonic acid semiester, such as tert.butoxycarbonyl or of a carbonic acid semiamide, such as carbamoyl or N-methylcarbamoyl, and further contains the trityl group which can be eliminated by an acid treatment, or in which the amino group is linked with the nitrogen atom of the 7-amino group through a methylene group which may possibly contain two lower alkyl such as two methyl groups, furthermore thienylglycyl such as 2-thierylglycyl (whose amino group may be substituted, for example as shown above), or 1-amino-cyclohexyl-carbonyl (in which the amino group may be substituted, for example as shown above), furthermore α-carboxy-phenylacetyl or α-carboxy-2-thienylacetyl (in which the carboxyl group may be functionally modified, for example in form of a salt such as the sodium salt, or in form of an ester such as lower alkyl, for example methyl or ethyl, or phenyl-lower alkyl, for example diphenylmethyl ester) or α-sulpho-phenylacetyl (in which the sulpho group may be functionally modified, for example like the carboxyl group), or an acyl residue, which is easy to eliminate under acid conditions, for example by treatment with trifluoroacetic acid, of a carbonic acid semiester, for example lower alkyl ester, such as tertiary butoxycarbonyl, or represents trityl, and $R_1^b$ stands for hydrogen.

In preferred compounds of the formula I $R_2$ represents in the first place hydrogen or a residue $R_2^A$ which together with the —C(=O)—O-grouping forms an esterified carboxyl group which is easy to eliminate by treatment with an acid reagent or, preferably under weakly basic or acid conditions, hydrolytically or under physiological conditions, and such a residue is in the first place a methyl group polysubstituted by possibly substituted hydrocarbon such as lower alkyl residues or by etherified hydroxyl, such as aryloxy groups, especially tertiary butyl or tertiary pentyl, furthermore diphenylmethyl, 4,4'-dimethoxydiphenylmethyl, trityl or bis-(4-methoxy-phenyloxy)-methyl, or lower alkanoyloxymethyl, for example acetyloxymethyl or pivaloyloxymethyl.

A group $R_3$ in a preferred compound of the formula I is more especially hydrogen or a lower alkyl residue which may be substituted by one or several free hydroxyl, lower alkoxy, lower alkanoyloxy, di-lower alkylamino, lower alkylamino, carboxyl, lower alkoxycarbonyl or cyano groups or halogen atoms, furthermore it may be a phenyl or phenyl-lower alkyl residue substituted, for example, by lower alkyl groups or by the afore-mentioned functional groups, or it may be a pyridyl residue.

In the first place this invention relates to compounds of the formula (Ia)

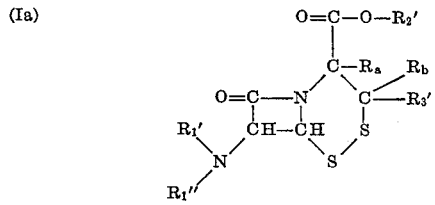

in which $R_a$ and $R_b$ have the meanings defined above and preferably together form a covalent bond, and in which $R_1'$ stands for hydrogen, and $R_1''$- for hydrogen, cyanoacetyl or bromoacetyl, or an acyl group of the formula (IB)

in which Ar represents phenyl, 3- or 4-hydroxyphenyl, 3-chloro-4-hydroxyphenyl, 3,5-dichloro-4-hydroxyphenyl or 2-thienyl, and in which R stands for hydrogen or an optionally protected amino, carboxyl or sulpho group, such as acylamino, for example tertiary butoxycarbonylamino, or 3-guanylureido, or sulphoamino or tritylamino, or an esterified carboxyl group such as diphenylmethoxycarbonyl, or in which $R_1''$ represents the acyl group of the formula IB, in which Ar has the meaning defined above and R represents an amino group which is linked with $R_1'$ which is methylene or isopropylidene, and $R_2'$ stands for hydrogen, tertiary butyl, diphenylmethyl, 4,4'-dimethoxydiphenylmethyl, trityl or bis-(4-methoxy-phenyloxy)-methyl, and $R_3'$ represents hydrogen, lower alkyl, especially methyl, lower alkoxy-lower alkyl, especially methoxymethyl, or lower alkanoyloxy-lower alkyl, especially acetyloxymethyl, and salts of such compounds with salt-forming groups.

The new compounds of the present invention are obtained in a surprising manner when an α-(7-oxo-4-thia-2,6-diaza-6-bicyclo[3.2.0]heptyl)-β-mercapto-α-$R_a$-β-$R_b$-β-$R_3$-propionic acid compound of the formula (II)

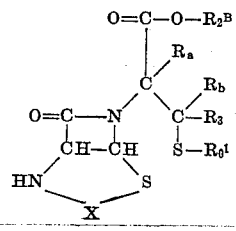

in which x represents a possibly substituted methylene group, $R_o^1$ stands for hydrogen or an organic residue eliminable under the reaction conditions, and $R_2^B$ represents a residue $R_2^A$ or an organic silyl or stannyl residue, or a tautomer or a salt thereof is oxidised and, if desired, in a resulting compound of the formula I, in which $R_1^a + R_1^b$ form an organic ylidene residue this residue is eliminated and/or in a resulting compound if desired the ylidene group possibly substituted by an organic ylidene group is protected and/or, if desired, in a resulting compound a grouping of the formula —C(=O)—O—$R_2^B$ is converted into the free carboxyl group or into a grouping of the formula —C(=O)—O—$R_2^A$ and, if desired, in a resulting compound a free carboxyl group is converted to a protected carboxyl group of the formula —C(=O)—O—$R_2^A$ and/or, if desired, a resulting compound is converted into an S-oxide and/or, if desired, a resulting compound with a salt-forming group is converted into a salt or a resulting salt is converted into the free compound or into another salt and/or, if desired, a resulting isomer mixture is resolved into its component isomers.

In the starting material of formula II a methylene group X is a methylene group which may be unsubstituted or in the first place mono- or disubstituted by mono- or divalent organic residues, especially of aliphatic, cycloaliphatic, cycloaliphatic-aliphatic, aromatic or araliphatic character and in the first place possibly substituted monovalent or divalent aliphatic, cycloaliphatic, cycloaliphatic-aliphatic, aromatic or araliphatic hydrocarbon residues. Divalent hydrocarbon residues are more especially possibly substituted divalent aliphatic hydrocarbon residues, such as lower alkylene and lower alkenylene groups. The group X represents in the first place a methylene group substituted by one or two lower alkyl groups or by a lower alkylene, for example the 1,4-butylene or the 1,5-pentylene group and is in the first place the isopropylidene or the 1-isobutylidene group.

Residues $R_o^1$ eliminable under the reaction conditions are in the first place the triarylmethyl, especially the trityl group which is eliminated in the oxidation with iodine, preferably in the presence of a lower alkanol, or with thiocyanogen, preferably in the presence of acetic acid, or acylaminomethyl groups in which acyl represents the corresponding residue of an organic carboxylic acid, such as lower alkanoyl-aminomethyl and especially the acetylaminomethyl residues which may be substituted, for example, by halogen atoms or nitro groups.

Organic silyl and stannyl groups $R_2^B$ are in the first place silyl and stannyl residues substituted by possibly substituted hydrocarbon residues, preferably of aliphatic or cycloaliphatic, aromatic or araliphatic nature, for example lower alkyl groups or cycloalkyl, phenyl or phenyl-lower alkyl, in the first place a tri-lower alkylsilyl, for example trimethylsilyl, or tri-lower alkylstannyl, for example tri-n-butylstannyl.

Tautomers of starting materials of formula II, in which $R_a + R_b$ represent a carbon-carbon bond, and $R_o^1$ represents hydrogen, are the corresponding thiono compounds. Tautomeric compounds are also those starting materials in which there is no bond between the sulphur atom and the group X, that is to say the sulphur atom of the thiazolidine ring is present in form of the mercapto group and the nitrogen atom is substituted by an organic ylidene residue.

Salts of starting materials of formula II are especially salts on those compounds in which $R_o^1$ stands for hydrogen, with organic bases, such as those mentioned above, being organic bases suitable for salt formation, such as tri-lower alkylamines and in the first place heterocyclic bases of aromatic character, such as pyridine.

Oxidants to be used in the present invention are in the first place those which are suitable for forming disulphide compounds from mercapto compounds and which are used under conditions in which the β-lactam ring is not affected. To these belong in the first place halogens, such as bromine and above all iodine which is preferably used in the presence of an organic solvent, for example a possibly substituted hydrocarbon, such as an aromatic hydrocarbon, for example benzene, an ether such as a cyclic ether, for example tetrahydrofurane ro dioxane, an alcohol such as a lower alkanol, for example methanol or ethanol, or a carboxylic acid such as a lower alkanecarboxylic acid, for example acetic acid, or a mixture of solvents and, if desired, in the presence of water, with cooling (for example at a temperature ranging to about −30°C), at room temperature or with slight warming (for example at a temperature ranging to about +50°C) and, if necessary, in an inert gas atmosphere, such as under nitrogen.

Further suitable oxidants for the oxidation of starting materials are oxidising heavy-metal carboxylates, preferably lead-IV-compounds, such as lead-IV-alkanoates, especially lower alkanoates and in the first place lead tetraacetate, also lead tetrapropionate or lead tetrastearate and possibly substituted lead tetrabenzoates, for example lead tetrabenzoate or lead tetra-3-bromobenzoate, also thallium-III-carboxylates, for example thallium-III-acetate, or mercury-II-carboxylates, such as mercury-II-acetate; if desired, these oxidants may be formed in situ, for example by reacting lead dioxide or mercury-II-oxide with an organic carboxylic acid, such as acetic acid.

If desired, the above heavy-metal carboxylates, especially the appropriate lead-IV-compounds, are used in the presence of a source of light, preferably using ultraviolet or long-wave, such as visible light, if desired with addition of a suitable sensitiser. The ultraviolet light used has preferably a main wave length range of over 280 mµ, in the first place from about 300 mµ to about 350 mµ; this range can be achieved by suitably filtering the ultraviolet light through a suitable filter, for example a pyrex filter, or with suitable solutions, such as salt solutions, or other liquids that absorb light of a shorter wavelength, such as benzene or toluene. The ultraviolet light is preferably produced with the aid of a high pressure mercury vapour lamp.

The oxidation with a heavy-metal carboxylate oxidant is usually performed in the presence of an appropriate diluent, such as benzene, acetonitrile or acetic acid, if necessary with cooling or warming and/or in an inert gas atmosphere.

Another oxidant suitable for use in the above reaction is oxygen (for example as pure oxygen or in the form of air) in the presence of a salt of a heavy metal, for example copper-II or iron-III, used as catalyst, such as iron-III-chloride or iron-III-sulphate, and preferably in the presence of a solvent, such as acetic acid, a hypohalite compound, especially an alkali metal hypohalite, for example sodium hypoiodite, or of an organic hypohalite, such as a lower alkylhypohalite, for example tertiary butylhypochlorite, oxidising iron-III-salts and -complexes, such as iron-III-chloride, preferably in the presence of an organic solvent, such an ether, for example diethyl ether, of a lower alkanecarboxylic acid, for example acetic acid, or of a lower alkanol, for example ethanol, and, if required, of water, or an alkali metal-iron-III-cyanate, for example potassium ferricyanide, 1,2-diiodoethane in the presence of an organic solvent, for example acetone, tetrahydrofurane or ethanol, or thiocyanogen in the presence of a suitable organic solvent, for example acetic acid.

Those new compounds of formula I, in which $R_a + R_b$ stand for a covalent bond are also formed in a surprising manner when an S-monoxide of a bis-trans-trans-disulphide compound of the formula

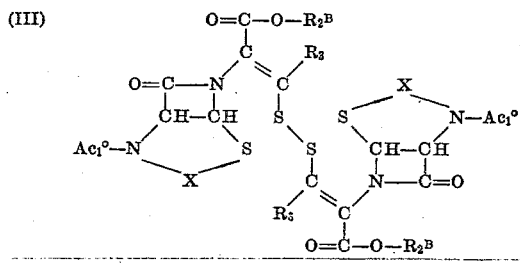

(III)

in which $AC_1^o$ represents an acyl residue eliminable under the reaction conditions, is treated with an acid reagent and, if desired, the above-mentioned additional steps are carried out.

The stereoconfiguration of the disulphide starting materials of formula III is trans-trans, that is to say that the sulphur atoms of the disulphide bridge are in the transposition to the esterified carboxyl groups. The sulphoxide grouping is very probably part of one of the two thiazolidine rings and not of the disulphide bridge, that is to say one of the cyclic sulphur atoms probably carries the oxygen function and not one of the disulphide sulphur atoms.

An acyl residue $Ac_1^o$ eliminable under the acidic conditions of the present process is in the first place an acyl residue, eliminable under such conditions, of a carbonic acid semiderivative, especially semiester, such as a lower alkoxycarbonyl or cycloalkoxycarbonyl residue which is multibranched and/or substituted in the $\alpha$-position, being especially the tertiary butoxycarbonyl, the tertiary pentoxycarbonyl, adamantyloxycarbonyl, benzhydryloxycarbonyl, 2-biphenylyl-2-propoxycarbonyl or furfuryloxycarbonyl residue.

The reaction according to the invention is performed by treatment with a strong oxygen-containing organic carboxylic or sulphonic acid or a mixture of such acids, especially with a strong, possibly substituted aliphatic carboxylic acid, for example lower alkanecarboxylic acid which may be substituted, preferably in the $\alpha$-position, by halogen such as fluorine atoms, in the first place with trifluoroacetic acid, or with formic acid or with a strong aliphatic or aromatic sulphonic acid, such as a lower alkanesulphonic acid, for example methanesulphonic acid, or a benzenesulphonic acid which may be substituted, for example, by lower alkyl or nitrogroups or halogen atoms, for example para-toluenesulphonic acid, or with a mixture of acids, for example acetic plus para-toluenesulphonic acid.

The reaction is carried out under mild temperature conditions, for example at room temperature, but preferably with cooling (for example down to $-20°C$) or at a slightly raised temperature (for example up to $50°C$), the temperature range to be chosen depending above all on the choice of acid reagent and the stability of the starting material and of the reaction product. Usually, a liquid acid reagent, such as trifluoroacetic acid, serves simultaneously as solvent or diluent; alternatively, it is also possible to work in the presence of an inert solvent, such as a possibly halogenated hydrocarbon, for example hexane, methylenechloride, cyclohexane or benzene, furthermore in an inert gas, for example in a nitrogen atmosphere.

In a compound of formula I obtainable by the present process an organic ylidene group formed by the residues $R_1^a$ and $R_1^b$, especially a lower alkylidene such as the isopropylidene or 1-isobutylidene group can be eliminated hydrolytically, for example by treatment with water or an aqueous acid, if desired during the conversion of an acid addition salt, accessible by the present process, of an ylidene compound (as it may be formed, for example, during the oxidation with iodine) into the free compound, for example on treatment with a suitable aqueous basic reagent, such as an aqueous alkali metal hydrogencarbonate, for example sodium hydrogencarbonate.

In a compound of formula I obtainable by the present process in which $R_1^a$ and $R_1^b$ stand for hydrogen or $R_1^a + R_1^b$ represent an organic ylidene group, the amino group of the formula $-N(R_1^a)-R_1^b$ can be protected in the usual manner, for example acylated, using one of the conventional acylating methods, for example treatment with a carboxylic acid or a reactive acid derivative thereof, such as a halide, for example a fluoride or chloride, or an anhydriede (including the inner anhydrides of carboxylic acid, that is to say ketenes, or of carbamic or thiocarbamic acids, that is to say isocyanates or isothiocyanates, or mixed anhydrides, such as those which can be formed, for example, with chloroformic acid lower alkyl such as ethyl esters, or trichloroacetylchloride) or activated esters, or with a substituted formimino derivative, usch as a substituted N,N-dimethylchloroformimino derivative, or an N-substituted N,N-diacylamine, such as an N,N-diacylated aniline; when necessary, the acylation is carried out in the presence of an appropriate condensing agent, when an acid is used, for example, in the presence of carbodiimide, such as dicyclohexylcarbodiimide, or when a reactive acid derivative is used, for example, of a basic reagent, such as triethylamine or pyridine, if desired also in the presence of a salt, for example an ammonium salt of a compound of formula I, in which $R_2$ represents hydrogen, as starting material. An acyl group can also be introduced by the reaction of a compound of formula I, in which $R_1^a$ and $R_1^b$ each is a hydrogen atom, with an aldehyde, such as an aliphatic, aromatic or araliphatic aldehyde, whereupon the resulting Schiff's base is acylated, for example by the above-mentioned methods, and the acylation product is hydrolysed, preferably in a neutral or weakly acid medium.

If desired, an acyl group may be introduced stepwise. Thus, for example, in a compound of formula I containing a free amino group halogeno-lower alkanoyl, for example bromoacetyl group, or for example by treatment with a carbonic acid dihalide, such as phosgene, a halogenocarbonyl, for example chlorocarbonyl group can be introduced and a resulting N-(halogeno-lower alkanoyl)-amino or N-(halogenocarbonyl)-amino compound reacted with an appropriate exchange reagent, such as a basic compound, for example tetrazole, a thio compound, for example 2-mercapto-1-methylimidazole, or a metal salt, for example sodium azide or an alcohol such as a lower alkanol, for example tertiary butanol, whereby sutstituted N-lower alkanoylamino or N-hydroxycarbonylamino compounds become accessible. It is further possible to react, for example a compound of formula I, in which $R_1^a$ is a glycyl group preferably substituted in the $\alpha$-position, such as phenylglycyl, and $R_1^b$ stands for hydrogen, with an aldehyde, for example formaldehyde or a ketone, such as a lower alkanone, for example acetone, and thus to arrive at a compound of formula I, in which $R_1^A + R_1^b$ form a 5-oxo-1,3-diaza-cyclopentyl residue which is preferably substituted in position 4 and may be substituted in position 2.

In both reactants free functional groups may be temporarily protected during the acylating reaction in the known manner and on completion of the acylation liberated again in the known manner. Thus, for example, preferably amino or carboxyl groups in the acyl residue may be protected during the acylating reaction, for example, in the form of acylamino such as tertiary butoxycarbonylamino or in form of esterified carboxyl such as diphenylmethoxycarbonyl groups and subsequently eliminated, if desired after conversion of the protective group, for example by treatment with trifluoroacetic acid.

The acylation may also be achieved by exchanging an existing acyl group for another, preferably sterically hindered acyl group, for example by the process described above, by forming the imidhalide compound, treating it with the salt of an acid and hydrolytically eliminating an acyl group — usually the less sterically hindered acyl group — in the resulting product.

In a compound of formula I, in which $R_1^a$ and $R_1^b$ stand for hydrogen atoms, the free amino group can also be protected by introducing a triarylmethyl group, for example by treatment with a reactive ester of triarylmethanol, such as tritylchloride, preferably in the presence of a basic reagent, such as pyridine.

An amino group can also be protected by introduction of a silyl or stannyl group. Such groups are introduced in the known manner, for example by treatment with an appropriate silylating agent, such as a tri-lower alkyl-silylhalide, for example trimethyl-silylchloride, or a possibly N-mono-lower alkylated, N,N-di-lower alkylated, N-tri-lower alkyl-silylated or N-lower alkyl-N-tri-lower alkyl-silylated N-(tri-lower alkyl-silyl)-amine (see, for example British Patent Specification No. 1,073,530) or with an appropriate stannylating agent, such as a bis-(tri-lower alkyl-tin)-oxide, for example bis-(tri-n-butyl-tin)-oxide, a tri-lower alkyl-tin hydroxide, for example triethyl-tin hydroxide, tri-lower alkyl-lower alkoxy-tin or tetra-lower alkoxy-tin or a tetra-lower alkyl-tin compound, or a tri-lower alkyl-tin halide, for example tri-n-butyl-tin chloride (see, for example, Dutch Auslegeschrift No. 67/17107).

In a compound of formula I accessible according to the present invention, which contains a protected carboxyl group of the formula $-C(=O)-O-R_2^B$ which latter represents, for example, an esterified carboxyl group which is easy to convert into a free carboxyl group, this group can be so converted in the known manner, for example depending on the nature of the esterifying residue $R_2^B$, a grouping of the formula $-C(=O)-OR_2^a$, for example, by treatment of the appropriate ester with a strong inorganic or especially organic acid, such as a strong organic carboxylic acid, for example a lower alkanecarboxylic acid which may be substituted in position $\alpha$ by halogen, especially fluorine, atoms, in the first place trifluoroacetic acid, or formic acid, or a strong organic sulphonic acid, for example para-toluenesulphonic acid, a grouping $-C(=O)-OR_2^b$, for example, by hydrolysis, if desired in the presence of an acidic or weakly basic reagent, such as an aqueous acid, such as hydrochloric acid or aqueous sodium hydrogencarbonate or an aqueous potassium phosphate buffer having a pH value from about 7 to about 9, and a grouping of the formula $-C(=O)-OR_2^c$, for example, by irradiation, preferably with ultraviolet light, using rather shortwave ultraviolet light, for example below 290 m$\mu$ when $R_2^c$ represents, for example, an arylmethyl residue which may be substituted in position 3, 4 and/or 5, for example by lower-alkoxy and/or nitro groups, or with ultraviolet light of a longer wavelength, for example above 290 m$\mu$ when $R_2^c$ stands, for example, for an arylmethyl residue substituted in the 2-position by a nitro group.

A carboxyl group of the formula $-C(=O)-O-R_2^B$ protected by silylation or stannylation can be liberated in the usual manner, for example by treatment with water or an alcohol.

In a compound of formula I accessible according to this invention containing a group of the formula $-C(=O)-O-R_2$, in which $R_2$ stands for hydrogen, the free carboxyl group can be converted in the known manner into a protected carboxyl group, for example by treatment with a diazo compound, such as a diazo-lower alkane, for example diazomethane or diazoethane, or with a phenyl-diaza-lower alkane, for example phenyl-diazomethane or diphenyl-diazomethane, or by reaction with an alcohol suitable for esterification operations in the presence of an esterifying reagent, such as a carbodiimide, for example dicyclohexylcarbodiimide, or carbonyldiimidazole, or by any other known and suitable esterification process, such as reaction of a salt of the acid with a reactive ester of an alcohol and a strong inorganic acid, as well as a strong organic sulphonic acid, into the ester form. Furthermore, acid halides, such as acid chlorides (prepared, for example by treatment with oxalylchloride), activated esters (formed, for example, with N-hydroxynitrogen compounds) or mixed anhydrides (obtained, for example, with a haloformic acid lower alkyl ester, such as chloroformic acid ethyl ester, or with a haloacetic acid halide, such as trichloroacetic acid chloride) by reaction with an alcohol, if desired in the presence of a base, can be converted into an esterified carboxyl group.

Mixed anhydrides may be prepared by reacting a compound of formula I, in which $R_2$ stands for hydrogen, preferably a salt, especially an alkali metal or ammonium salt thereof, with a reactive derivative, such as a halide, for example the chloride, of an acid, for example a haloformic acid lower alkyl ester or a lower alkanecarboxylic acid chloride.

S-Oxides of compounds of formula I can be prepared, for example, by treating the latter with inorganic peracids having a reduction potential of at least +1.5 volt and consisting of non-metallic elements, organic peracids and mixtures of hydrogen peroxide with carboxylic acids having a dissociation constant of at least $10^{-5}$. Suitable inorganic peracids are periodic and persulphuric acid. Organic peracids are appropriate percarboxylic and persulphonic acids which are added as such or can be formed in situ by using at least one equivalent of hydrogen peroxide and an organic arboxylic acid. For this purpose it is advantageous to use a large excess of the carboxylic acid, with the use of, for example, acetic acid as solvent. Appropriate organic peracids are, for example, performic acid, peracetic acid, trifluoroperacetic acid, permaleic acid, perbenzoic acid, 3-chloroperbenzoic acid, monoperphthalic acid or para-toluenepersulphonic acid. The oxidation may also be carried out with the use of hydrogen peroxide with a catalytic amount of an acid having a dissociation constant of at least $10^{-5}$, for example acetic, trifluoroacetic or perchloric acid.

Resulting compounds may be converted one into another in the known manner. Thus, for example, modified functional groups, such as acylated amino groups or esterified carboxyl groups can be liberated by known methods, for example those mentioned above, or free functional groups, such as amino or carboxyl groups, may be functionally modified by as such known methods, for example by acylation or esterification, or they may be substituted. Thus, for example, an amino group may be transformed into a sulphoamino group by treatment with sulphur trioxide, preferably in the form of a complex with an organic base, such as a tri-lower alkyl-amine, for example triethylamine. Furthermore, the reaction mixture of an acid addition salt of a 4-guanylsemicarbazide with sodium nitrite may be reacted with a compound of formula I, in which, for example, the amino protective group $R_1^A$ represents a possibly substituted glycyl group, whereby the amino group is converted into a 3-guanylureido group.

Salts of compounds of formula I may be prepared in the known manner. Thus salts of compounds of formula I, in which $R_2$ stands for hydrogen, may be formed, for example, by treatment with metal compounds, such as alkali metal salts of appropriate carboxylic acids, for example the sodium salt of α-ethylcaproic acid, or with ammonia or a suitable organic amine, for which purpose it is preferable to use stoichiometric proportions or a small excess of the salt-forming reagent. Acid addition salts of compounds of the formula I with basic groupings are obtained in the usual manner, for example by treatment with an acid or an appropriate anion exchanger. Inner salts of compound of formula I, which contain a salt-forming amino group and a free carboxyl group, may be formed, for example, by neutralisation of salts, such as acid addition salts, to the isoelectric point, for example with a weak base, or by treatment with a liquid ion exchanger.

Salts may be converted into the free compounds in the usual manner, metal and ammonium salts, for example, by treatment with a suitable acid, and acid addition salts, for example, by treatment with a suitable basic reagent.

A resulting isomer mixture may be resolved into the individual isomers by as such known methods, for example by fractional crystallisation, adsorption chromatography (column or thin layer chromatography) or by other suitable separating methods. Resulting reacemates may be resolved into the antipodes in the usual manner, if desired after introduction of suitable salt-forming groupings, for example by forming a mixture of diastereoisomeric salts with optically active salt-forming reagents, separating the mixture to furnish the diasterecisomeric salts which are then separated and converted into the free compounds, or by fractional crystallisation from an optically active solvent.

The present process includes also any variant in which a compound obtained as intermediate product is used as starting material and the remaining process steps are carried out with it, or the process is discontinued at any stage thereof; furthermore, starting materials may be used in form of derivatives thereof or formed in the course of the reaction.

Preferably, starting materials and reaction conditions are chosen so that the compounds, pointed out above as being specially preferred, are obtained.

The starting materials of formula II used in the present process may be prepared, for example, by reacting a phosphoranylidene compound of the formula (IV) 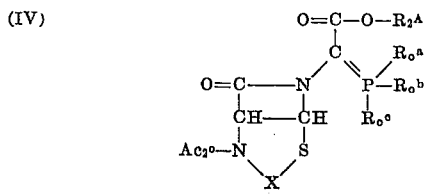

in which $Ac_2^o$ is an easily eliminable acyl residue and each of the groups $R_o^a$, $R_o^b$ and $R_o^c$ represents a possibly substituted hydrocarbon residue, with an aldehyde of the formula (V) 

or with a reactive derivative thereof. In a methylene compound of the formula (VI) 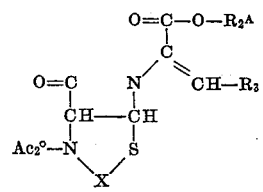

obtained in this manner it is surprisingly possible to add a mercaptan compound of the formula (VII) $HS-R_o^2$ 

in which $R_o^2$ represents hydrogen, an organic residue $R_o^1$ which is eliminable under the reaction conditions of the mercaptan-disulphide oxidation according to this invention or an organic residue convertible thereinto, on to the methylene double bond whereby a compound of the formula (VIIIa) 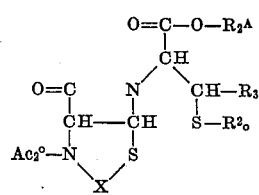

is obtained. In such a compound a group $Ac_2^o$ is replaced by hydrogen in any desired known manner and in a suitable order of sequence, and a group $R_o^2$ different from $R_o^1$ is converted into the latter, in which connection it is permissible within the scope defined to introduce groups $R_o^2$ and/or to convert them into other groups $R_o^2$, whereby starting materials of the formula II are obtained, in which $R_a$ and $R_b$ represent hydrogen. Starting materials of formula II, in which $R_a + R_b$ stand for a covalent carbon-carbon bond are obtained when in a compound of formula VIII the necessary carbon-to-carbon double bond is introduced; this may be done by introducing a suitable esterified hydroxyl group, for example an acyloxy group or a halogen atom, preferably into the carbon atom which is vicinal to the sulphur atom, in β-position to the esterified carboxyl group, followed by elimination together with hydrogen, or by elimination of an acylmethyl group $R_o^2$ in form of an intramolecularly formed ketone. Furthermore, a residue $R_2^A$ may be replaced by hydrogen or by the group $R_2^B$.

In the intermediate products of formula IV the residues $R_o^a$, $R_o^b$ and $R_o^c$ represent aliphatic hydrocarbon residues which may be substituted by etherified or esterified hydroxyl groups, such as lower alkoxy groups or halogen atoms, such as lower alkyl, for example n-butyl, residues, or cycloaliphatic hydrocarbon residues which may be substituted by aliphatic hydrocarbon residues, such as lower alkyl residues, or etherified or esterified hydroxyl groups, such as cycloalkyl residues, or phenyl-lower alkyl residues which may be substituted by aliphatic hydrocarbon residues, etherified or esterified hydroxyl or nitro groups, or more especially correspondingly substituted phenyl, in the first place unsubstituted phenyl residues.

An easily eliminable acyl residue $Ac_2^0$ is especially an acyl residue, readily eliminable under acidic or neutral conditions, of a carbonic acid semiderivative, such as an appropriate semiester. Such acyl residues are in the first place the lower alkoxycarbonyl or cycloalkoxycarbonyl residues eliminable in the first place by treatment with a suitable acid, such as trifluoroacetic acid, which are branched and/or substituted in the α-position of the lower alkyl portion, especially the tertiary butoxycarbonyl, the tertiary pentoxycarbonyl, benzhydrylcarbonyl or 2-biphenylyl-2-propoxycarbonyl residue, 2-halogeno-lower alkoxycarbonyl, for example 2,2,2-trichloroethoxycarbonyl or 2-iodoethoxycarbonyl groups which can be eliminated by treatment with a chemical reducing agent, such as a reducing metal, metal alloy, metal amalgam or metal salt (which reducing agents are preferably applied in the presence of a hydrogen donor, such as an acid or an alcohol, usually together with water, for example zinc in the presence of aqueous acetic acid) or convertible into such a carbonyl compound, for example by treatment with sodium iodide in the presence of acetone, being 2-bromoethoxycarbonyl or arylcarbonylmethoxycarbonyl, for example phenacyloxycarbonyl groups.

The reaction of compounds of formula IV with aldehydes of formula V or reactive derivatives, such as the hydrates or enols thereof, is preferably performed at an elevated temperature, for example at about 50°C to about 150°C, and in an inert diluent or solvent, such as a hydrocarbon, for example toluene or a xylene, or in an ether, for example dioxane or diethyleneglycoldimethyl ether or in a mixture thereof.

In a mercaptan compound of formula VII a residue $R_0^2$ convertible into the group $R_0^1$ is, for example, an eliminable hydrocarbon residue which may be substituted, or one that is convertible thereinto, such as a possibly reactively esterified 2-hydroxy-lower alkyl residue, such as the 2-hydroxyethyl group or a 2-halogeno-lower alkyl residue accessible therefrom in the usual manner, especially a 2-chloroethyl or 2-bromoethyl or in the first place 2-iodoethyl residue, or an acylmethyl residue, in which the acyl group is the residue of an organic carboxylic acid, in the first place one of aromatic character, especially an arylcarbonylmethyl residue, in which acyl is preferably a monocyclic or bicyclic aryl group, in the first place a possibly substituted phenyl group, such as the phenacyl residue, or a polyarylmethyl residue, in which aryl preferably stands for a possibly substituted phenyl group, such as the trityl residue.

The addition reaction of the mercaptan compound of formula VII with the methylene double bond in a compound of formula VI is carried out in the presence of a basic, especially metalliferous catalyst capable of forming an ionic mercaptide compound. Preferred use is made of alkali metals and especially alkali metal hydrides, such as sodium hydride, as catalyst. The additive reaction is usually carried out in the presence of a suitable solvent or diluent, such as a hydrocarbon which, if desired may be substituted by halogen atoms, for example hexane, cyclohexane, benzene or methylenechloride, or of an ether, for example tetrahydrofurane or dioxane, or of a mixture thereof, under mild temperature conditions, usually while cooling, for example to −25°C, or at room temperature or with slight heating to, for example, 100°C, when necessary in a closed vessel and/or in an inert gas, such as a nitrogen atmosphere.

In a compound of formula VIIIa an acyl residue $Ac_2^0$ may be replaced by hydrogen in the known manner: a lower alkoxycarbonyl or cycloalkoxycarbonyl residue which is branched and/or substituted in the α-position, for example, by treatment with a suitable acid, such as one of those mentioned above, especially with trifluoroacetic acid, and a 2-halogeno-lower alkoxycarbonyl residue or aroylmethoxycarbonyl residue by treatment with a chemical reducing agent, such as zinc, preferably in the presence of aqueous acetic acid.

A residue $R_0^2$ different from the group $R_0^1$ may be converted into the residue $R_0^1$, if desired after introduction of and/or conversion into another residue $R_0^2$. Thus, for example, it is possible to introduce into a compound of formula VIIIa, in which $R_0^2$ represents hydrogen, a residue $R_0^2$, which is different therefrom, such as a 2-hydroxy-lower alkyl or acylmethyl residue, for example by treatment with a suitable reactive ester of an alcohol of the formula $R_0^2$—OH, such as a 2-hydroxy-lower alkyl halide, for example the bromide, or an acylmethyl halide, for example arylcarbonylmethyl bromide, or a lower alkylene oxide. Furthermore, the hydroxyl group in a 2-hydroxy-lower alkyl, such as the 2-hydroxyethyl residue $R_0^2$ may be converted into a reactive, esterified hydroxyl group, in which the hydroxyl group is esterified by a strong inorganic or organic acid, such as a mineral acid, especially a hydrohalic acid, for example hydrochloric, hydrobromic or hydriodic acid, or by a strong organic sulphonic acid, such as a lower alkanesulphonic, for example methanesulphonic acid or by an arylsulphonic, for example para-toluenesulphonic acid. Thus, for example, the hydroxyl group may also be converted e.g. into a halogen, especially chlorine or bromine atom or by treatment with a suitable halogenating reagent, such as a thionylhalide, for example thionylchloride, or a phosphorus halide, for example phosphorus tribromide, preferably in the presence of a basic reagent, such as an organic base, for example pyridine or a poly-Hünig base, or into an organic sulphonyloxy group by treatment with an organic sulphonylhalide, such as the chloride. When desired or necessary, the reactive, esterified hydroxyl group may be converted into another group of this kind; for example a chlorine or bromine atom or a para-toluenesulphonyloxy group by treating the chloro, bromo or para-toluenesulphonyloxy compound with an alkali metal iodide, for example sodium iodide, in a suitable solvent, for example acetone, into an iodine atom. Furthermore, a methanesulphonyloxy group may be replaced by a halogen, for example chlorine, atom in the presence of halogen, for example chlorine, ions which may be present, for example, in the reaction medium involved in the manufacture of the methanesulphonyloxy compound with a methanesulphonylhalide, such as chloride, in the presence of a basic reagent, such as pyridine.

In a compound containing a 2-iodo-lower alkyl group $R_0^2$ prepared, for example as described above, the said group may be eliminated and replaced by hydrogen by reduction, for example by treating the 2-iodo-lower alkyl compound with a chemical reducing agent, such as one of those described above, for example zinc in conjunction with aqueous acetic acid. When an agent is used that is suitable for the purpose, substitutes the mercapto group and introduces a group $R_0^1$ which is different from hydrogen, such as a triarylmethylhalide, for example tritylchloride, the group $R_0^2$ may be replaced by a suitable organic group $R_0^1$, such as the trityl group.

A triarylmethyl group $R_0^2$, such as the trityl group, which at the same time may also represent a residue $R_0^1$, may, if desired, be eliminated already prior to the mercaptan-disulphide oxidation, for example by treatment with a suitable acid, such as trifluoroacetic acid.

The introduction of a covalent carbon-to-carbon bond represented by $R_a$ and $R_b$ into a compound of formula VIIIa may be carried out in a variety of ways. Thus, for example, an acyloxy group, in which acyl represents the residue of an organic carboxylic acid, such as an aromatic carboxylic acid, for example a possibly substituted benzoic acid, or of an aliphatic carboxylic acid, such as an alkanecarboxylic, especially lower alkanecarboxylic acid, and represents in the first place acetic acid, may be introduced into the carbon atom containing the mercapto group substituted by the group $R_0^2$ other than hydrogen, to lead to compounds of the formula (IX)

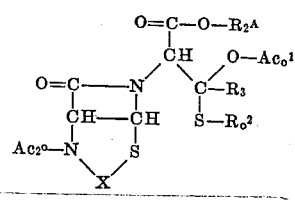

in which $Ac_0^1$ represents the acyl residue of an organic carboxylic acid, such as one of the acids mentioned above, and in the first place the acetyl residue from which the acyloxy group can be eliminated together with hydrogen, accompanied by introduction of the desired double bond.

In a compound of formula VIIIa the residue $R_0^2$ is in the first place a possibly reactive, esterified 2-hydroxy-lower alkyl group $R_0^2$, such as the 2-hydroxyethyl or a 2-halogenethyl group, and the acyloxy group may be introduced by treatment of the appropriate substituted mercapto compound with a suitable oxidising heavy-metal carboxylate, such as a carboxylic acid derivative mentioned above, especially with lead tetraacetate, at an elevated temperature (for example at about 50°C to about 150°C) and preferably in an inert solvent, such as benzene, and if desired, while irradiating, for example with ultraviolet light.

The elimination of an acyloxy group $Ac_0^1$ together with hydrogen may be performed, for example, by treatment with a suitable basic reagent, such as an organic, preferably tertiary, amine, such as a trialkylamine, for example triethylamine, or with a heterocyclic base, for example pyridine, when necessary in the presence of a solvent, such as ethanol, and/or with cooling or heating. Furthermore, the double bond may also be introduced with elimination of the acyloxy group $Ac_c{-}^1{-}0$ together with hydrogen when a compound of formula IX, in which the group $R_0^2$ is one that can be eliminated by treatment with a chemical reducing agent, especially an appropriate 2-halogeno-lower alkyl, in the first place the 2-iodoethyl group, preferably in the presence of an agent capable of introducing a residue $R_0^2$ different from hydrogen, such as the trityl residue, as of the reactive ester of an appropriate alcohol, for example of tritylchloride, with a chemical reducing agent, such as one of those mentioned above, for example zinc in the presence of acetic acid. This procedure gives rise to a compound of the formula (VIIIb)

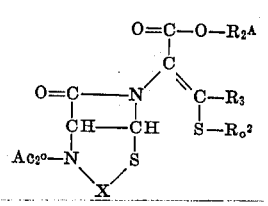

in which $R_0^2$ generally is a residue $R_1^0$ other than hydrogen. Such a residue can be eliminated either during the mercaptan-disulphide oxidation or prior to the treatment with the oxidant Starting materials of formula II, in which $R_a + R_b$ form a covalent carbon-to-carbon bond, are also obtained when a compound of formula VIIIa, in which $R_0^2$ represents an acylmethyl residue, such as one of the groups mentioned above, and is especially an arylcarbonylmethyl or in the first place the phenacyl residue, if desired after having eliminated the acyl residue $Ac_2^0$, is subjected to photolysis in the presence of an at least equivalent quantity, of a basic reagent. The basic reagent used in the photolysis is preferably an organic amine, especially a heterocyclic base of aromatic character, such as pyridine, collidine, quinoline or quinaldine. The reaction is performed by irradiation with light, especially ultraviolet light, preferably of a main wavelength range above 280 m$\mu$, produced by suitable filtration, for example through pyrex glass; the irradiation is generally carried out in the presence of a solvent, such as benzene, if necessary with cooling or heating and/or in an inert gas, for example in a nitrogen atmosphere.

In a compound of formula VIIIa, which is suitable for use in the above-mentioned photolysis, in which $R_0^2$ represents an acylmethyl, especially an arylcarbonyl-methyl, for example phenacyl residue, an acyl residue $Ac_2^0$ may first be replaced by hydrogen in the known manner, for example a lower alkoxycarbonyl residue, such as the tertiary butoxycarbonyl residue, which is branched and/or may be suitably substituted in the $\alpha$-position, by treatment with trifluoroacetic acid. When an intermediate thus obtained is used in the photolysis, this leads directly to the desired starting material of formula II, in which $R_a + R_b$ form a covalent carbon-to-carbon bond, which is then generally subjected to the mercaptan-disulphide oxidation without intermediate isolation.

However, when the photolysis is carried out with an intermediate product of formula VIIIa, in which $Ac_2^0$ has the meaning indicated above and $R_0^2$ represents the said acylmethyl residue, in the presence of a basic reagent, such as pyridine, and immediately after its formation the unsaturated mercaptan compound, which represents the enol compound of the unstable but characterisable thioaldehyde, is oxidised with a mercaptan-disulphide oxidant, for example with one of the oxidants mentioned above, such as with iodine, or the photolysis is carried out in the presence of an oxidant, for example lead tetraacetate, the intramolecular disulphide compound of the formula (IIIa)
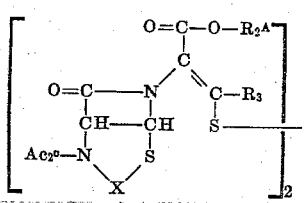

is obtained, in which suitable substituents may be replaced by hydrogen or other groups, for example the residue $R_2^A$ by the group $R_2^B$. The disulphide compound of the formula IIIa is generally obtained as a mixture of various isomers, especially a mixture of the cis-cis, trans-trans and cis-trans isomers.

When in the above oxidation a compound of formula VIIIa is used, in which $Ac_2^0$ has the indicated meaning, and $R_0^2$ stands for the said acylmethyl residue, especially an arylcarbonylmethyl such as the phenacyl residue, and the oxidation is carried out after the photolysis (carried out, for example, by irradiation with ultraviolet light, preferably in the presence of a basic agent, such as pyridine, and instead of the conventional mercaptan-disulphide oxidants an organic sulphonylhalide, especially chloride is used as oxidant, the main product thus obtained is the bis-trans-trans-disulphide compound of formula IIIa. Suitable organic sulphonylhalides are the halides, for example chlorides, of strong organic sulphonic acid, such as suitable aliphatic or aromatic sulphonic acids, especially possibly substituted lower alkanesulphonylhalides, for example methanesulphonylchloride, or arylsulphonylhalides possibly substituted, for example by lower alkyl or nitro groups, or halogen atoms, for example para-toluenesulphonylchloride. Instead of organic sulphonylhalides there may be used halides of sulphuric or sulphurous acid, for example the sulphurylchloride or thionylchloride, as agents that cause the disulphide formation. For this reaction there is used theoretically half a mol-equivalent, but practically an excess of oxidant and, if necessary, it is performed with addition of a basic reagent, such as an organic base, for example pyridine, which is advantageously already added during the photolysis and may serve at the same time as diluent, at a mild temperature, if desired with cooling (for example to about −20°C) or with slight warming (for example to about 50°C) and/or in the presence of a solvent such as an aliphatic, cycloaliphatic or aromatic hydrocarbon which may be substituted, for example by halogen atoms, or of a mixture of solvents, and/or in an inert gas, for example a nitrogen atmosphere.

The disulphide compound of formula IIIa accessible in this manner may be converted by reduction into a compound of formula VIIIb, if desired after having eliminated a group $Ac_2^0$ and preferably with introduction of a residue $R_0^2$ which is different from hydrogen and can be eliminated preliminarily or during the intramolecular mercaptan-disulphide oxidation, such as the trityl residue. The reduction of the disulphide compound, which is preferably performed in the presence of a reactive ester of a triarylmethanol, especially a tritylhalide, for example the tritylchloride, may consist, for example, in the treatment of the intramolecular disulphide with a chemical reducing agent, such as a metal, a metal alloy, a metal amalgam or a metal salt having reducing properties, such as zinc in the presence of a hydrogen donor, for example an acid, such as acetic acid, if desired with addition of water. In a compound of formula VIIIb obtainable in this way an acyl residue $Ac_2^0$ is replaced by hydrogen before the mercaptan-disulphide oxidation, a tertiary butoxycarbonyl residue, for example, by treatment with trifluoroacetic acid, whereupon the desired starting material of formula II, in which $R_a + R_b$ form a covalent carbon-to-carbon bond, is obtained.

The starting materials of formula II, accessible, for example, by the process described above, especially those in which $R_a + R_b$ form a covalent carbon-to-carbon bond, are in general not isolated but during or immediately after their manufacture or in the form of the crude reaction mixture subjected to the mercaptan-disulphide oxidation.

The S-monoxide of a bis-trans-trans-disulphide compound of formula III, which may likewise be used as starting material in the manufacture of compounds of formula I, is, for example, obtained when a bis-trans-trans-disulphide compound of formula IIIa (which is preferably prepared by photolysing a compound of formula VIIIa, in which $Ac_2^0$ stands for the acyl residue $Ac_1^0$ eliminable under the acidic reaction conditions, and $R_2^0$ represents an acylmethyl, especially an arylcarbonylmethyl residue, for example the phenacyl residue, usually by irradiation with ultraviolet light, preferably in the presence of a basic reagent, for example pyridine, followed by treatment with an organic sulphonylhalide, for example methanesulphonyl or para-toluenesulphonyl chloride, in the presence of a basic reagent, for example pyridine) with one of the above-mentioned oxidants suitable for the manufacture of S-oxides, especially with an organic percarboxylic acid, such as an aliphatic or aromatic percarboxylic acid, for example performic, peracetic, perbenzoic or 3-chloroperbenzoic acid, or hydrogen peroxide, preferably in the presence of an appropriate organic carboxylic acid, such as acetic acid. As a rule the oxidation is carried out with at most one mol-equivalent, preferably with a shortfall of the oxidant to prevent as far as possible the formation of the corresponding S,S'-dioxide and isolate any unreacted starting material which is then again subjected to the oxidation. Thus, by a suitable variation of the quantity of oxidant used the formation of the S-monoxide, compared with that of the S,S'-dioxide compound, can be promoted.

The above oxidation is usually carried out in the presence of a suitable solvent, such as an aliphatic, cycloaliphatic or aromatic hydrocarbon which may be substituted, for example, by halogen atoms, for example hexane, methylenechloride, cyclohexane or benzene, under mild temperature conditions, when necessary with cooling, for example to −20°C, or with slight warming, for example to 50°C, and/or in an inert gas, for example in a nitrogen atmosphere.

At any suitable stage of the manufacture of the starting materials additional steps may be carried out with intermediate products whereby they are converted into other intermediates of the same type; additional steps of this kind are, for example, those described above, being processes used in the conversion of final products. Thus, for example, at any suitable stage a protected carboxyl group of the formula $—C(=O)—O—R_2^A$ may be converted into a free carboxyl group and the latter, for example, into a protected carboxyl group of the formula —C(=O)—O—$R_2^B$; an organic silyl or stannyl residue $R_2^B$ can be introduced in the known manner, for example by treatment with a tri-lower alkyl-halogensilan, for example trimethylchlorosilan.

The intermediate products of formula IV have been described, for example, in German Offenlegungsschrift No. 1,935,970 of 29 January 1970 or may be prepared by the process illustrated in that publication. The relevant starting materials of the formula (X)
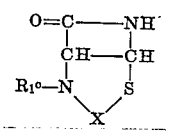

in which $R_1^0$ represents hydrogen or an acyl group $Ac_2^0$ and X is a disubstituted methylene group, especially the isopropylidene group, may be prepared, for example, by the process of British Patent Specification No. 1,155,021 (published on 11th June 1969). Compounds of the formula X, in which the group X stands for the disubstituted methylene group and $R_1^0$ for hydrogen, can be converted by treatment with an aldehyde, preferably in the presence of an acid, such as para-toluenesulphonic acid, and of water, into compounds of formula X, in which the group X is an unsubstituted or monosubstituted methylene group and in which the hydrogen atom $R_1^0$ may be replaced by an acyl group $Ac_0^2$, if desired stepwise, for example as described above. Compounds of formula X, in which the group X represents the 1-isobutylidene group, are obtained in a simple manner from a readily accessible 6-amino-penam-3-carboxylic acid compound of the formula (XI)
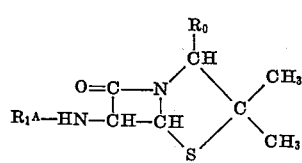

in which $R_1^A$ has the meaning defined above and is in the first place an acyl group Ac, in which free functional groups, such as hydroxyl, mercapto and especially amino and carboxyl groups may be protected, for example, by acyl groups or in form of ester groups, and $R_0$ stands for a carboxyl group, —C(=O)—OH (compound XIa), or from a salt thereof, by converting it into the corresponding acid azide compound of formula XI, in which $R_0$ represents the azidocarbonyl residue —C(=O)—$N_3$ (compound XIb), which is then converted with elimination of nitrogen into the corresponding isocyanate compound of formula XI, in which $R_0$ represents the isocyanato group —N=C—O (compound XIc) and simultaneously or subsequently treated with a compound of the formula H—Y (XII), in which Y stands for an etherified hydroxyl group which, together with a carbonyl grouping, forms an esterified carboxyl grouping of formula —C(=O)—Y which is eliminable under neutral or weakly acidic conditions.

In this manner a 3-etherified hydrocarbonylamino-penam compound of formula XI is obtained, in which $R_0$ stands for the residue of the formula —NH—C(=O)—Y (compound XId), in which an amino protective group $R_1^A$ — if it differs from an acyl residue $Ac_3^0$ eliminable under the reaction conditions of the following stage — is eliminated and, if desired, in a compound thus obtained the free amino group is converted into an amino group substituted by an acyl residue $Ac_3^0$ which is eliminable under the conditions of the following reaction stage. In the resulting compound of the formula (XIe)
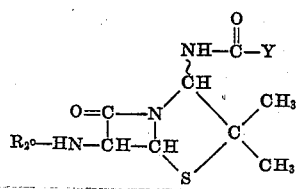

in which $R_2^0$ represents hydrogen or an acyl group $Ac_3^0$ which is eliminable under the reaction conditions, the etherified hydroxycarbonyl group of the formula —C(=O)—Y is eliminated (with simultaneous or subsequent treatment with water), which group is substituted and eliminable under neutral or weakly acidic conditions and the possibly resulting 4,4-dimethyl-5-thia-2,7-diazabicyclo[4.2.0]oct-2-en-8-one is separated or in it the carbon-to-nitrogen double bonds are reduced. In this manner the 3-isopropyl-4-thia-2,6-diazabicyclo[3.2.0]heptan-7-one of formula X is obtained, in which $R_1^0$ stands for hydrogen and the group X for the 1-isobutylidene group.

An acid compound XIa or a suitable salt, especially an ammonium salt, can be converted into the corresponding acid azide XIb, for example, by conversion into a mixed anhydride (for example by treatment with a haloformic acid lower alkyl ester, such as the chloroformic acid ethyl ester, or with trichloroacetylchloride, in the presence of a basic agent, such as triethylamine or pyridine) and treating such an anhydride with an alkali metal azide, such as sodium azide, or an ammonium azide, for example benzyltrimethylammonium azide. The acid azide compound XIb obtainable in this manner can be converted into the desired isocyanate compound XIc in the absence or presence of a compound of formula XII under the reaction conditions, for example by warming; XIc need not be isolated and can be converted directly into the desired compound of formula XId in the presence of a compound of formula XII.

In a compound of formula XII the group Y preferably is an etherified hydroxyl group which forms together with the carbonyl group a readily eliminable esterified carboxyl group; in the first place it is a group of the formula —O—$Y_o$, in which $Y_o$ represents a 2-halogeno-lower alkyl residue, in which halogen preferably has an atomic weight of over 19, especially the 2,2,2-trichloroethyl residue or the 2,2,2-trichloro-1-methylethyl, the 2,2,2-tribromoethyl or the 2-iodoethyl or the 2-bromoethyl residue which is easy to convert into the last-mentioned residue, for example by treatment with sodium iodide in acetone, or it is an arylcarbonylmethyl, such as the phenacyl residue.

When necessary, an amino protective group $R_1^A$ in a compound of formula XId can be eliminated in the known manner, a suitable acyl group Ac, for example, by treatment with an agent capable of forming an imidhalide, such as a suitable inorganic acid halide, for example phosphorus pentachloride, preferably in the presence of a basic agent, such as pyridine, reaction of the resulting imidhalide with an alcohol, such as a lower alkanol, for example methanol, and splitting of the iminoether formed in an aqueous or alcoholic medium, preferably under acidic conditions, and a trityl group, for example by treatment with a mineral acid, such as hydrochloric acid.

In a compound of formula XI$e$, in which $R_2^o$ represents $H_2$, the latter may be replaced, for example by the acylating method described above, by an acyl group which is eliminable under the conditions of the following reaction step, for example by a group of formula $Y_o$—O—C(=O). Furthermore, for example, a 2-bromoethyl residue Y may be converted into a 2-iodoethyl residue, for example as indicated above.

The splitting of the esterified carboxyl group —C(=O)—Y in a compound of formula XI$e$ may be carried out depending on the kind of the residue Y. In a compound of the formula XI$e$ —C(=O)—O—$Y_o$ can be eliminated by treatment with a chemical reducing agent, working or working up under mild conditions, generally at room temperature or even with cooling, and in the presence of water. Suitable chemical reducing agents are, for example, reducing metals and reducing metal compounds, metal alloys or amalgams, also strongly reducing metal salts, especially zinc, zinc alloys, for example zinc-copper, or zinc amalgams, which are preferably applied in the presence of a hydrogen donor which is capable of producing nascent hydrogen in conjunction with the metals, metal alloys or amalgams; zinc, for example, advantageously in the presence of an acid, such as an organic carboxylic acid, for example a lower alkanecarboxylic acid, in the first place acetic acid, or an acidic reagent, such as ammonium chloride or pyridine hydrochloride, preferably with addition of water, or in the presence of an alcohol, especially an aqueous alcohol, such as a lower alkanol, for example methanol, ethanol or isopropanol, which, if desired, may be applied in conjunction with an organic carboxylic acid.

Strongly reducing metal salts are in the first place chromium-II-salts, for example chromium-II-chloride or -acetate, which are preferably used in the presence of an aqueous medium containing water-miscible organic solvents, such as a lower alkanol, a carboxylic acid such as a lower alkanecarboxylic acid, or a derivative, such as a possibly substituted, for example lower alkylated, amide thereof, or an ether, for example methanol, ethanol, acetic acid, dimethylformamide, tetrahydrofurane, dioxane, ethyleneglycol dimethyl ether or diethyleneglycol dimethyl ether.

A possibly intermediately formed 4,4-dimethyl-5-thia-2,7-diazabicyclo[4.2.0]oct-2-en-8-one, which occurs for example when the group —C(=O)—O—$Y_o$ is split with the aid of a strongly reducing metal salt, may be converted into the 3-isopropyl-4-thia-2,6-diazabicyclo[3.2.0]heptan-7-one by exhaustive reduction, preferably by treatment with a chemical reducing agent, in the first place a reducing metal or metal compound, such as those mentioned above, preferably in the presence of a hydrogen donor, especially zinc in the presence of an acid such as acetic acid, or of an alcohol. A mixture of 3-isopropyl-4-thia-2,6-diazabicyclo[3.2.0]heptan-7-one with 4,4-dimethyl-5-thia-2,7-diazabicyclo[4.2.0]oct-2-en-8-one can be separated to furnish the component compounds by a known separating method, for example by fractional crystallisation, adsorption chromatography (column or thin-layer chromatography) or any other suitable separating method.

In the resulting compound of formula X, in which $R_1^o$ represents hydrogen and the group X the 1-isobutylidene group, the hydrogen $R_1^o$ is replaced by the acyl group $Ac_2^o$ in the known manner, for example as described above.

By reacting a compound of formula X, in which $R_1^o$ stands for an acyl group $Ac_2^o$, with a glyoxylic acid ester of the formula (XIII) 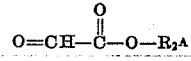

or a derivative, for example the hydrate thereof, converting the secondary hydroxyl group in a resulting compound of the formula (XIV) 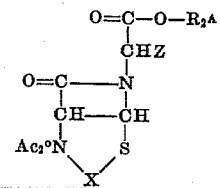

in which Z stands for a hydroxl group, into a reactive hydroxyl group, for example into a halogen such as chlorine atom, which may be carried out, for example, by treatment with a thionylhalide, such as thionylchloride, and treatment of the compound of formula XIV thus obtained, in which Z represents a reactive hydroxyl group, especially a halogen such as a chlorine atom, with a phosphine compound of the formula (XV) 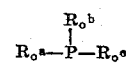

the desired intermediate product of formula IV is obtained. The above reactions are performed, for example, according to the process described in the above-mentioned German Offenlegungsschrift.

The invention includes also the compounds of the formula (VIIIc) 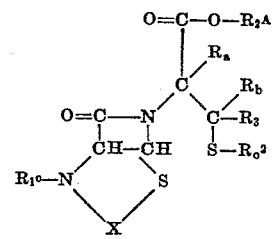

in which $R_1^o$, $R_2^A$, $R_3$, $R_o^2$, X, $R_a$ and $R_b$ have the meanings defined above, with $R_1^o$ preferably being hydrogen or an acyl residue of a carbonic acid semiderivative, such as a semiester, which is eliminable under acidic or neutral conditions, for example by treatment with an acid or a chemical reducing agent; $R_2^A$ represents an organic residue which together with the —C(=O)—O— grouping forms an esterified carboxyl group which is easy to eliminate by treatment with an acidic agent, or under physiological conditions; $R_3$ represents hydrogen or a possibly substituted aliphatic, cycloaliphatic, cycloaliphatic-aliphatic, aromatic or araliphatic hydrocarbon residue or a possibly substituted monocyclic azacyclic, oxacyclic or thiacyclic residue, which is preferably of aromatic character; $R_o^2$ represents hydrogen or a preferably reactively esterified 2-hydroxy-lower alkyl residue, an acylmethyl or polyarylmethyl residue, and X stands for a methylene residue which may be substituted by one or two lower alkyls. In a preferred compound of formula VIIIc the group $R_1^o$ represents hydrogen or a lower alkoxycarbonyl or cycloalkoxycarbonyl residue, which is eliminable by treatment with an acid and is branched and/or substituted in position $\alpha$ of the lower alkyl portion, for example tertiary butoxycarbonyl, or a 2halogen-lower alkoxycarbonyl residue which is eliminable by treatment with a chemical reducing agent or one that can be converted thereinto, for example 2,2,2-trichloroethoxycarbonyl, 2-iodoethoxycarbonyl or 2-bromoethoxycarbonyl, or arylcarbonyl-methoxycarbonyl residue, for example phenacylcarbonyl; $R_2^4$ a methyl residue which is polysubstituted by possibly substituted hydrocarbon residues, for example tertiary butyl, $R_3$ is a hydrogen atom or a lower alkyl, phenyl or phenyl-lower alkyl residue which may be substituted, for example, by lower alkyl groups, free, etherified or esterified hydroxyl groups, trifluoromethyl groups, possibly substituted amino groups or possibly functionally modified carboxyl or sulpho groups, being especially lower alkyl, for example methyl, lower alkoxy-lower alkyl, for example methoxymethyl or lower alkanoyloxy-lower alkyl, for example acetyloxymethyl, or a pyridyl, furyl or thienyl residue which may be substituted, for example as indicated above; $R_o^2$ represents hydrogen or the 2-hydroxy-lower alkyl group, for example 2-hydroxyethyl, a 2-halogeno-lower alkyl group, in which halogen is chlorine, bromine or iodine, for example 2-chloroethyl, 2-bromoethyl or 2-iodoethyl, or an arylcarbonylmethyl group, for example phenacyl, or trityl; X represents a lower alkylidene group such as isopropylidene or 1-isobutylidene, and $R_a$ and $R_b$ have the meanings indicated above. Compounds of the formula VIIIc are obtained by the process described above by adding a compound of formula VII on to the carbon-to-carbon double bond in a compound of formula VI; if desired, in a resulting compound of formula VIIIc, in which $R_a$ and $R_b$ each is a hydrogen atom, the covalent carbon-to-carbon bond represented by $R_a + R_b$ may be introduced in any desired order of sequence and/or a group $Ac_2^o$ may be replaced by hydrogen and/or a group $R_o^2$ different from $R_o^1$ may be converted thereinto, and within the indicated scope groups $R_2^o$ may be introduced and/or converted into other groups $R_o^2$.

The invention includes also the disulphide compounds of formula IIIa, in which $Ac_2^o$, $R_3$ and X have the meanings defined above and in which the group $R_2^A$ is replaced by the group $R_2^B$ (in preferred trans-trans isomers of formula III $Ac_1^o$, $R_2^B$, $R_3$ and X have the above, especially preferred meanings) and $Ac_1^o$ is in the first an acyl residue of a carbonic acid semiester eliminable under acidic conditions, especially the tertiary butoxycarbonyl group; X represents the isopropylidene or 1-isobutylidene group, and $R_2^B$ stands for an esterified carboxyl group which is eliminable together with the —C(=O)—O-grouping under acidic conditions, being especially an appropriate lower alkyl residue, such as the tertiary butyl group. The compounds of the formula III or IIIa respectively are obtained as described above by the mercaptan-disulphide oxidation of compounds of the formula (XVI)

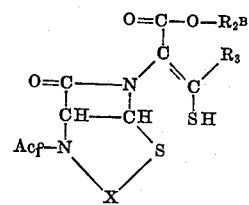

or (XVIa)

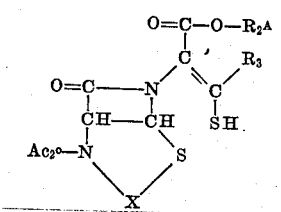

which may be formed, for example, by photolysis, preferably in the presence of a basic reagent, such as pyridine, from appropriate compounds of formula VIIIa, in which $R_o^2$ stands for an acylmethyl, especially an arylcarbonylmethyl, for example the phenacyl residue, and which are preferably not isolated. When in such an oxidation an organic sulphonylhalide, or a halide of sulphuric or sulphurous acid is used, it is possible, for example, to obtain, for example, from a compound of formula XVI as main products the preferred bis-trans-trans-disulphides of formula III.

The pharmacologically active compounds of the present invention can be used, for example, for the manufacture of pharmaceuticals containing an active proportion of the active substance in conjunction or admixture with inorganic or organic solid or liquid, pharmaceutically acceptable vehicles which are suitable for enteral or parenteral administration. It is preferable to use tablets or gelatin capsules which contain the active substance in conjunction with a diluent, for example lactose, dextrose, sucrose, mannitol, sorbitol, cellulose and/or glycine, and lubricants, for example silica, talcum, stearic acid or stearates such as magnesium or calcium stearate, and/or polyethyleneglycol. Tablets further contain binders, for example magnesium aluminium silicate, a starch such as corn, wheat, rice or arrowroot starch, gelatine, tragacanth, methylcellulose, sodium carboxymethylcellulose and/or polyvinylpyrrolidone and, if desired, disintegrating agents, for example a starch, agar, alginic acid or an alginate such as sodium alginate, and/or effervescing agents or adsorption agents, colouring matter, flavourings and sweeteners. Injectible medicaments are preferably isotonic, aqueous solutions or suspensions, and suppositories are in the first place fat emulsions or suspensions. The pharmaceuticals may be sterilised and/or contain adjuvantes, for example preservatives, stabilisers, wetting agents and/or emulsifiers, solution promoters, salts for regulating the osmotic pressure and/or buffers. The present pharmaceuticals, which if desired may contain further pharmacologically valuable substances, are manufactured in the known manner, for example by conventional mixing, granulating or dragee-making processes and contain from about 0.1% to about 75%, especially from about 1% to about 50% of the active substance.

The organic groups, radicals or compounds used above together with the term "lower" contain up to 7, preferably up to 4 carbon atoms.

The following examples illustrate the invention. Temperatures are shown in degrees centigrade.

Example 1

A solution of 0.014 g of α-mercaptomethyl-α-(3,3-dimethyl-7-oxo-4-thia-2,6-diaza-6-bicyclo[3.2.0]heptyl)-acetic acid tertiary butyl ester in 20 ml of benzene is treated dropwise with 0.8 ml of an 0.05 molar solution of iodine in benzene. Then a drop of pyridine is added and the mixture evaporated at 10°C under a pressure of 10 mm Hg and the residue is taken up in 0.4 ml of acetonitrile. The solution, which contains the hydroiodide of 7-(N-isopropylideneamino)-cepham-4-carboxylic acid tertiary butyl ester, is treated at 0°C with 0.15 ml of pyridine and then with 0.04 ml of phenylacetylchloride, then the ice bath is removed, the mixture left to itself for 40 minutes at 20°C and evaporated at 20°C under a pressure of 10 mm Hg. The residue is agitated for 15 minutes with 15 ml of ethyl acetate and 10 ml of water; the organic phase is isolated, agitated for 5 minutes with a saturated aqueous sodium hydrogencarbonate solution, dried and evaporated. The residue is crystallised from diethyl ether and furnishes the 7-(N-phenylacetyl-amino)-2-thiacepham-4-carboxylic acid tertiary butyl ester of the formula

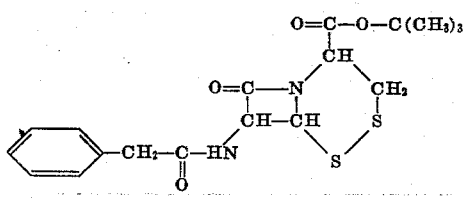

which, after recrystallisation from diethyl ether, melts at 165 – 166°C.

Example 2

A solution of 0.90 g of α-mercaptomethyl-α-(3,3-dimethyl-7-oxo--4-thia-2,6-diaza-6-bicyclo[3.2.0]heptyl)-acetic acid tertiary butyl ester (approximately 2:3-mixture of the isomers) in 500 ml of anhydrous benzene is treated within 5 minutes at room temperature, while being vigorously agitated, with 60 ml of an 0.05 molar solution of iodine in benzene, then treated with 500 ml of a saturated aqueous sodium hydrogencarbonate solution and the reaction products are distributed between the benzene phase and the aqueous solution. The organic solution is washed with 500 ml of water and the aqueous phase extracted once with 500 ml of benzene. The combined organic solutions are dried over sodium sulphate and evaporated. The reddish-brown oily residue is dissolved in 60 ml of anhydrous dioxane, treated with 1.5 ml of phenylacetylchloride and kept for 1½ hours at room temperature. Then 1 ml of water is added and the whole is kept for another 30 minutes at room temperature. The reaction product is distributed between 150 ml of methylenechloride and 150 ml of a saturated aqueous sodium hydrogencarbonate solution, the organic phase washed with 150 ml of water and the aqueous phase twice extracted with methylenechloride. The combined organic solutions are dried and evaporated. The residue is purified by chromatography (on 250 g of acid-washed silica gel; column); preliminary washing is carried out with 1400 ml of a 9:1-mixture of benzene and ethyl acetate and elution with a 3:1-mixture of benzene and ethyl acetate (100 ml fractions). After crystallisation from a mixture of methylenechloride and hexane fractions 1 – 6 furnish the 7-(N-phenylacetyl-amino)-2-thiacepham-4α-carboxylic acid tertiary butyl ester in the form of needles, nelting at 190 – 192°C. $[\alpha]_D^{20} = +135° \pm 1°$ ($c = 0.777$ in chloroform). Thin-layer chromatogram (on silica gel): Rf = 0.38 (system benzene : diethyl ether 2 : 1). Infrared absorption spectrum (in methylenechloride): characteristic bands at 2.97, 5.64, 5.79, 5.94 and 6.69μ. The residue from the fractions 8 – 18 is once recrystallised from a mixture of benzene and hexane and yields the 7-(N-phenylacetyl-amino)-2-thiacepham-4β-carboxylic acid tertiary butyl ester in the form of cubes, melting at 169° – 170.5°C. $[\alpha]_D^{20} = +121° \pm 1°$ ($c = 1.038$ in chloroform). Infrared absorption spectrum (in methylenechloride): characteristic bands at 3.05, 5.67, 5.77, 5.95 and 6.69μ.

Example 3

An oxygen-free solution of 2 g of α-(3,3-dimethyl-7-oxo-4-thia-2,6-diaza-6-bicyclo[3.2.0]heptyl)-α-phenacylthiomethyl-acetic acid tertiary butyl ester and 0.73 g of pyridine in 2 litres of anhydrous benzene is irradiated in 5 portions at 12 minutes each at 20°C by means of a high pressure mercury vapour lamp (70 VA) through a pyrex filter under nitrogen. Immediately after the photolysis each of the mixtures containing the isomer mixture of α-(3,3-dimethyl-7-oxo-4-thia-2,6-diaza-6-bicyclo[3.2.0]heptyl)-α-mercaptomehtylene-acetic acid tertiary butyl ester of the formula

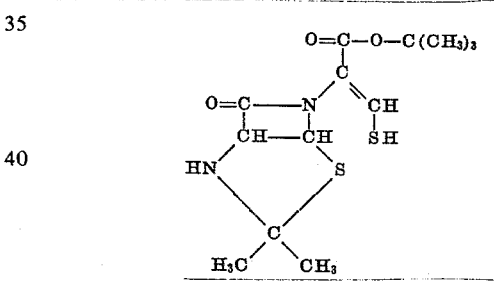

is treated with 18 ml of an 0.05 molar solution of iodine in benzene, the iodine solution being added in the course of 2 minutes, whereby a yellowish brown precipitate is formed. The combined reaction mixtures are concentrated to a volume of 50 ml, the polymerized material is filtered off and the filtrate evaporated to dryness and dissolved in 18 ml of anhydrous dioxane. The solution, containing the 7-(N-isopropylidene-amino)-2-thiaceph-3em-4-carboxylic acid tertiary butyl ester of the formula

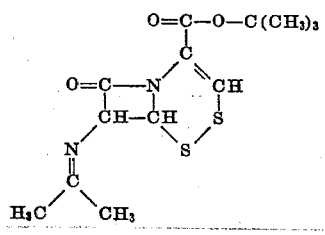

is treated with 1.8 ml of phenylacetylchloride and the mixture kept for 2 hours at 20°C and then 2 ml of water is added. After another 30 minutes at 20°C the reaction mixture is evaporated to dryness under a high vacuum and the benzene-soluble share of the residue is chromatographed on 200 g of acid-washed silica gel, washed with 2 litres of a 19:1-mixture of benzene and ethyl acetate and then further eluted with the same mixture, taking out fractions of 200 ml each. The fractions 2 – 9 contain the 7-(N-phenylacetyl-amino)-2-thiaceph-3-em-4-carboxylic acid tertiary butyl ester of the formula

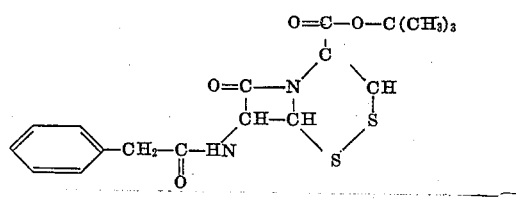

together with phenylacetic acid and other impurities. It is purified by preparative thin-layer chromatography (silica gel; four 20 cm plates; system benzene : diethyl ether 2:1). The fraction with Rf = 0.40 consists of the 7-(N-phenylacetyl-amino)-2-thiaceph-3-em-4-carboxylic acid tertiary butyl ester contaminated with some residual phenylacetic acid; it is distributed between 30 ml of a saturated aqueous sodium hydrogencarbonate solution and 30 ml of methylenechloride. The organic solution is extracted with 30 ml of water and the aqueous phases are extracted with 30 ml of methylenechloride and the combined organic solutions are dried over sodium sulphate and evaporated, to yield the chromatographically pure 7-(N-phenylacetyl-amino)-2-thiaceph-3-em-4-carboxylic acid tertiary butyl ester, which is obtained in yellowish cubes after crystallisation from a mixture of methylenechloride and hexane and melts at 140 – 143°C (analysis apparatus: 143 – 144°C). Thin-layer chromatogram (silica gel): Rf = 0.40 (system benzene : diethyl ether 2:1). Ultraviolet absorption spectrum (in ethanol): $\lambda_{max}$ = 282 m$\mu$ ($\epsilon$ = 5100) and $\lambda_{max}$ = 342 m$\mu$ ($\epsilon$ = 3300). Infrared absorption spectrum (in methylenechloride): characteristic bands at 2.97, 3.30–3.60, 5.58, 5.80, 5.93, 6.35, 6.68 and 6.90$\mu$.

Example 4

An oxygen-free mixture of 0.116 g of α-(3,3-dimethyl-7-oxo-4-thia-2,6-diaza-6-bicyclo[3.2.0]heptyl)-α-phenylacylthiomethyl-acetic acid tertiary butyl ester, 0.021 g of pyridine and 0.145 g of lead tetraacetate in 100 ml of dry benzene is irradiated for 12 minutes at 20°C under nitrogen with a preheated high pressure mercury vapour lamp (70 VA) through a pyrex filter and then concentrated to a volume of 5 ml. The lead diacetate is filtered off, the filtrate evaporated to dryness and the residue dissolved in 1 ml of dry dioxane. The resulting solution, containing the 7-(N-isopropylidene-amino)-2-thiaceph-3-em-4-carboxylic acid tertiary butyl ester, is treated with 0.1 ml of freshly prepared cyanoacetylchloride, then kept for one hour at room temperature and one drop of water is added. After standing for 20 minutes at room temperature the solvent is evaporated and the residue distributed between 20 ml of methylenechloride and an aqueous phosphorous phosphate solution of pH value 7. The organic solution is washed with the buffer solution and the aqueous phases with methylenechloride; the combined organic solutions are dried over sodium sulphate and evaporated. The residue is chromatographed on 9 g of acid-washed (washed with hydrochloric acid three times, then washed neutral with water and distilled water) silica gel, first washing with 20 ml of benzene and 80 ml of a 19:1-mixture of benzene and ethyl acetate and then eluted with a 9:1-mixture of benzene and ethyl acetate, fractions of 20 ml each being withdrawn. Fractions 4, 5 and 6 contain the spectroscopically pure 7-(N-cyanoacetyl-amino)-2-thiaceph-3-em-4-carboxylic acid tertiary butyl ester of the formula

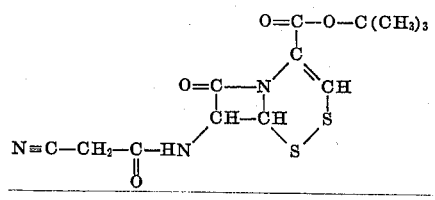

which is obtained as a yellowish oil. Thin-layer chromatogram (silica gel): Rf = 0.27 (system benzene = ethylacetate3:1). Ultraviolet absorption spectrum (in ethanol): $\lambda_{max}$ = 285 m$\mu$ and 339 m$\mu$. Infrared absorption spectrum (in methylenechloride) characteristic bands at 3.05, 3.30–3.60, 5.57, 5.85, 6.30 and 6.62$\mu$.

Example 5

An oxygen-free solution of 0.120 g of α-(3,3-dimethyl-7-oxo-4-thia-2,6-diaza-6-bicyclo[3.2.0]heptyl)-α-(1-phenylacylthio-ethyl)-acetic acid tertiary butyl ester and 0.045 g of pyridine in 400 ml of benzene is irradiated for 8 minutes at 20°C under nitrogen with a high pressure mercury vapour lamp (120 VA; Hanau Q 400) through a pyrex filter. The reaction mixture containing the α-(3,3-dimethyl-7-oxo-4-thia-2,6-diaza-6-bicyclo[3.2.0]heptyl)-α-(1-mercapto-ethylidene)-acetic acid tertiary butyl ester of the formula

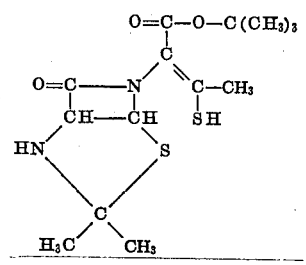

is treated within 2 minutes dropwise with 5.8 ml of an 0.05 molar solution of iodine in benzene. The solvent is then evaporated under diminished pressure and the residue extracted with 2.0 ml of anhydrous dioxane. The organic solution, which contains the hydriodide of the 7-(N-isopropylidene-amino)-3-methyl-2-thiaceph-3-em-4-carboxylic acid tertiary butyl ester of the formula

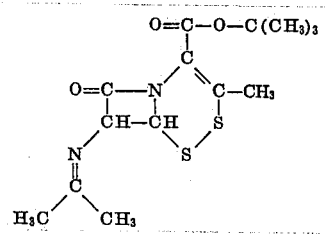

is mixed with 0.2 ml of phenacetylchloride and left to itself for 1½ hours at room temperature. Then 0.1 ml of water is added, the whole kept for 20 minutes at room temperature and then evaporated to dryness under a high vacuum. The benzene-soluble share of the residue is filtered through 9 g of acid-washed silica gel, eluting with 80 ml of a 19:1-mixture and with 110 ml of a 9:1-mixture of benzene and ethyl acetate. The second fraction is distributed between 20 ml of methylenechloride and 20 ml of a saturated aqueous sodium hydrogencarbonate solution and the product from the organic solution purified by preparative plate chromatography (silica gel; system benzene : ethyl acetate 3:1), to yield the 3-methyl-7-(N-phenylacetyl-amino)-2-thiaceph-3-em-4-carboxylic acid tertiary butyl ester of the formula

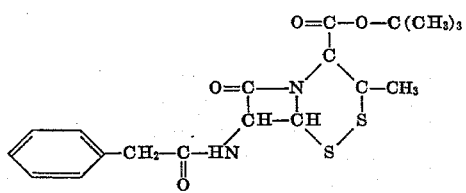

of Rf = 0.47 is obtained as a colourless oil. Ultraviolet absorption spectrum (in ethanol): $\lambda_{max}$ = 282 mμ and 337 mμ. Infrared absorption spectrum (in methylenechloride): characteristic bands at 2.97, 3.26–3.65, 5.60, 5.85, 5.93, 6.29, 6.68 and 6.91μ.

In an analogous manner α-(2-acetyloxy-phenacylthio-ethyl)-α-(3,3-dimethyl-7-oxo-4-thia-2,6-diaza-6-bicyclo[3.2.0]heptyl)-acetic acid tertiary butyl ester yields on irradiation with a high pressure mercury vapour lamp through a pyrex filter in the presence of pyridine the α-(2-acetyloxy-1-mercapto-ethylidene)-α-(3,3-dimethyl-7-oxo-4-thia-2,6-diaza-6-bicyclo[3.2.0-]heptyl)-acetic acid tertiary butyl ester of the formula

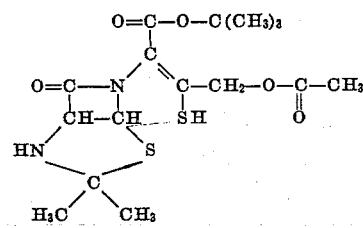

which, without first being isolated, is oxidised by treatment with iodine to furnish the 3-acetyloxymethyl-7-(N-isopropylidene-amino)-2-thiaceph-3-em-4-carboxylic acid tertiary butyl ester of the formula

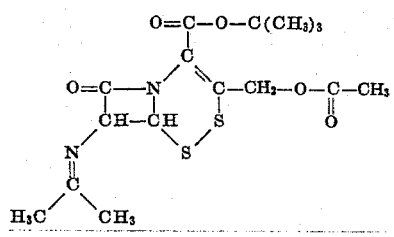

which, after having been treated with phenylacetylchloride and then with water, furnishes the 3-acetyloxymethyl-7-(N-phenylacetyl-amino)-2-thiaceph-3-em-4-carboxylic acid tertiary butyl ester of the formula

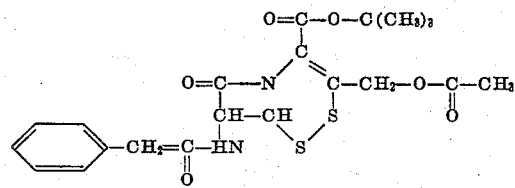

in which the esterified carboxyl group may be liberated by treatment with trifluoroacetic acid.

Example 6

A solution of 0.390 g of α-(3,3-dimethyl-7-oxo-4-thia-2,6-diaza-6-bicyclo[3.2.0]heptyl)-α-(1-phenacylthioethyl)-acetic acid tertiary butyl ester and 0.137 g of pyridine in 800 ml of benzene is irradiated for 10 minutes at 20°C under nitrogen with a high pressure mercury vapour lamp through a pyrex filter. The reaction mixture containing the α-(3,3-dimethyl-7-oxo-4-thia-2,6-diaza-6-bicyclo[3.2.0]heptyl-α-(1-mercaptoethylidene)-acetic acid tertiary butyl ester is immediately treated dropwise with 17.3 ml of an 0.05 molar solution of iodine in benzene. The solvent is evaporated under reduced pressure and the residue taken up in 5 ml of dioxane. The solution, containing the hydriodide of 7-(N-isopropylidene-amino)-3-methyl-2-thiacepth-3-em-4-carboxylic acid butyl ester, is treated with 0.5 ml of phenyloxyacetylchloride, left to itself for 2 hours at room temperature, 0.3 ml of water is added, the whole kept for 15 minutes at room temperature and then evaporated under a high vacuum. The residue is chromatographed on 50 g of acid-washed silica gel, and the following eluates are withdrawn: 350 ml and 150 ml of a 19:1-mixture and 100 ml, 100 ml, 100 ml, 200 ml and 200 ml. Fractions 2, 3 and 4 are combined and distributed between 30 ml of a saturated aqueous sodium hydrogencarbonate solution and 30 ml of methylenechloride; the organic solution is washed with 30 ml of water and the aqueous phases are washed with 30 ml of methylenechloride. The combined organic solutions are dried over sodium sulphate and evaporated, to yield the 3-methyl-7-(N-phenyloxyacetyl-amino)-2-thiaceph-3-em-4-carboxylic acid tertiary butyl ester of the formula as an oily substance. Thin-layer chromatogram (silica gel): Rf = 0.23 (system benzene : ethyl acetate 9:1). Ultraviolet absorption spectrum (in ethanol): $\lambda_{max}$ = 278 mμ (covered by the bands at 262, 269 and 277 mμ of the phenyloxy group) and 335 mμ. Infrared absorption spectrum (in methylenechloride): characteristic bands at 2.97, 3.25-3.60, 5.60, 5.88, 6.26, 6.28, 6.62, 6.70 and 6.98μ.

Example 7

A solution of 0.032 g of α-(3,3-dimethyl-7-oxo-2-tertiary butoxycarbonyl-4-thia-2,6-diaza-6-bicyclo[3.2.0]heptyl)-α-triphenylmethylthiomethylene-acetic acid tertiary butyl ester in 4 ml of trifluoroacetic acid (previously cooled to −15°C) is kept for 45 minutes at −15°C. The reaction mixture, which contains the α-(3,3-dimethyl-7-oxo-4-thia-2,6-diaza-6-bicyclo[3.2.0]heptyl)-α-mercaptomethylene-acetic acid tertiary butyl ester, is mixed at this temperature with stirring with 0.95 ml of an 0.05molar solution of iodine in anhydrous tetrahydrofurane. The solvents are then evaporated at −10°C in a high vacuum, the residue is taken up in 0.5 ml of dry dioxane and the solution, which contains the hydriodide of the 7-(N-isopropylidene-amino)-2-thiaceph-3-em-4-carboxylic acid tertiary butyl ester, is reacted for 2 hours at 20°C with 0.03 g of phenylacetylchloride and a drop of water is added. The reaction mixture is kept for 30 minutes at 20°C and then distributed between 30 ml of methylenechloride and 30 ml of a saturated aqueous sodium hydrogencarbonate solution. The organic solution is washed with water and the aqueous phases with methylenechloride, and the combined organic solutions are dried over sodium sulphate and evaporated. The residue is purified by thin-layer chromatography (silica gel; system benzene : ethyl acetate 3:1). The fraction with Rf = 0.42 represents the chromatographically pure 7-(N-phenylacetyl-amino)-2-thiaceph-3-em-4-carboxylic acid tertiary butyl ester.

Example 8

An oxygen-free solution of 0.060 g of α-(3,3-dimethyl-7-oxo-2,6-diaza-4-thia-6-bicyclo[3.2.0]heptyl-α-)2-methoxy-1-phenacylthio-ethyl)-acetic acid tertiary butyl ester and 0.020 g of pyridine in 100 ml of benzene is irradiated for 13 minutes at 20°C under nitrogen with a high pressure mercury vapour lamp (70 Watt) through a pyrex filter. Immediately on completion of the photolysis 2.5 ml of a 3.05 molar solution of iodine in benzene are dropped in within 2 minutes, the whole is concentrated under diminished pressure to a volume of 10 ml and filtered. The filtrate is evaporated to dryness and redissolved in 3 ml of dioxane. Then 0.05 ml of phenylacetylchloride is added, the whole kept for 2 hours at room temperature under nitrogen and with exclusion of moisture and then mixed with 0.1 ml of water, then stirred on for 30 minutes, the evaporable shares are removed under a high vacuum and the residue is dissolved in 30 ml of methylenechloride. The organic solution is washed with a saturated aqueous sodium hydrogencarbonate solution and with water, dried over sodium sulphate and evaporated. The crude product is purified by preparative thin-layer chromatography (2 plates; silica gel; Rf = 0.35 in the system benzene:ethyl acetate 3:1), to yield the chromatographically and spectroscopically pure 3-methoxymethyl-7β-phenylacetylamino-2-thiaceph-3-em-4-carboxylic acid tertiary butyl ester of the formula

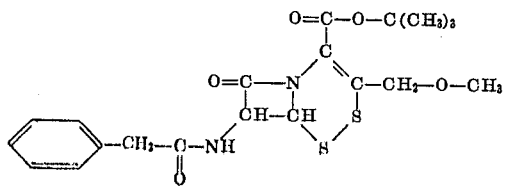

Ultraviolet spectrum (in ethanol): $\lambda_{max}$ = 282 mμ and 342 mμ. Infrared absorption spectrum (in methylenechloride, about 3%): characteristic bands at 2.96, 3.44, 5.59, 5.83, (shoulder), 5.92, 6.28, 6.68 and 7.33μ.

Example 9

A solution of 0.0154 g of the S-monoxide of bis-trans-{trans-2-(3,3-dimethyl-7-oxo-2-tertiary butoxycarbonyl-4-thia-2,6-diaza-6-bicyclo[3.2.0]heptyl)-2-tertiary butoxycarbonyl-vinyl}-disulphide in 1 ml of trifluoroacetic acid previously cooled to −15°C is kept for 3½ hours at −15°C and then evaporated to dryness under a high vacuum. The residue, which contains the trifluoroacetate of 7-(N-isopropylidene-amino)-2-thiaceph-3-em-4-carboxylic acid tertiary butyl ester, is taken up in 0.5 ml of anhydrous dioxane, then about 0.03 g of phenylacetylchloride is added, the whole is kept for 1 hour at room temperature and diluted with a small amount of water. After another 20 minutes, the volatile constituents are removed under a high vacuum. The residue is distributed between 15 ml of methylenechloride and a mixture of 10 ml of a saturated aqueous sodium hydrogencarbonate solution and 5 ml of a saturated aqueous sodiumchloride solution. The organic solution is separated and washed with 15 ml of a 2:1-mixture of water and a saturated aqueous sodiumchloride solution; the aqueous solution is extracted with 15 ml of methylenechloride and the combined organic solutions are dried over sodium sulphate and evaporated. The residue represents the thin-layer chromatographically rather pure 7-(N-phenylacetyl-amino)-2-thiaceph-3-em-4-carboxylic acid tertiary butyl ester and is identical with the compound obtained by the process described in Example 4.

Example 10

A solution of 0.007 g of bis-trans-{trans-2-tertiary b-utoxycarbonyl-1-methoxymethyl-2-(2-tertiary butoxycarbonyl-3,3-dimethyl-7-oxo-2,6-diaza-4-thia-6-bicyclo[3.2.0]-heptyl)-1-methoxymethyl-ethenyl}-disulphide in 2 ml of previously cooled trifluoroacetic acid is kept for 1 hour at −20°C, then mixed at this temperature within 1 minute with 0.0017 g of 3-chloroperbenzoic acid in 1 ml of tetrahydrofurane and the mixture is stirred for 20 minutes approximately, at −15°C, with a magnetic stirrer. The clear, yellowish solution is distributed in a cooled mixture of ice with 40 ml of methylenechloride and sodium acetate solution (4.42 g of sodium acetate in 40 ml of water). The organic phase is washed with 40 ml of a 1:1-mixture of a saturated aqueous sodium hydrogencarbonate solution and a saturated aqueous sodiumchoride solution, then with 40 ml of a saturated aqueous sodiumchloride solution; the aqueous solutions are washed back with 2 × 30 ml of methylenechloride and the combined organic solutions are dried over sodium sulphate and evaporated.

The residue is dissolved in 1 ml of anhydrous dioxane and 0.02 ml of phenylacetylchloride is added. The mixture is stirred for 2 hours at room temperature, treated with 0.1 ml of water and stirred for 30 minutes at room temperature, then evaporated to dryness under a high vacuum. The residue is dissolved in 20 ml of methylenechloride and the organic solution is washed with 20 ml of a saturated aqueous sodium hydrogencarbonate solution and 20 ml of saturated aqueous sodiumchloride solution; the aqueous solutions are washed back with 20 ml of methylenechloride and the combined organic solutions are dried over sodium sulphate and evaporated. The residue is purified by preparative thin-layer chromatography (silica gel) in the system benzene : ethyl acetate 3:1, whereby the chromatographically pure 3-methoxymethyl-7β-phenylacetylamino-2-thiaceph-3-em-4-carboxylic acid tertiary butyl ester is obtained. Rf = 0.35.

Example 11

A solution of 0.025 g of bis-trans-{trans-1-acetyloxymethyl-2-tertiary butoxycarbonyl-2-(2-tertiary butoxycarbonyl-3,3-dimethyl-7-oxo-2,6-diaza-4-thia-6-bicyclo[3.2.0]heptyl)-ethenyl}-disulphide in 4 ml of previously cooled trifluoroacetic acid is kept for 1 hour at −20°C, then cooled in an ice-methanol bath and within 3 minutes 0.0055 g of 3-chloroperbenzoic acid in 2 ml of tetrahydrofurane is added. The reaction mixture is stirred for 15 minutes at −15°C with a magnetic stirrer. The clear, yellow solution is distributed in a cooled mixture of ice with 50 ml of methylenechloride and 8.84 g of sodium acetate in 50 ml of water. The organic phase is washed with 50 ml of a 1:1-mixture of a saturated aqueous sodium hydrogencarbonate solution and a saturated aqueous sodiumchloride solution, dried over sodium sulphate and evaporated. The residue is dissolved in 5 ml of anhydrous dioxane, 0.04 ml of phenylacetylchloride is added and the reaction mixture is stirred for 2½ hours at room temperature and then mixed with 0.05 ml of water, stirred for 30 minutes at room temperature, the mixture is evaporated to dryness under a high vacuum and the residue is dissolved in 30 ml of methylenechloride. The organic solution is washed once with 30 ml of a saturated aqueous sodium hydrogencarbonate solution and once with 30 ml of a saturated aqueous sodiumchloride solution; the aqueous washings are washed back with 30 ml of methylenechloride and the combined organic solutions are dried over sodium sulphate and evaporated under reduced pressure. The residue is purified by preparative thin-layer chromatography (silica gel; system benzene : ethyl acetate 3:1), to yield as a colourless oil the 3-acetyloxymethyl-7β-phenylacetylamino-2-thiaceph-3-em-4-carboxylic acid tertiary butyl ester of the formula

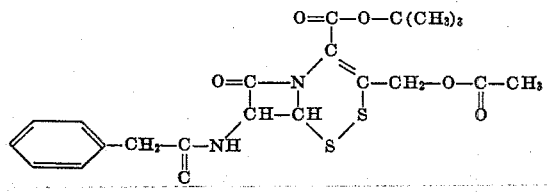

Thin-layer chromatogram (silica gel): Rf = 0.51 (system benzene : ethyl acetate 1:1). Ultraviolet absorption spectrum (in ethanol): $\lambda_{max}$ = 280 mμ and 342 mμ. Infrared absorption spectrum (methylenechloride, about 3%): characteristic bands at 2.97, 3.45, 5.58, 5.75, 5.84, 5.94, 6.30, 6.70 and 7.34μ.

Example 12

A solution of 0.073 g of bis-trans-{trans-1-acetyloxymethyl-2-tertiary butoxycarbonyl-2-(2-tertiary butoxycarbonyl-3,3-dimethyl-7-oxo-2,6-diaza-4-thia-6-bicyclo[3.2.0]heptyl)-ethenyl}-disulphide in 7 ml of previously cooled trifluoroacetic acid is kept for 1 hour at −20°C and then at −10°C mixed dropwise with 0.0147 g of 3-chloroperbenzoic acid (of 88% strength) in 3 ml of tetrahydrofurane, and then 14.7 g of sodium acetate in 100 ml of water and 100 ml of methylenechloride are added. The layers are separated and the organic solution is washed with 100 ml of a 1:1-mixture of a saturated aqueous sodiumchloride solution and a saturated aqueous sodium hydrogencarbonate solution; the aqueous washings are extracted with methylenechloride, the combined organic extracts washed, dried over sodium sulphate and evaporated under vacuum. The residue is dried under a high vacuum and taken up in 2 ml of methylenechloride and 0.025 ml of triethylamine.

0.026 ml of chloroformic acid isobutyl ester in 0.5 ml of tetrahydrofurane is mixed at −10°C with 0.05 g of N-tertiary butoxycarbonyl-D-α-phenylglycine in 1 ml of tetrahydrofurane and 0.028 ml of triethylamine and the resulting mixed anhydride is added in this form to the above solution, and the whole is stirred for 2 hours under nitrogen, then evaporated under reduced pressure. The residue is taken up in 50 ml of methylenechloride and washed with 1 × 30 ml of a saturated aqueous sodium hydrocarbonate solution and 2 × 50 ml of water. The aqueous washings are extracted with methylenechloride and the combined organic solutions dried over sodium sulphate and evaporated. The residues from two identical batches are combined and purified by preparative thin-layer chromatography (silica gel; system toluene : ethyl acetate 1:1), to yield the 3-acetyloxymethyl-7-[N-(N-tertiary butoxycarbonyl-D-α-phenylglycyl)-amino]-2-thiaceph-3-em-4-carboxylic acid tertiary butyl ester of the formula

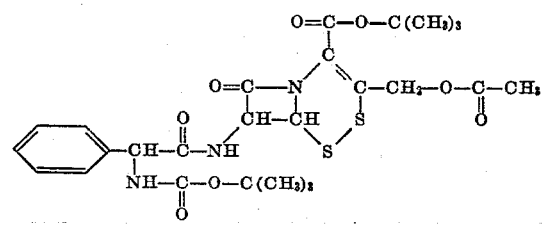

in oily form. Thin-layer chromatogram (silica gel): Rf = 0.40; (system benzene : ethyl acetate 3:1). Ultraviolet absorption spectrum (in ethanol): $\lambda_{max}$ = 275 mμ (ε = 5800) and 335 mμ (ε = 3000). Infrared absorption spectrum (in methylenechloride, about 3%): characteristic bands at 2.97, 3.45, 5.58, 5.75, 5.85, 6.31, 6.73 and 7.33μ.

Example 13

A solution of 0.008 g of 7-(N-phenylacetylamino)-2-thiacepham-4β-carboxylic acid tertiary butyl ester in 0.4 ml of trifluoroacetic acid is kept for 16 hours at 20°C and then evaporated. The residue in 1 ml of toluene is once more evaporated to dryness and yields the 7-(N-phenylacetyl-amino)-2-thiacepham-4β-carboxylic acid of the formula

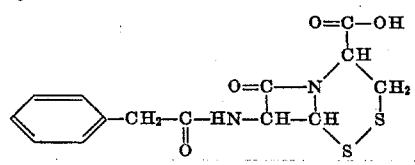

which, after recrystallisation from diethyl ether, melts at 200 – 201°C (analytically pure substance: 211 – 213°C, after recrystallisation from a 1:1-mixture of acetic acid and water). Thin-layer chromatogram (silica gel): Rf = 0.08 (system toluene : acetic acid : water 5:4:1). Infrared absorption spectrum (in potassium bromide): characteristic bands at 3.12, 5.66, 5.84, 6.05 and 6.59μ.

Example 14

A mixture of 0.015 g of 7-(N-phenylacetylamino)-2-thiacepham-4α-carboxylic acid tertiary butyl ester and 2 ml of trifluoroacetic acid is kept for 2½ hours at room temperature and then evaporated. The solid residue is recrystallised from a 1:1-mixture of acetic acid and water, to yield 7-(N-phenylacetylamino)-2-thiacepham-4α-carboxylic acid of the formula

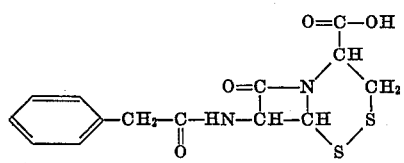

in the form of colourless needles melting at 183 – 186°C. Thin-layer chromatogram (silica gel): Rf = 0.19 (system toluene:acetic acid:water 5:5:1). Infrared absorption spectrum (in potassium bromide): characteristic bands at 3.06, 5.68, 5.74, 6.09, 6.50–6.70 and 6.90μ.

Example 15

A solution of 0.011 g of 7-(N-phenylacetylamino)-2-thiaceph-3-em-4-carboxylic acid tertiary butyl ester in 3 ml of trifluoroacetic acid is kept for 30 minutes at room temperature and then evaporated at this temperature. The residue, in toluene, is twice evaporated to dryness and yields chromatographically pure 7-62 -(N-phenylacetylamino)-2-thiaceph-3-em-4-carboxylic acid of the formula

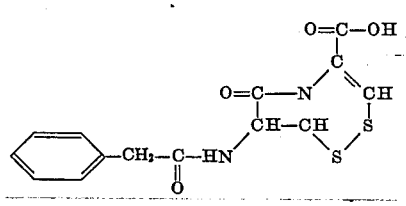

as an amorphous, yellowish powder, Rf = 0.30 (silica gel), system toluene:acetic acid:water 5:5:1. Ultraviolet absorption spectrum: $\lambda_{max}$ = 282 mμ and 342 mμ (in ethanol) and $\lambda_{max}$ = 278 mμ and 335 mμ (on addition of potassium hydroxide). Infrared absorption spectrum (in potassium bromide) characteristic bands at 3.09, 3.31, 5.61, 5.85, 6.02, 6.38, 6.54, 6.70 and 6.90μ.

Example 16

A solution of 0.007 g of 7-(N-cyanoacetylamino)-2-thiaceph-3-em-4-carboxylic acid tertiary butyl ester in 1 ml of trifluoroacetic acid is kept for 35 minutes at room temperature and then evaporated at 20°C. The residue in toluene is twice evaporated to dryness and yields thin-layer chromatographically pure 7-(N-cyanoacetylamino)-2-thiaceph-3-em-4-carboxylic acid of the formula

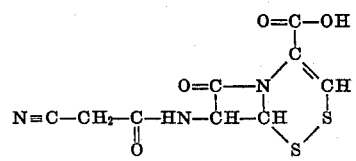

as an amorphous yellowish powder, Rf = 0.09 (silica gel; system toluene:acetic acid:water 5:5:1). Ultraviolet absorption spectrum: $\lambda_{max}$ = 280 mμ and 341 mμ (in ethanol) and $\lambda_{max}$ = 309 mμ (on addition of potassium hydroxide; decomposition). Infrared absorption spectrum (in potassium bromide): characteristic bands at 3.11, 3.32, 4.44, 5.60, 5.87, 6.01, 6.39 and 6.46μ.

Example 17

A solution of 0.0107 g of 3-methyl-7-(N-phenylacetylamino)-2-thiaceph-3-em-4-carboxylic acid tertiary butyl ester in 20 ml of trifluoroacetic acid is kept for 20 minutes at 28°C and then evaporated under vacuum. The residue in benzene is three times evaporated to dryness and recrystallised from a large quantity of peroxide-free diethyl ether, to yield 3-methyl-7-(N-phenylacetyl-amino)-2-thiaceph-3-em-4-carboxylic acid of the formula

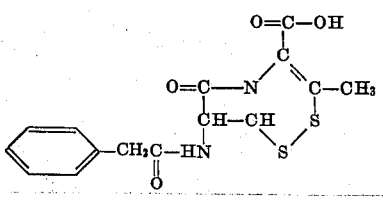

in the form of colourless needles melting at 167 – 168°C with decomposition. Thin-layer chromatogram (silica gel): Rf = 0.31 (system toluene:acetic acid:water 5:5:1). Ultraviolet absorption spectrum: $\lambda_{max}$ = 281 mμ and 335 mμ (in ethanol) and $\lambda_{max}$ = 278 mμ and 330 mμ (shoulder) (on addition of potassium hydroxide). Infrared absorption spectrum (in potassium bromide): characteristic bands at 3.19, 3.33, 5.63 (shoulder), 5.66, 6.03, 6.24, 6.53, 6.70 and 6.90μ.

An analogous treatment of 3-methyl-7-(N-phenyloxyacetyl-amino)-2-thiaceph-3-em-4-carboxylic acid tertiary butyl ester with trifluoroacetic acid leads to 3-methyl-7-(N-phenyloxyacetyl-amino)-2-thiaceph-3-em-4-carboxylic acid.

Example 18

A solution of 0.0100 g of 3-methoxymethyl-7β-phenylacetylamino-2-thia-ceph-3-em-4-carboxylic acid tertiary butyl ester in 2 ml of trifluoroacetic acid is kept for 25 minutes at 23°C. The trifluoroacetic acid is then evaporated under vacuum and the oily residue, both times in 5 ml of absolute benzene, is twice evaporated to dryness. The solid residue is crystallised from 1 ml of a mixture of acetone and benzene, to yield 3-methoxymethyl-7β-phenylacetylamino-2-thiaceph-3-em-4-carboxylic acid of the formula

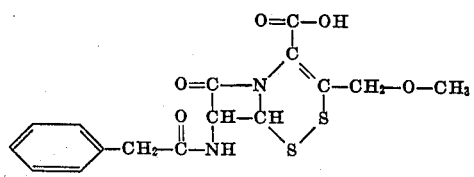

in the form of light-yellow prisms melting at 148 – 150°C with decomposition. Thin-layer chromatogram (silica gel): Rf = 0.15 (system toluene:acetic acid:water 5:5:1). Ultraviolet absorption spectrum (in ethanol): $\lambda_{max}$ = 222 m$\mu$, 270 m$\mu$ (broad) and 340 m$\mu$. Infrared absorption spectrum (in potassium bromide): characteristic bands at 3.08, 3.44, 5.62, 5.82, 6.04, 6.26 and 6.55$\mu$.

Example 19

A solution of 0.011 g of 3-acetyloxymethyl-7$\beta$-phenylacetyl-2-thiaceph-3-em-4-carboxylic acid tertiary butyl ester in 3 ml of trifluoroacetic acid is kept for 35 minutes at room temperature. The trifluoroacetic acid is then removed under vacuum and the oily residue, each time in 5 ml of benzene, is twice evaporated to dryness. The crude product is chromatographed on 5 g of acid-washed silica gel (column) and the 3-acetyloxymethyl-7$\beta$-phenylacetylamino-2-thiaceph-3-em-4-carboxylic acid of the formula

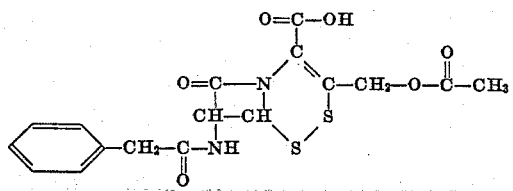

is eluted in a chromatographically pure form with a 2:1-mixture of benzene and acetone. The product crystallises on addition of a few drops of an acetone+benzene mixture and melts at 177 – 180°C. Thin-layer chromatography (silica gel): Rf = 0.15 (system acetic acid:water:toluene 5:1:5). Ultraviolet absorption spectrum (in ethanol): $\lambda_{max}$ = 282 m$\mu$ and 339 m$\mu$. Infrared absorption spectrum (potassium bromide): characteristic bands at 3.08, 3.33, 3.43, 5.61, 5.78, 5.88 (shoulder), 6.05, 6.30 and 6.53$\mu$.

Example 20

A mixture of 0.015 g of 3-acetyloxymethyl-7-[N-(N-tertiary butoxycarbonyl)-D-$\alpha$-phenylglycyl)-amino]-2-thiaceph-3-em-4-carboxylic acid tertiary butyl ester and 2 ml of trifluoroacetic acid is kept for 20 minutes at room temperature and then evaporated under vacuum. The residue is evaporated three times with diethyl ether and and then dissolved in 1 ml of methanol, treated with 0.26 ml of a 1% solution of triethylamine in methanol and left to itself for 1 hour. The resulting crystalline precipitate is the zwitterion of 3-acetyloxymethyl-7-N-(D-$\alpha$-phenylglycyl)-amino-2-thiaceph-3-em-4-carboxylic acid of the formula

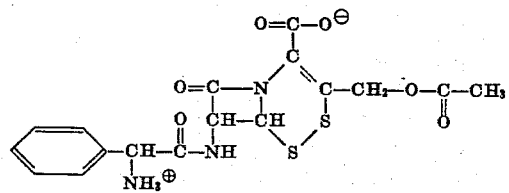

Ultraviolet absorption spectrum (in ethanol): $\lambda_{max}$ = 275m$\mu$ and 384m$\mu$.

Example 21

A solution (34 ml) of 0.1105 g of 3-chloroperbenzoic acid (of 80% strength) in benzene is stirred within 5 minutes at room temperature into a solution of 0.2 g of 7-(N-phenylacetyl-amino)-2-thiacepham-4$\beta$-carboxylic acid tertiary butyl ester in 31 ml of dry benzene drop by drop. After stirring for another 20 minutes 30 ml of benzene are added and the 3-chloroperbenzoic acid is extracted with 90 ml of a saturated aqueous sodium hydrogencarbonate solution. The organic solution is washed with water; the aqueous solutions are washed back with benzene and the organic phases combined, dried over sodium sulphate and evaporated. The residue is crystallised from a mixture of benzene and hexane and yields chromatographically pure 7-(N-phenylacetyl-amino)-2-thiacepham-4$\beta$-carboxylic acid tertiary butyl ester-2-oxide of the formula

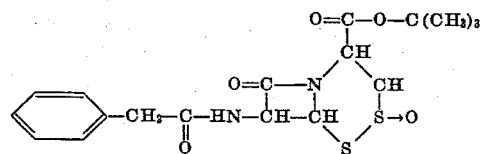

which melts at 191.5 – 193°C. $[\alpha]_D^{20}$ = +421° ± 2° (c = 0.621 in chloroform). Thin-layer chromatogram (silica gel): Rf = 0.23 (system benzene : diethyl ether 2:1). Infrared absorption spectrum (in methylenechloride): characteristic bands at 3.06, 3.40–3.65, 5.63, 5.77, 5.94 and 6.67$\mu$. A further quantity of the product can be isolated from the mother liquor. The oxygen atom in position 2 very probably is of the $\beta$-configuration.

Example 22

A solution of 0.00707 g of 3-chloroperbenzoic acid of 80% strength in 1 ml of benzene is stirred dropwise within 5 minutes into a solution of 0.0095 g of 7-(N-phenylacetylamino)-2-thiaceph-3-em-4-carboxylic acid in 7 ml of anhydrous dioxane at 25°C. The solvents are evaporated and the solid residue twice triturated with small quantities of anhydrous benzene to remove the 3-chloroperbenzoic acid. The residue consists of chromatographically pure 1- or 2-oxide of 7-(N-phenylacetylamino)-2-thiaceph-3-em-4-carboxylic acid of the formula

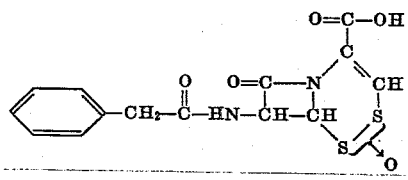

Thin-layer chromatogram (silica gel): Rf = 0.14 (system toluene: acetic acid:water 5:5:1). Ultraviolet absorption spectrum (in dioxane): $\lambda_{max}$ = 275 m$\mu$. Infrared absorption spectrum (in potassium bromide): characteristic bands at 3.08, 3.32, 5.57, 5.84, 6.06, 6.36, 6.53, 6.71 and 6.90$\mu$.

Example 23

While stirring a solution of 0.0166 g of 7-(N-phenylacetyl-amino)-2-thiaceph-3-em-4-carboxylic acid tertiary butyl ester in 9 ml of anhydrous benzene at 25°C it is mixed dropwise within 5 minutes with a solution of 0.00913 g of 3-chloroperbenzoic acid of 80% strength in 10 ml of anhydrous benzene; the reaction is complete immediately after addition of the peracid. The reaction mixture is extracted with 20 ml of an aqueous solution of sodium hydrogencarbonate and washed with 20 ml of water. The aqueous phases are extracted with benzene and the combined organic solutions dried and evaporated. The residue is recrystallised from a mixture of methylenechloride and hexane, and yields the 1- or 2-oxide of 7-(N-phenylacetyl-amino)-2-thiaceph-3-em-4-carboxylic acid tertiary butyl ester of the formula

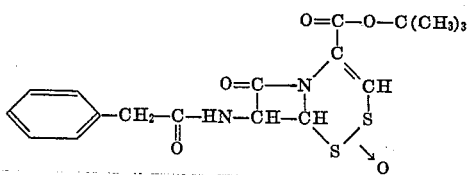

melting at 171 – 173°C. Thin-layer chromatogram (silica gel): Rf = 0.22 (system benzene : diethyl ether 2:1). Ultraviolet absorption spectrum (in ethanol): $\lambda_{max}$ = 285 m$\mu$ (broad). Infrared absorption spectrum (in methylenechloride): characteristic bands at 2.95, 3.25–3.55, 5.52, 5.81, 5.91, 6.29, 6.67 and 6.90 $\mu$.

Example 24

A solution of 0.0176 g of 7-(N-phenylacetyl-amino)2-thiacepham-4$\beta$-carboxylic acid tertiary butyl ester-2-oxide in 2 ml of trifluoroacetic acid is kept for 2 hours at room temperature and then evaporated. The residue is recrystallised from a 1:1-mixture of acetic acid and water and yields 7-(N-phenylacetyl-amino)-2-thiacepham-4$\beta$-carboxylic acid-2-oxide of the formula

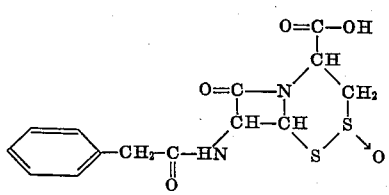

melting at 177 – 179°C. Thin-layer chromatogram (silica gel): Rf = 0.05 (system toluene:acetic acid:washer 5:4:1). Infrared absorption spectrum (in potassium bromide): characteristic bands at 3.07, 5.62, 5.68, 6.06 and 6.50–6.70$\mu$.

The above compounds may also be prepared by treating 7-(N-phenylacetyl-amino)-2-thiacepham-4$\beta$-carboxylic acid with 3-chloroperbenzoic acid in dioxane.

The starting materials used in the above examples may be prepared, for example, as follows Example 25

A solution of 3.8 g of $\alpha$-(3,3-dimethyl-7-oxo-2-tertiary butoxycarbonyl-4-thia-2,6-diaza-6-bicyclo[3.2.0]heptyl)-$\alpha$-triphenylphosphoranylidine-acetic acid tertiary butyl ester in 100 ml of anhydrous toluene is mixed with 3 g of paraformaldehyde and the mixture heated for 1½ hours at 100° under nitrogen and then filtered. The filtrate is evaporated to dryness and the residue triturated with benzene. The benzene solution is poured over 100 g of silica gel and the $\alpha$-methylene-$\alpha$-(3,3-dimethyl-7-oxo-2-tertiary butoxycarbonyl-4-thia-2,6-diaza-6-bicyclo[3.2.0]heptyl)-acetic acid butyl ester of the formula

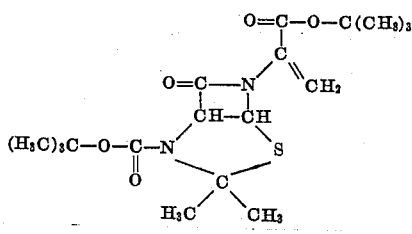

is eluted with 600 ml of a 19:1-mixture of benzene and ethyl acetate. Thin-layer chromatogram (silica gel): Rf = 0.42 (system benzene: ethyl acetate 9:1). Ultraviolet absorption spectrum (in cyclohexane): $\lambda_{max}$ = 261 m$\mu$ ($\epsilon$ = 4540). Infrared absorption spectrum (in methylenechloride): characteristic bands at 5.65, 5.85 and 6.20$\mu$.

Example 26

A mixture of 1 g of $\alpha$-(3,3-dimethyl-7-oxo-2-tertiary butoxycarbonyl-4-thia-2,6-diaza-6-bicyclo[3.2.0]heptyl)-$\alpha$-triphenylphosphoranylidene-acetic acid tertiary butyl ester and 4.0 ml of acetic aldehyde in 10 ml of anhydrous toluene is heated in a closed vessel for 6 hours at 80°C. The solvent is then evaporated and the residue filtered through 50 g of acid-washed silica gel. The whole is washed with 400 ml of benzene and eluted wth a 9:1-mixture of benzene and ethyl acetate, withdrawing fractions of 100 ml of each of the solvent mixture. Fractions 2–4 contain the mixture of the two isomers of the spectroscopically pure $\alpha$-ethylidene-$\alpha$-(3,3-dimethyl-7-oxo-2-tertiary butoxycarbonyl-4-thia-2,6-diaza-6-bicyclo [3.2.0]heptyl)-acetic acid tertiary butyl ester of the formula

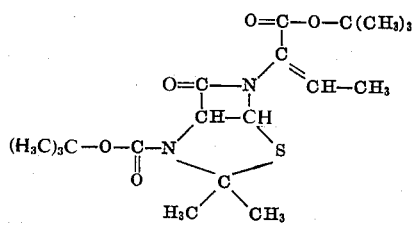

as a colourless oil. Thin-layer chromatogram (silica gel): Rf = 0.59 (system hexane : ethyl acetate 2:1). Ultraviolet absorption spectrum (in ethanol): $\lambda_{max}$ = 255 m$\mu$. Infrared absorption spectrum (in methylenechloride): characteristic bands at 3.34–3.64, 5.68, 5.88 and 6.12$\mu$.

Example 27

A solution of 0.5 g of $\alpha$-(3,3-dimethyl-7-oxo-2-tertiary butoxycarbonyl-4-thia-2,6-diaza-6-bicyclo[3.2.0]hepthyl)-$\alpha$-triphenylphosphoranylidene-acetic acid tertiary butyl ester and 0.5 g of acetyloxyacetaldehyde in 15 ml of anhydrous toluene is heated for 3 hours at 100°C. The solvent is expelled under vacuum and the residue chromatographed on 30 g of acid-washed silica gel, first washing with 100 ml of benzene and then eluting with 140 ml of a 9:1-mixture of benzene and ethyl acetate. The second fraction furnishes the spectroscopically pure mixture of 2 isomers of $\alpha$-(2-acetyloxyethylidene)-$\alpha$-(3,3-dimethyl-7-oxo-2-tertiary butoxycarbonyl-4-thia-2,6-diaza-6- bicyclo[3.2.0]heptyl)-acetic acid tertiary butyl ester of the formula

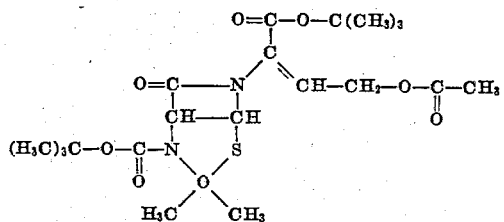

as a colourless oil. Thin-layer chromatogram (silica gel): Rf = 0.51 (system benzene:ethyl acetate 3:1). Ultraviolet absorption spectrum (in ethanol): $\lambda_{max} = 261$ m$\mu$. Infrared absorption spectrum (in methylenechloride): characteristic bands at 3.25–3.60, 5.66, 5.75, 5.85, 6.08, 6.79 and 6.90$\mu$.

Example 28

A solution of 1.38 g of α-(2-tertiary butoxycarbonyl-3,3-dimethyl-7-oxo-2,6-diaza-4-thia-6-bicyclo[3.2.0]heptyl)-α-triphenylphosphoranylidene-acetic acid tertiary butyl ester and 2.85 g of methoxyacetaldehyde in 90 ml of anhydrous toluene is kept for 5 hours at 90°C. The residue (about 3.5g) is chromatographed on a column of 70 g of acid-washed silica gel. The column is washed with 300 ml of benzene and then eluted with 8 portions of 100 ml each of a 19:1-mixture of benzene and ethyl acetate, to yield the spectroscopically pure mixture of 2 isomers of α-(2-tertiary butoxycarbonyl-3,3-dimethyl-7-oxo-2,6-diaza-4-thia-6-bicyclo[3.2.0]heptyl)-α-(2-methoxyethylidene)-acetic acid tertiary butyl ester of the formula

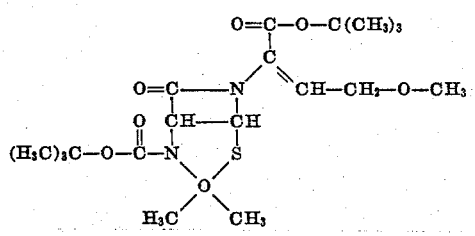

as a colourless oil. Thin-layer chromatogram (silica gel): Rf = 0.42 (system hexane:ethyl acetate 2:1). Ultraviolet absorption spectrum (in ethanol): $\lambda_{max} = 262$ m$\mu$. Infrared absorption spectrum (in methylenechloride): characteristic bands at 3.89, 3.94, 5.67, 5.84 and 6.14$\mu$.

Example 29

A mixture of 0.001 g of a 50% suspension of sodium hydride in mineral oil and 140 ml of tetrahydrofurane is saturated at 0°C with hydrogen sulphide and then mixed with a solution of 0.484 g of α-methylene-α-(3,3-dimethyl-7-oxo-2-tertiary butoxycarbonyl-4-thia-2,6-diaza-6-bicyclo[3.2.0]heptyl)-acetic acid tertiary butyl ester in 10 ml of tetrahydrofurane. The whole is stirred at 0°C; hydrogen sulphide is bubbled through it, checking the progress of the reaction by means of thin-layer chromatography. After 4 hours only traces of the starting material can be identified. Then 0.01g of solid citric acid is added and the solution is cautiously evaporated. The residue is triturated with pentane and the pentane solution is evaporated. 0.4 Gram of the residue is chromatographed on 16 g of acid-washed silica gel, withdrawing 10 ml-fractions of a 29:1-mixture of benzene and ethyl acetate. Fractions 12-17 contain the α-mercaptomethyl-α-(3,3-dimethyl-7-oxo-2-tertiary butoxycarbonyl-4-thia-2,6-diaza-6-bicyclo[3.2.0]heptyl)-acetic acid tertiary butyl ester of the formula

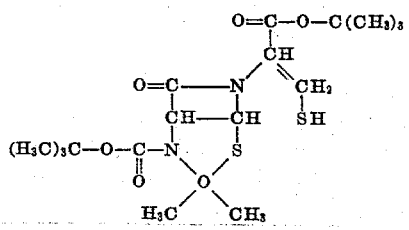

obtained in crystalline form which melts at 68 – 74°C and is extremely easily soluble in pentane. $[\alpha]_D^{20} = -213° \pm 2°$ (c = 0.6 in chloroform). Thin-layer chromatogram (silica gel): Rf = 0.37 (system benzene:ethyl acetate 9:1). Infrared absorption spectrum (in methylenechloride): characteristic bands at 4.36, 5.65, 5.76 and 5.85$\mu$.

Example 30

A solution of 0.64 g of α-methylene-α-(3,3-dimethyl-7-oxo-2-tertiary butoxycarbonyl-4-thia-2,6-diaza-6-bicyclo[3.2.0]heptyl)-acetic acid tertiary butyl ester and 1.46 g of triphenylmethylmercaptan in 5 ml of tetrahydrofurane is cooled to 0°C, mixed with about 0.01 g of sodium hydride and the mixture is stirred for 3 hours at room temperature. The reaction product is distributed between 80 ml of methylenechloride and 80 ml of a saturated aqueous sodium hydrogencarbonate solution. The organic solution is washed with 80 ml of water and the aqueous phase with 80 ml of methylenechloride. The combined organic solutions are dried over sodium sulphate and evaporated. The residue is chromatographed on 100 ml of acid-washed silica gel, the elution being performed with 500 ml of benzene and with 220 ml, then with 320 ml of a 19:1-mixture of benzene and ethyl acetate. The third fraction furnishes the chromatographically pure α-(3,3-dimethyl-7-oxo-2-tertiary butoxycarbonyl-4-thia-2,6-diaza-6-bicyclo[3.2.0]-heptyl-α-triphenylmethylthiomethyl-acetic acid tertiary butyl ester of the formula

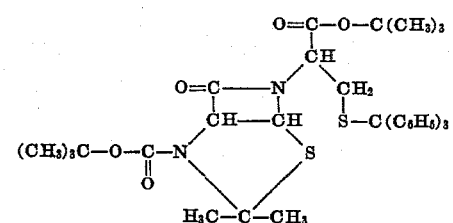

as a 2:3-isomer mixture in the form of a colourless oil. Thin-layer chromatogram (silica gel): Rf = 0.35 (system benzene:ethyl acetate 19:1). Infrared absorption spectrum (in methylenechloride): characteristic bands at 3.40–3.70, 5.69, 5.78–6.00 and 6.30$\mu$.

Example 31

A solution of 1.3 g of α-methylene-α-(3,3-dimethyl-7-oxo-2-tertiary butoxycarbonyl-4-thia-2,6-diaza-6-bicyclo[3.2.0]heptyl)-acetic acid tertiary butyl ester in a mixture of 10 ml of tetrahydrofurane (dried over sodium hydride washed with pentane) and 1.08 g of 2-mercaptoethanol is cooled to −10°C and while being stirred with a magnetic stirrer mixed with 0.002–0.005 g of sodium hydride (washed with pentane). The cooling bath is removed and the mixture stirred on for (3,3-dimethyl-7-oxo-2-tertiary butoxycarbonyl-4-thia-2,6-diaza-6-bicyclo[3.2.0]heptyl)-acetic acid tertiary butyl ester of the formula
10-20 minutes, then filtered, the filter residue is washed with benzene and the filtrate is cautiously evaporated. The residue is distributed between 80 ml of methylenechloride and 80 ml of a saturated aqueous sodium hydrogencarbonate solution. The organic phase is repeatedly washed with water, dried over sodium sulphate and evaporated, to furnish a 6:5-mixture of the two isomers of α-(2-hydroxyethyl-thiomethyl)-α-

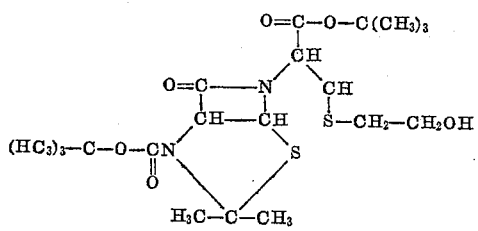

as a colourless oil. Thin-layer chromatogram (silica gel): Rf = 0.23 (system benzene:ethyl acetate 3:1). Infrared absorption spectrum (in methylenechloride): characteristic bands at 2.85–3.15, 3.40–3.70, 5.69 and 5.75–6.00μ.

Example 32

A solution of 1.9 g of α-methylene-α-(3,3-dimethyl-7-oxo-2-tertiary butoxycarbonyl-4-thia-2,6-diaza-6-bicyclo [3.2.0]heptyl)-acetic acid tertiary butyl ester and 1.5 ml of phenacylmercaptan in 10 ml of tetrahydrofurane (which has been dried for several hours over sodium hydride washed with pentane) is cooled to −10°C and while being stirred with a magnetic stirrer mixer with about 0.005 g of sodium hydride washed with pentane. The cooling bath is then removed, the reaction mixture stirred for another 10–20 minutes and then distributed between 300 ml of methlyenechloride and 300 ml of a saturated sodium hydrogencarbonate solution. The organic solution is extracted with 300 ml of water. The aqueous phase is washed back twice with methylenechloride and the combined organic solutions are dried over sodium sulphate and evaporated. The residue is chromatographed on 400 g of acid-washed silica gel. Elution with 600 ml of benzene, then with 2100 ml and with 3600 ml of a 9:1-mixture of benzene and ethyl acetate is carried out and from the 3rd fraction the chromatically pure 1:1-mixture of the isomers of α-(3,3-dimethyl-7-oxo-2-tertiary butoxycarbonyl-4-thia-2,6-diaza-6-bicyclo[3.2.0]heptyl)α-phenacylthiomethyl-acetic acid tertiary butyl ester of the formula

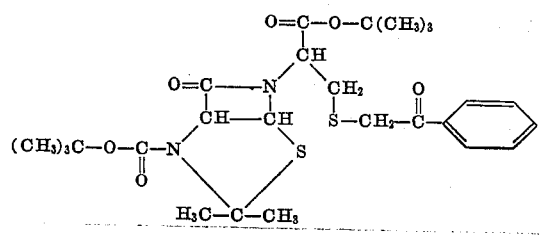

is obtained as a colourless oil. Thin-layer chromatogram (silica gel): Rf=0.20 (system benzene:ethyl acetate 19:1). Ultraviolet spectrum (in ethanol): $\lambda_{max}$ = 246 mμ and 280 mμ. Infrared absorption spectrum (in methylenechloride): characteristic bands at 3.34–3.55, 5.67, 5.74–6.00 and 6.26μ.

Example 33

A solution of 0.55 g of α-ethylidene-α-(3,3-dimethyl-7-oxo-2-tertiary butoxycarbonyl-4-thia-2,6-diaza-6-bicyclo[3.2.0]heptyl)-acetic acid tertiary butyl ester and 0.66 ml of phenacylmercaptan in 3.3 ml of tetrahydrofurane is cooled to −5°C and while being stirred with a magnetic stirrer it is treated with about 0.002 g of sodium hydride. The mixture is stirred for another 20 minutes, then acidified with a few drops of acetic acid (the yellow coloration disappears) and evaporated under reduced pressure. The residue is extracted with benzene, the solution evaporated and the residue chromatographed on 110 g of acid-washed silica gel. Elution is carried out with 160 ml of benzene, then with 600 ml and with 1200 ml of a 19:1-mixture of benzene and ethyl acetate. The third fraction contains the spectroscopically pure mixture of isomers (four isomers) of α-(3,3-dimethyl-7-oxo-2-tertiary butoxycarbonyl-4-thia-2-diaza-6-bicyclo[3.2.0]heptyl)-α-(1-phenacylthio-ethyl)-acetic acid tertiary butyl ester of the formula

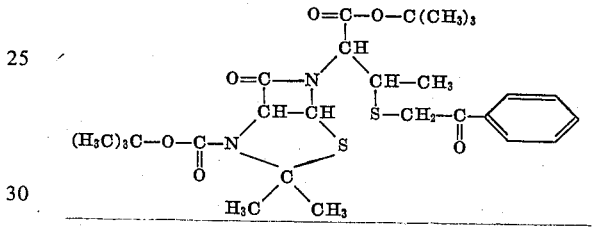

as a colourless oil. Thin-layer chromatogram (silica gel): Rf = 0.22 (system benzene:ethyl acetate 19:1). Ultraviolet absorption spectrum (in ethanol): $\lambda_{max}$ = 247 mμ and 280 mμ (shoulder). Infrared absorption spectrum (in methylenechloride): characteristic bands at 3.28–3.65, 5.67, 5.80, 5.87, 5.93, 6.28, 6.35, 6.81 and 6.94μ.

Example 34

While vigorously stirring a solution cooled to −5°C of 1.4 g of α-(2-acetyloxyethlidene)-α-(3,3-dimethyl-7-oxo-2-tertiary butoxycarbonyl-4-thia-2,6-diaza-6-bicyclo[3.2.0]heptyl)-acetic acid tertiary butyl ester and 1.1 ml of phenacylmercaptan in 7 ml of tetrahydrofurane (dried over sodium hydride) is mixed with about 0.004 g of sodium hydride (washed with pentane), stirred for 12 minutes at −5°C and then treated with 4 drops of acetic acid. The volatile constituents are evaporated under diminished pressure and the residue is chromatographed on 190 g of acid-washed silica gel. The column is washed with 2 litres of a 19:1-mixture of benzene and ethyl acetate and then eluted with a 9:1-mixture of benzene and ethyl acetate, withdrawing fractions of 100 ml each. Fractions 5–16 contain the spectroscopically pure mixture of the isomers of α-(2-acetyloxy-1-phenacylthioethyl)-α-(3,3-dimethyl-7-oxo-2-tertiary butoxycarbonyl-4-thia-2,6-diaza-6-bicyclo[3.2.0]heptyl)-acetic acid tertiary butyl ester of the formula

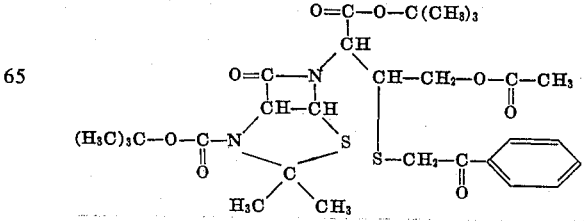

as a colourless oil. Thin-layer chromatogram (silica gel): Rf = 0.12 (system benzene:ethyl acetate 19:1). Ultraviolet absorption spectrum (in ethanol): $\lambda_{max}$ = 247 m$\mu$ and 280 m$\mu$ (shoulder). Infrared absorption spectrum (in methylenechloride): characteristic bands at 3.25–3.60, 5.66, 5.75, 5.90, 6.27, 6.35, 6.79 and 6.92$\mu$. The isomer consists most probably of 4 isomers.

Example 35

A solution of 0.130 g of phenacylmercaptan and 0.950g of $\alpha$-(2-tertiary butoxycarbonyl-3,3-dimethyl-7-oxo-2,6-diaza--thia-6-bicyclo[3.2.0]heptyl)-$\alpha$-(2-methoxyethylidene)-acetic acid tertiary butyl ester in 3 ml of anhydrous tetrahydrofurane is cooled to −10°C. The magnetically stirred, colourless solution is treated with about 0.002 g of sodium hydride washed with pentane; it is stirred for another 15 minutes and acidified with 3 drops of acetic acid, whereupon the yellow coloration disappears. The solvent is expelled under reduced pressure and the residue chromatographed on a column of 60g of acid-washed silica gel. The excess of phenacylmercaptan and some impurities are washed out with 200 ml of benzene and 500 ml of a 19:1-mixture of benzene and ethyl acetate and, using the same solvent mixture, the spectroscopically pure mixture of isomers of $\alpha$-(2-tertiary butoxycarbonyl-3,3-dimethyl--oxo-2,6-diaza-4-thia-6-bicyclo[3.2.0]heptyl)-$\alpha$-(2-methoxy-1-phenacylthio-ethyl)-acetic acid tertiary butyl ester of the formula

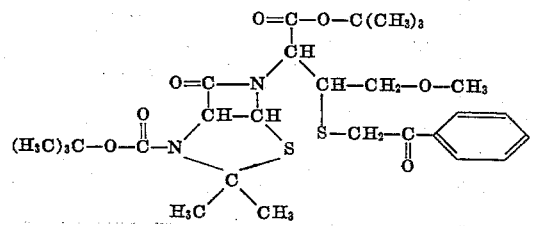

is washed out. Thin-layer chromatogram (silica gel): Rf =0.10 (system benzene:ethyl acetate 19:1). Ultraviolet absorption spectrum (in ethanol): $\lambda_{max}$ = 248 m$\mu$. Infrared absorption spectrum (in methylenechloride, abt. 3%): characteristic bands at 3.89, 3.95, 5.66, 5.79, 5.90, 6.27 and 6.35$\mu$.

Example 36

A solution of 0.186 g of a 3:4-mixture of the isomers of $\alpha$-mercaptomethyl-$\alpha$-(3,3-dimethyl-7-oxo-2-tertiary butoxycarbonyl-4-thia-2,6-diaza-6-bicyclo[3.2.0]heptyl)-acetic acid tertiary butyl ester and 0.130 g of phenacylbromide in 2.5 ml of ethanol is slowly treated at room temperature within 5 minutes with 0.41 ml of a molar aqueous potassium hydroxide solution. The precipitate (potassium bromide, which forms immediately on addition of the potassium hydroxide) is filtered off, the filtrate evaporated and the residue separated by preparative thin-layer chromatography (silica gel; system benzene:ethyl acetate 19:1). The most polar fraction is a 2:5-mixture of the isomers of $\alpha$-(3,3-dimethyl-7-oxo-2-tertiary butoxycarbonyl-4-thia-2,6-diaza-bicyclo[3.2.0]heptyl)-$\alpha$-phenacylmercaptomethyl-acetic acid tertiary butyl ester; the fraction of intermediate polarity consists of impure $\alpha$-methylene-$\alpha$-(3,3-dimethyl-7-oxo-2-tertiary butoxycarbonyl-4-thia-2,6-diaza-bicyclo[3.2.0]heptyl)-acetic acid tertiary butyl ester and the least polar fraction contains excess phenacylbromide.

Example 37

A mixture of 0.032 g of $\alpha$-mercaptomethyl-$\alpha$-(3,3-dimethyl-7-oxo-2-tertiary butoxycarbonyl-4-thia-2,6-diaza-6-bicyclo [3.2.0]heptyl)-acetic acid tertiary butyl ester and 0.5 ml of precooled trifluoroacetic acid is kept for 15 minutes at 0°C and then evaporated at this temperature and under a pressure of 10 mm Hg. The residue is taken up in 1 ml of anhydrous toluene and once more evaporated at 10°C under 10 mm Hg, and then agitated with 10 ml of methylenechloride and 5 ml of an ice-cold 0.5 molar aqueous sodium acetate solution. The organic solution is dried and evaporated and yields as a crystalline residue $\alpha$-mercaptomethyl-$\alpha$-(3,3-dimethyl-7-oxo-4-thia-2,6-diaza-6-bicyclo[3.2.0-]heptyl)-acetic acid tertiary butyl ester of the formula

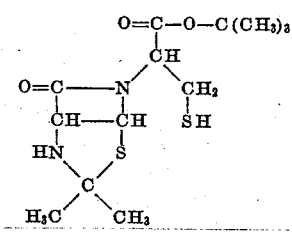

which, after crystallisation and recrystallisation from a mixture of diethyl ether and pentane, melts at 113 – 115°C. $[\alpha]_D^{20}$= −90° ± 2° ($c$ = 0.56 in chloroform). Thin-layer chromatogram (silica gel): Rf = 0.29 (system benzene:ethyl acetate 1:1). Infrared absorption spectrum (in methylenechloride): characteristic bands at 3.06, 5.65 and 5.74$\mu$.

When a solution of 0.035 g of the above starting material in 1 ml of trifluoroacetic acid previously cooled to −20°C is kept for 50 minutes at −20°C and the reaction mixture is distributed, without previous isolation, between 40 ml of methylenechloride and 40 ml of an 0.5 molar aqueous sodium acetate solution, the organic layer is washed with water and the aqueous phases are extracted with methylenechloride, and the organic phase is dried over sodium sulphate and evaporated, the spectroscopically pure $\alpha$-mercaptomethyl-$\alpha$-(3,3-dimethyl-7-oxo-4-thia-2,6-diaza-6-bicyclo[3.2.0]heptyl)-acetic acid tertiary butyl ester is obtained as a 3:4-mixture of two isomers. The quantity of that isomer of which more has been formed can be isolated from the partially crystalline material by crystallisation from a mixture of methylenechloride and pentane at −20°C; it melts at 117 – 119°C.

Example 38

A solution of 1.07 g of $\alpha$-(3,3-dimethyl-7-oxo-2-tertiary butoxycarbonyl-4-thia-2,6-diaza-6-bicyclo[3.2.0]heptyl)-$\alpha$-triphenylmethylthiomethyl-acetic acid tertiary butyl ester (2:3-mixture of two isomers) in 35 ml of trifluoroacetic acid precooled to −20°C is kept for 50 minutes at −20°C. The mixture is distributed between 350 ml of methylenechloride and 350 ml of 2N-aqueous sodium acetate solution, the organic solutions are isolated and washed with 350 ml of an aqueous sodium hydrogencarbonate solution and with 350 ml of water. The aqueous phases are extracted with methylenechloride; the combined organic solutions are dried over sodium sulphate and evaporated. According to the infrared absorption spectrum and the thin-layer chromatogram the residue consists of a mixture of isomers of a α-mercaptomethyl-α-(3,3-dimethyl-7-oxo-4-thia-2,6-diaza -6-bicyclo[3.2.0]heptyl)-acetic acid tertiary butyl ester and of triphenylcarbinol.

Example 39

A solution of 0.05 g of α-(3,3-dimethyl-7-oxo-2-tertiary butoxycarbonyl-4-thia-2,6-diaza-6-bicyclo[3.2.0]heptyl)-α-triphenylmethylthiomethyl-acetic acid tertiary butyl ester in 0.5 ml of trifluoroacetic acid is kept for 15 minutes at 0°C and then evaporated at 0°C under a pressure of 10 mm Hg. The residue is taken up in toluene and once more evaporated to dryness and then agitated with a mixture of an 0.5molar sodium acetate solution and ice. The organic solution is dried and evaporated. The residue contains the α-(3,3-dimethyl-7-oxo--thia-2,6-diaza-6-bicyclo[3.2.0]heptyl)-α-triphenylmethylthiomethyl-acetic acid tertiary butyl ester of the formula

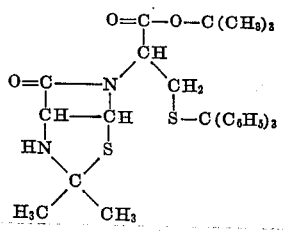

The triphenylmethyl group of which can be identified. Infrared absorption spectrum (in methylenechloride): characteristic bands at 5.71, 5.80 (shoulder), 6.30, 6.70–6.78 and 7.33μ.

Example 40

A solution of 0.137 g of precooled α-(3,3-dimethyl-7-oxo-2-tertiary butoxycarbonyl-4-thia-2,6-diaza-6-bicyclo[3.2.0]heptyl)-α-phenacylthiomethyl-acetic acid tertiary butyl ester in 4.0 ml of trifluoroacetic acid precooled to −15°C is kept for 40 minutes at −15°C and then distributed between 40 ml of methylenechloride and 40 ml of a precooled aqueous solution containing 6.4 g of sodium acetate. The organic solution is extracted with methylenechloride and the aqueous phases are twice washed back with methylenechloride. The combined organic solutions are dried over sodium sulphate and evaporated. The residue consists of a chromatographically pure mixture of the two isomers of α-(3,3-dimethyl-7-oxo-4-thia-2,6-diaza-6-bicyclo[3.2.0]heptyl)-α-phenacylthiomethylacetic acid tertiary butyl ester of the formula

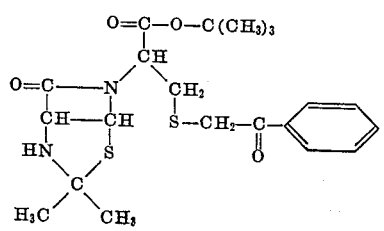

which is obtained as a colourless oil. Thin-layer chromatogram (silica gel): Rf = 0.19 (system benzene:ethyl acetate 3:1). Ultraviolet absorption spectrum (in ethanol): $\lambda_{max}$ = 246 mμ and 280 mμ (shoulder). Infrared absorption spectrum (in methylenechloride): characteristic bands at 3.02, 3.35–3.55, 5.67, 5.77, 5.96 and 6.25μ.

Example 41

A solution of 0.150 g of α-(3,3-dimethyl-7-oxo-2-tertiary butoxycarbonyl-4-thia-2,6-diaza-6-bicyclo[3.2.0]heptyl)-α-(1-phenacylthioethyl)-acetic acid tertiary butyl ester in 4.5 ml of trifluoroacetic acid precooled to −15°C is kept for 45 minutes at −15°C and then distributed between a solution of 9.1 g of sodium acetate in 35 ml of water and 35 ml of methylenechloride. The organic solution is washed with 30 ml of water and the aqueous phases are extracted with 2 × 30 ml of methylenechloride. The combined solutions are dried over sodium sulphate and evaporated and thus yield crude α-(3,3-dimethyl-7-oxo-4-thia-2,6-diaza-6-bicyclo[3.2.0]heptyl)-α-(1-phenacylthioethyl)-acetic acid tertiary butyl ester of the formula

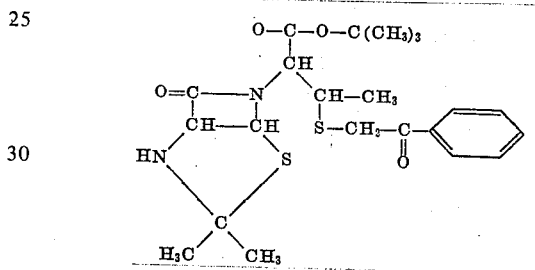

which is further worked up without intermediate purification. Thin-layer chromatogram (silica gel): Rf = 0.17 (system benzene:ethyl acetate 3:2). Ultraviolet absorption spectrum (in ethanol): $\lambda_{max}$ = 247 mμ and 280 mμ (shoulder). Infrared absorption spectrum (in methylenechloride): characteristic bands at 3.05, 3.30–3.65, 5.69, 5.80, 5.97, 6.28, 6.35 and 6.94μ.

Example 42

A solution of 0.270 g of α-(2acetyloxy-1-phenacylthioethyl)-α-(3,3-dimethyl-7-oxo-2-tertiary butoxycarbonyl-4-thia-2,6-diaza-6-bicyclo[3.2.0]heptyl)-acetic acid tertiary butyl ester in 7.40 ml of trifluoroacetic acid precooled to −15°C is kept for 75 minutes at −15°C and then distributed between 80 ml of methylenechloride and 80 ml of an aqueous sodium acetate solution containing 17 g of sodium acetate. The organic solution is washed with 80 ml of water and the aqueous phases are extracted with 2 × 80 ml of methylenechloride. The combined organic solutions are dried over sodium sulphate and evaporated; the residue consists of the crude isomer mixture of α-(2-acetyloxy-1-phenacylthioethyl)-α-(3,3-dimethyl-7-oxo-4-thia-2,6-diaza-6-bicyclo[3.2.0-]heptyl)-acetic acid tertiary butyl ester of the formula

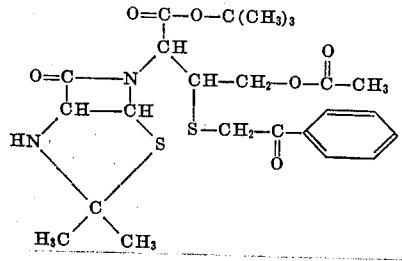

in the form of a colourless oil. Thin-layer chromatogram (silica gel): Rf = 0.08 and 0.13 (system benzene:ethyl acetate 3:1). Ultraviolet absorption spectrum (in ethanol): $\lambda_{max}$ = 250 m$\mu$ and 280 m$\mu$ (shoulder). Infrared absorption spectrum (in methylenechloride): characteristic bands at 3.02, 3.25–3.60, 5.67, 5.75, 5.93, 6.25, 6.32, 6.78 and 6.90$\mu$. The isomer mixture probably consists of 4 isomers.

Example 43

A solution of 0.200 g of α-(2-tertiary butoxycarbonyl-3,3-dimethyl-7-oxo-2,6-diaza-4-thia-6-bicyclo[3.2.0]heptyl)-α-(2-methoxy-1-phenacylthioethyl)-acetic acid tertiary butyl ester in 5 ml of precooled trifuloroacetic acid is kept for 45 minutes at −20°C and then distributed between a cold solution of 11.5 g of sodium acetate in 60 ml of water and 60 ml of methylenechloride. The organic solution is washed with 2 × 60 ml of a 1:1-mixture of an aqueous, saturated sodium chloride solution and a saturated aqueous sodium hydrogencarbonate solution and the aqueous phases are washed back with 2 × 60 ml of methylenechloride. The combined organic solutions are evaporated and yield as a colourless, oily residue a mixture of 4 isomers of α-(3,3-dimethyl-7-oxo-2,6-diaza-4-thia-6-bicyclo[3.2.0]heptyl)-α-(2-methoxy-1-phenacylthioethyl)-acetic acid tertiary butyl ester of the formula

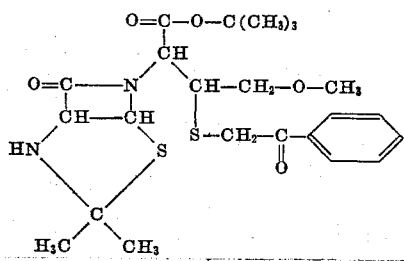

Thin-layer chromatogram (silica gel): Rf = 0.12 (system benzene:ethyl acetate 3:1). Ultraviolet absorption spectrum (in ethanol): $\lambda_{max}$ = 248 m$\mu$ and 2.82 m$\mu$ (shoulder). Infrared absorption spectrum (in methylenechloride; about 3%): characteristic bands at 3.01, 3,42, 5.67, 5.78, 5.96, 6.26, 6.33 and 7.31$\mu$.

Example 44

A solution of 0.77 g of α-(2-hydroxyethyl-thiomethyl)-α-(3,3-dimethyl-7-oxo-2-tertiary butoxycarbonyl-4-thia-2,6-diaza-6-bicyclo[3.2.0]heptyl)-acetic acid tertiary butyl ester in 50 ml of a 1:1-mixture of anhydrous dioxane and tetrahydrofurane is mixed with 1.6 g of "polystyrene-Hunig-base" (obtained by heating a mixture of 100 g of chloromethylpolystyrene [J.Amer.Chem.Soc.85, page 2149 (1963)], 500 ml of benzene, 200 ml of methanol and 100 ml of diisopropylamine to 150°C, agitation, filtering, washing with 1 litre of methanol, 1 litre of a 3:1-mixture of dioxane and triethylamine, 1 litre of methanol, 1 litre of dioxane and 1 litre of methanol and drying for 16 hours at 100°C under a pressure of 10 mm Hg; the product neutralises 1.55 milliequivalent of hydrochloric acid per gram in a 2:1-mixture of dioxane and water). The mixture is stirred for 15 minutes at 20°C, then cooled to 0°C and 0.6 g of thionylchloride in 13.5 ml of a 1:1-mixture of anhydrous dioxane and tetrahydrofurane is stirred in. The cooling bath is then removed and the mixture stirred on for 3 hours. The base is filtered off and rinsed with dioxane; the filtrate is evaporated and dried under a high vacuum and then chromatographed on 170 g of acid-washed silica gel. The column is eluted with a 9:1-mixture of benzene and ethyl acetate, withdrawing fractions of 25 ml each. Fractions 24–40 contain the pure isomer mixture of α-(2-chloroethyl-thiomethyl)-α-(3,3-dimethyl-7-oxo-2-tertiary butoxycarbonyl-4-thia-2,6-diaza-6-bicyclo[3.2.0]heptyl)-acetic acid tertiary butyl ester of the formula

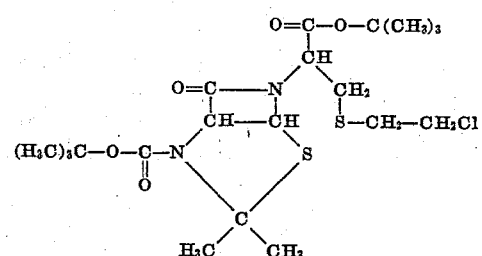

as a colourless oil. Thin-layer chromatogram (silica gel): Rf = 0.23 (system benzene:ethyl acetate 19:1). Infrared absorption spectrum (in methylenechloride): characteristic bands at 3.37–3.66, 5.68 and 5.76–5.98$\mu$.

Example 45

A solution of 0.024 g of α-(2-hydroxyethyl-thiomethyl)-α-(3,3-dimethyl-7-oxo-2-tertiary butoxycarbonyl-4-thia-2,6-diaza-6-bicyclo[3.2.0]heptyl)-acetic acid tertiary butyl ester in 0.5 ml of pyridine is mixed with 0.018 g of methanesulphonylchloride in 0.5 ml of methylenechloride and kept for 2 hours at 50°C. The volatile constituents are evaporated and the residue distributed between methylenechloride and water. The organic phase is dried over sodium sulphate, evaporated and chromatographed on 3.5 g of acid-washed silica gel. The mixture of the isomers of α-(2-chloroethyl-thiomethyl)-α-(3,3-dimethyl-7-oxo-2-tertiary butoxycarbonyl-4-thia-2,6-diaza-6-bicyclo[3.2.0]heptyl)-acetic acid tertiary butyl ester is eluted with a 19:1-mixture of benzene and ethyl acetate.

Example 46

A solution of 1.44 g of α-(2-chloroethyl-thiomethyl)-α-(3,3-dimethyl-7-oxo-2-tertiary butoxycarbonyl-4-thia-2,6-diaza-6-bicyclo[3.2.0]heptyl)-acetic acid tertiary butyl ester and 0.038 g of sodium iodide in 210 ml of acetone is refluxed for 15 hours and then evaporated under nitrogen. Extraction of the solid residue with anhydrous benzene furnishes the isomer mixture of α-(2-iodoethyl-thiomethyl)-α-(3,3-dimethyl-7-oxo-2-tertiary butoxycarbonyl-4-thia-2,6-diaza-6-bicyclo[3.2.0]heptyl)-acetic acid tertiary butyl ester of the formula

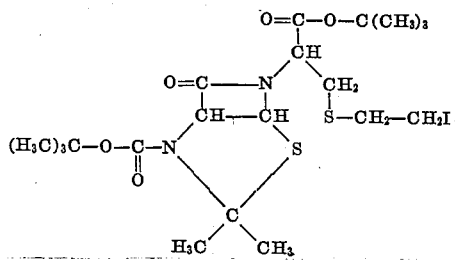

as a yellowish oil. Infrared absorption spectrum (in methylenechloride): characteristic bands at 3.40–3.73, 5.69 and 5.77–5.99μ. Thin-layer chromatogram (silica gel): Rf = 0.23 (system benzene:ethyl acetate 19:1).

Example 47

A solution of 0.053 g of α-(2-iodoethyl-thiomethyl)-α-(3,3-dimethyl-7-oxo-2-tertiary butoxycarbonyl-4-thia-2,6-diaza-6-bicyclo[3.2.0]heptyl)-acetic acid tertiary butyl ester (3:4-mixture of two isomers) in 3 ml of a 9:1-mixture of acetic acid and water is mixed with 0.8 g of zinc dust while being cooled in an ice bath and stirred. The whole is stirred on for 12 minutes at a temperature of 5–10°C and then diluted with 4 ml of benzene and filtered. The filter residue is washed with some benzene and the filtrate distributed between 50 ml of benzene and 50 ml of water. The organic solution is washed with 50 ml of water and the aqueous phases are extracted with 50 ml of benzene. The combined organic solutions are dried over sodium sulphate and evaporated to yield as a colourless oil the spectroscopically pure α-mercaptomethyl-α-(3,3-dimethyl-7-oxo-2-tertiary butoxycarbonyl-4-thia-2,6-diaza-6-bicyclo[3.2.0]heptyl)-acetic acid tertiary butyl ester consistsing of a 3:4-mixture of two isomers.

Example 48

A solution of 0.05 g of α-(2-iodoethylthiomethyl)-α-(3,3-dimethyl-7-oxo-2-tertiary butoxycarbonyl-4-thia-2,6-diaza-6-bicyclo[3.2.0]heptyl)-acetic acid tertiary butyl ester and 0.150 g of triphenylmethylchloride in 2 ml of acetic acid is mixed with 1 g of zinc and the mixture is stirred for 5 minutes at room temperature, filtered, the filtrate is distributed between methylenecloride and water; the organic solution is washed with water and the aqueous phases are washed with methylenechloride, and the combined organic solutions are dried over sodium sulphate and evaporated. The residue is purified by preparative thin-layer chromatography on silica gel and yields the isomer mixture of α-(3,3-dimethyl-7-oxo-2-tertiary butoxycarbonyl-4-thia-2,6-diaza-6-bicyclo[3.2.0]heptyl)-α-triphenylmethylthiomethyl-acetic acid tertiary butyl ester as a colourless oil (spectroscopically pure).

Example 49

A mixture of 0.294 g of α-(2-hydroxyethylthiomethyl)-α-(3,3-dimethyl-7-oxo-2-tertiary butoxycarbonyl-4-thia-2,6-diaza-6-bicyclo[3.2.0]heptyl)-acetic acid tertiary butyl ester and 0.545 g of anhydrous lead tetraacetate in 7 ml of anhydrous benzene is heated within 2 minutes to a temperature of 100° C in a bath preheated to 100°C, and then immediately cooled in an ice-methanol bath. The lead diacetate is filtered off and the organic solution washed with water, dried over sodium sulphate and evaporated. The residue is chromatographed on 160 g of acid-washed silica gel, elution being carried out with a 3:1-mixture and fractions of 100 ml each being withdrawn. Fractions 10–19 furnish a mixture of the four isomers of α-[acetyloxy-(2-hydroxyethylthio-methyl]-α-(3,3-dimethyl-7-oxo-2-tertiary butoxycarbonyl-4-thia-2,6diazo-6bicyclo[3.2.0]heptyl)-acetic acid tertiary butyl ester of the formula

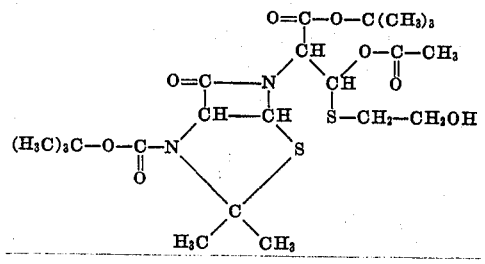

as a colourless oil. Thin-layer chromatogram (silica gel): Rf = 0.18 (system benzene:diethyl ether 2:1). Ultraviolet absorption spectrum (in ethanol): λ$_{max}$ 300 mμ (after addition of triethylamine). Infrared absorption spectrum (in methylenechloride): characteristic bands at 2.80–3.15, 3.35–3.60, 5.68, 5.77 and 5.88μ.

Example 50

A solution of 1 g of the isomer mixture of α-[acetyloxy-(2-hydroxyethylthio)-methyl]-α-(3,3-dimethyl-7-oxo-2-tertiary butoxycarbonyl-4-thia-2,6-diaza-6-bicyclo[3.2.0]heptyl)-acetic acid tertiary butyl ester and 0.5 ml of thionychloride in 15 ml of tetrahydrofurane freshly distilled over lithium aluminium hydride is kept for 7 hours at room temperature. The excess thionylchloride and the solvent are evaporated and the residue chromatographed on 120 g of acid-washed silica gel. The column is eluted with a 19:1-mixture of benzene and ethyl acetate, withdrawing fractions of 100 ml each. Fractions 6–12 contain a mixture of the four isomers of α-[acetyloxy-(2-chloroethylthio)-methyl]-α-(3,3-dimethyl-7-oxo-2-tertiary butoxycarbonyl-4-thia-2,6-diaza-6-bicyclo[3.2.0]heptyl)-acetic acid tertiary butyl ester of the formula

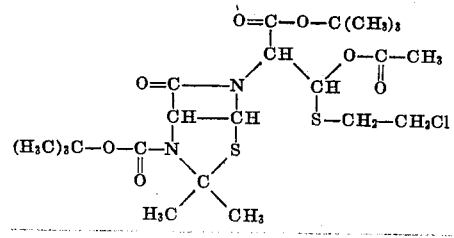

as a colourless oil. Thin-layer chromatogram (silica gel): Rf = 0.15 (system benzene:ethyl acetate 19:1). Infrared absorption spectrum (in methylenechloride): characteristic bands at 3.33-3.58, 5.65, 5.75 and 5.88μ.

Example 51

A solution of 0.330 g of the isomer mixture of α-[acetyloxy-2-chloroethylthio)-methyl]-α-(3,3-dimethyl-7-oxo-2-tertiary butoxycarbonyl-4-thia-2,6-diaza-6-bicylo [3.2.0]heptyl)-acetic acid tertiary butyl ester and 7.2 g of sodium iodide in 40 ml of acetone is refluxed for 7 hour at a bath temperature of 70°C. The solvent is evaporated under nitrogen and the mixture of the four isomers of α-[acetyloxy-(2-iodoethylthio)-methyl]-α-(3,3-dimethyl-7-oxo-2-tertiary butoxycarbonyl-4-thia-2,6-diaza-6-bicyclo[3.2.0]heptyl)-acetic acid tertiary butyl ester of the formula

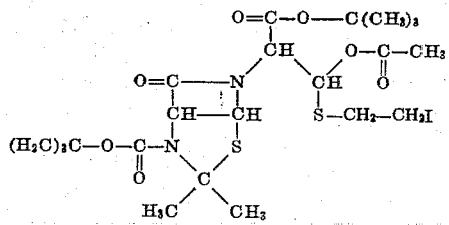

is extracted from the solid residue by trituration with benzene. It forms a yellow oil. Thin-layer chromatogram (silica gel): Rf = 0.20 (system benzene:ethyl acetate 19:1). Infrared absorption spectrum (in methylenechloride): characteristic bands at 3.35–3.60, 5.65, 5.75 and 5.88μ.

Example 52

A solution of 0.123 g of crude α-[acetyloxy-2-hydroxyethylthio)-methyl]-α-(3,3-dimethyl-7-oxo-2-tertiary butoxycarbonyl-4-thia-2,6-diaza-6-bicyclo[3.2.0]heptyl)-acetic acid tertiary butyl ester (containing about 0.045 g of pure product) and 0.1 ml of triethylamine in 15 ml of ethanol of 96% strength is kept for 16 hours at room temperature and then evaporated. The residue is purified by preparative thin-layer chromatography (silica gel; benzene:ethyl acetate 3:1). The fraction with Rf = 0.20 represents the α-(2-hydroxyethyl-thiomethylene)-α-(3,3-dimethyl-7-oxo-2-tertiary tuboxycarbonyl-4-thia-2,6-diaza-6-bicyclo[3.2.0]heptyl)-acetic acid tertiary butyl ester of the formula

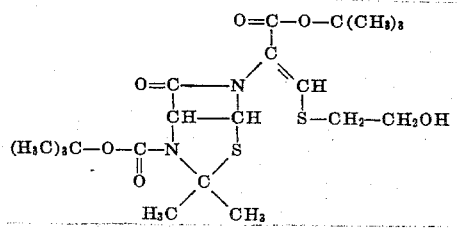

which is obtained as a colourless oil. Ultraviolet absorption spectrum (in ethanol): λ$_{max}$ = 297 mμ. Infrared absorption spectrum (in methylenechloride): characteristic bands at 2.70–3.10, 3.25–3.60, 5.65, 5.86, 6.31, 6.78 and 6.88 μ. The product may be in the form of a mixture of two isomers.

Example 53

A solution of 0.021 g of α-(2-hydroxyethyl-thiomethylene)-α-(3,3-dimethyl-7-oxo-2-tertiary butoxycarbonyl-4-thia-2,6-diaza-6-bicyclo[3.2.0]heptyl)-acetic acid tertiary butyl ester in 2 ml of a 1:1-mixture of anhydrous dioxane and tetrahydrofurane is mixed with 0.044 g of "polystyrene-Hunig-base" and stirred for 15 minutes at 20°C, and then treated with 0.0162 g of thionylchloride in 2 ml of a 1:1-mixture of anhydrous dioxane and tetrahydrofurane. The whole is stirred for 7 hours, the base is filtered off and the filtrate evaporated. The residue is chromatographed on 4 g of acid-washed silica gel, eluting with a 9:1-mixture of benzene and ethyl acetate and fractions of 3 ml each are withdrawn. Fractions 4-6 contain the α-(2-chloroethyl-thiomethylene)-α-(3,3-dimethyl-7-oxo-2-tertiary butoxycarbonyl-4-thia-2,6-diaza-6-bicyclo[3.2.0]heptyl)-acetic acid tertiary butyl ester of the formula

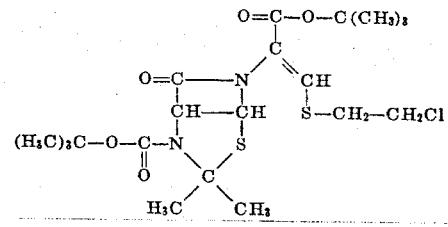

as a colourless oil. Thin-layer chromatogram (silica gel): Rf = 0.23 (system benzene:ethyl acetate 19:1). Infrared absorption spectrum (in methylenechloride): characteristic bands at 3.20–3.55, 5.65, 5.86, 6.30 and 6.78μ. The compound is probably obtained as a mixture of two isomers.

Example 54

A solution of 0.0135 g of α-(2-chloroethyl-thiomethylene)-α-(3,3-dimethyl-7-oxo-2-tertiary butoxycarbonyl-4-thia-2,6-diaza-6-bicyclo[3.2.0]heptyl)-acetic acid tertiary butyl ester and 0.36 g of sodium iodide in 2 ml of acetone is refluxed for 5 hours and then evaporated to dryness under nitrogen. The α-(2-iodoethyl-thiomethylene)-α-(3,3-dimethyl-7-oxo-2-tertiary butoxycarbonyl-4-thia-2,6-diaza-6-bicyclo[3.2.0]heptyl)-acetic acid tertiary butyl ester of the formula

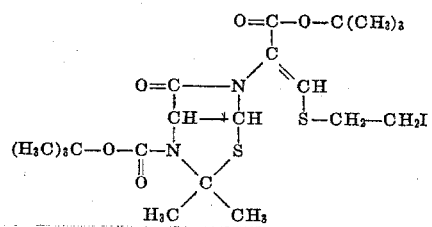

is obtained by extracting the solid residue with benzene. Thin-layer chromatogram (silica gel): Rf = 0.27 (system benzene:ethyl acetate 19:1). Ultraviolet absorption spectrum (in ethanol): λ$_{max}$ = 300 mμ. Infrared absorption spectrum (in methylenechloride): characteristic bands at 3.34–3.60, 5.68, 5.88, 6.31 and 6.78μ.

Example 55

A current of nitrogen is passed for 10 minutes through a solution of 0.299 g of α-(3,3-dimethyl-7-oxo-2-tertiary butoxycarbonyl-4-thia-2,6-diaza-6-bicyclo[3.2.0]heptyl)-α-phenacylthiomethyl-acetic acid tertiary butyl ester and 0.0442 g of pyridine in 100 ml of anhydrous benzene and the mixture is irradiated for 10 minutes at 20°C under nitrogen with a high pressure mercury vapour lamp (70 VA) through a pyrex filter. Immediately after completion of the photolysis, 5.62 ml of an 0.05molar solution of iodine in benzene are dropped in within 2–3 minutes, whereupon a yellowish brown precipitate forms which is filtered off. The filtrate is evaporated and the residue separated by preparative plate chromatography, developing with a 19:1-mixture of benzene and ethyl acetate. The fraction with Rf = 0.24 is the spectroscopically pure bis-[2-(3,3-dimethyl-7-oxo-2-tertiary butoxycarbonyl-4-thia-2,6-diaza-6-bicyclo[3.2.0]heptyl)-2-tertiary butoxycarbonylethyl]-disulphide of the formula

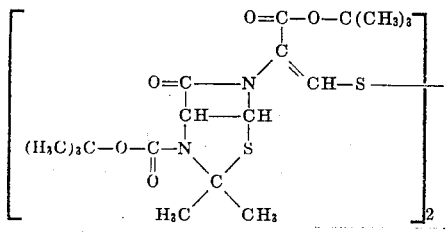

Ultraviolet absorption spectrum (in ethanol): $\lambda_{max}$ = 317 m$\mu$. Infrared absorption spectrum (in methylenechloride): characteristic bands at 3.20–3.55, 5.66, 5.85, 6.31, 6.79 and 6.88 m$\mu$. The product is obtained as a mixture of 3 isomers.

It may be assumed that the above reaction is accompanied by formation of the instable α-(3,3-dimethyl-7-oxo-2-tertiary butoxycarbonyl-4-thia-2,6-diaza-6-bicyclo[3.2.0]heptyl)-α-thioformyl-acetic acid tertiary butyl ester which can be identified as described below when the above reaction is carried out in analogous conditions but in the absence of phyridine: A current of nitrogen is bubbled for 10 minutes through a solution of 0.057 g of α-(3,3-dimethyl-7-oxo-2-tertiary butoxycarbonyl-4-thia-2,6-diaza-6-bicyclo[3,2,0]heptyl)-α-phenacylthiomethyl-acetic acid tertiary butyl ester and 0.0412 g of diphenyldiazomethane in 125 ml of anhydrous benzene and the mixture is then irradiated for 10 minutes at 20°C under nitrogen with a high pressure mercury vapour lamp (70 VA) through a pyrex glass. The reaction mixture is then evaporated and the residue chromatographed on 20 g of acid-washed silica gel. The column is first eluted with 200 ml of benzene, then with a 19:1-mixture of benzene and ethyl acetate, withdrawing fractions of 10 ml each. Fractions 7–9 contain mainly the α-(3,3-dimethyl-7-oxo-2-tertiary butoxycarbonyl-4-thia-2,6-diaza-6-bicyclo[3.2.0]heptyl)-α-(3,3-diphenyl-2-thiacyclopropyl)-acetic acid tertiary butyl ester of the formula

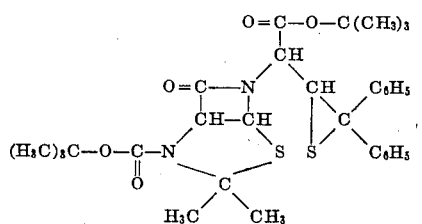

which is purified by preparative plate chromatography (silica gel; system hexane:diethyl ether 7:1; three times) and is obtained as a chromatographically and spectroscopically pure colourless oil in the form of a mixture of 2-isomers; Rf = 0.10. Ultraviolet absorption spectrum (in ethanol): $\lambda_{max}$ = 225 m$\mu$ (shoulder) and 260 m$\mu$ (shoulder). Infrared absorption spectrum (in methylenechloride): characteristic bands at 3.35–3.60, 5.67, 5.80, 5.90 and 6.72$\mu$. The product is a derivative of the instable α-(3,3-dimethyl-7-oxo-2-tertiary butoxycarbonyl-4-thia-2,6-diaza-6-bicyclo[3.2.0]heptyl)-α-thioformyl-acetic acid tertiary butyl ester of the formula

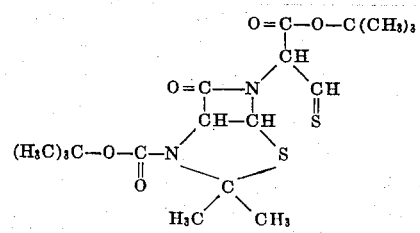

which cannot be obtained in the free form.

Example 56

3 Grams of zinc dust is tipped into a solution of 0.117g of the isomer mixture of bis-{2-(3,3-dimethyl-7-oxo-2-tertiary butoxycarbonyl-4-thia-2,6-diaza-6-bicyclo[3.2.0]heptyl)-2-tertiary butoxycarbonyl-ethyl}-disulphide and 0.117 g of triphenylmethylchloride in 6.5 ml of acetic acid, during which the temperature is kept at 20°C by means of a water bath. The whole is vigorously stirred for 5 minutes at 20°C, then filtered, the filter residue is washed with a little methylenechloride and the filtrate evaporated under a high vacuum. The residue is triturated with methylenechloride, the supernatant solution evaporated and the residue separated by preparative thin-layer chromatography (silica gel; 20 cm plates; three times), developing with a 49:1-mixture of benzene (or toluene) and ethyl acetate. The most polar fraction represents the isomer A of α-(3,3-dimethyl-7-oxo-2-tertiary butoxycarbonyl-4thia-2,6-diaza-6-bicyclo[3.2.0]heptyl)-α-triphenylmethyl-thiomethylene-acetic acid tertiary butyl ester of the formula

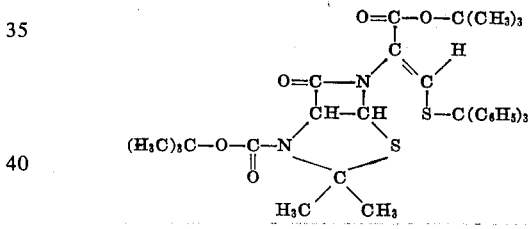

which is obtained as a colourless oil. Thin-layer chromatogram (silica gel): Rf = 0.41 (system benzene:ethyl acetate 19:1). Ultraviolet absorption spectrum (in ethanol): $\lambda_{max}$ = 309 m$\mu$. Infrared absorption spectrum (in methylenechloride): characteristic bands at 3.26-3.60, 5.68, 5.89, 6.33, 6.45, 6.72 and 6.95$\mu$.

The slightly less polar fraction represents the isomer B of α-(3,3-dimethyl-7-oxo-2-tertiary butoxycarbonyl-4-thia-2,6-diaza-6-bicyclo[3.2.0]heptyl)-α-triphenylmethyl-thiomethylene-acetic acid tertiary butyl ester of the formula

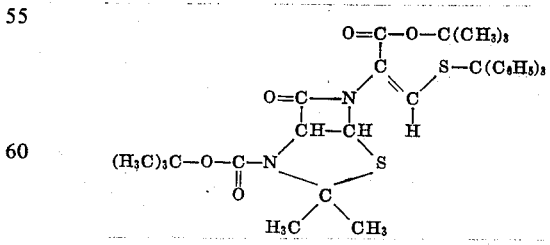

which is likewise obtained in form of a colourless oil. Thin-layer chromatograpm (silica gel): Rf = 0.45 (system benzene: ethyl acetate 19:1). Ultraviolet aborption spectrum (in ethanol): $\lambda_{max}$ = 322 m$\mu$. Infrared absorption spectrum (in methylenechloride): characteristic bands at 3.20–3.50, 5.69, 5.88, 6.27, 6.42, 6.71 and 6.93μ.

Example 57

A solutin cooled to 20°C of 0.103 g of α-[acetyloxy-(2-iodoethylthio)-methyl]-α-(3,3-dimethyl-7-oxo-2-tertiary butoxycarbonyl-4-thia-2,6-diaza-6-bicyclo[3.2.0]heptyl)-acetic acid tertiary butyl ester and 0.3 g of triphenylmethylchloride in 4 ml of acetic acid is mixed with 2 g of zinc dust in one portion and the mixture is vigorously stirred for 9 minutes, during which the temperature is kept at 20°C, and then filtered. The filtrate is distributed between 40 ml of methylenechloride and 40 ml of water; the organic solution is washed with 40 ml of water and the aqueous solutions are washed with 40 ml of methylenechloride. The combined organic solutions are dried over sodium sulphate and evaporated, and the residue is chromatographed on 40 g of acid-washed silica gel, eluting with a 19:1-mixture of benzene and ethyl acetate and withdrawing fractions of 20 ml each. Fractions 1–7 contain mainly triphenylmethylchloride, fractions 8–10 a mixture of products and triphenylcarbinol and fractions 11–20 contain unreacted starting material. Fractions 8–10 are separated in 3 fractions by preparative plate chromatography (silica gel; system benzene:ethyl acetate 19:1): the least polar fraction consists mainly of triphenylcarbinol, whereas the most polar fraction is a mixture of the isomers of α-(3,3-dimethyl-7-oxo-2-tertiary butoxycarbonyl-4-thia-2,6-diaza-6-bicyclo [3.2.0]heptyl)-α-triphenylmethyl-thiomethyl-acetic acid tertiary butyl ester, which has probably not been formed by reduction since the starting material contains a certain share of α-(2-iodoethylthiomethyl)-α-(3,3-dimethyl-7-oxo-2-tertiary butoxycarbonyl-4-thia-2,6-diaza-6-bicyclo[3.2.0]heptyl)-acetic acid tertiary butyl ester. The fraction having the intermiedate polarity consists of α-(3,3-dimethyl-7-oxo-2-tertiary butoxycarbonyl-4-thia-2,6-diaza-6-bicyclo[3.2.0]heptyl)-α-triphenylmethyl-thiomethylene-acetic acid tertiary butyl ester.

Example 58

A mixture of 0.187 g of α-(3,3-dimethyl-7-oxo-2-tertiary butoxycarbonyl-4-thia-2,6-diaza-6-bicyclo[3.2.0]heptyl)-α-phenacylthiomethyl-acetic acid tertiary butyl ester and 0.0276 g of pyridine in 400 ml of benzene is deareated by passing nitrogen through it for 10 minutes and then irradiated for about 10 minutes at 20°C with a high pressure mercury vapour lamp (Hanau Q 400; 120 VA) through a pyrex filter. The reaction mixture, which contains the α-(3,3-dimethyl-7oxo-2-tertiary butoxycarbonyl-4-thia-2,6-diaza-6-bicyclo[3.2.0]heptyl)-α-mercaptomethylene-acetic acid tertiary butyl ester, is treated with 0.08 g of methanesulphonylchloride in 2 ml of benzene and then with 2 ml of anhydrous pyridine, and then concentrated to a volume of about 2 ml under diminished pressure. Another 0.08g of methanesulphonylchloride in 2 ml of anhydrous benzene and then 1 ml of pyridine are added and the whole is kept for one hour at room temperature. The crystalline precipitate is filtered off and the filtrate evaporated to dryness under a high vacuum. The residue is distributed between about 40 ml of methylenechloride and 40 ml of water; the organic solution is washed with 40 ml of water and the aqueous phases are extracted with 40 ml of methylenechloride. The combined extracts are dried over sodium sulphate and evaporated. The residue is purified by preparative thin-layer chromatography (silica gel; system benzene:ethyl acetate 19:1), to yield the bis-trans-{trans-2-(3,3-dimethyl-7-oxo-2-tertiary butoxycarbonyl-4-thia-2,6-diaza-6-bicyclo[3.2.0]heptyl)-2-tertiary butoxycarbonylvinyl}-disulphide of the formula (Rf = 0.21)

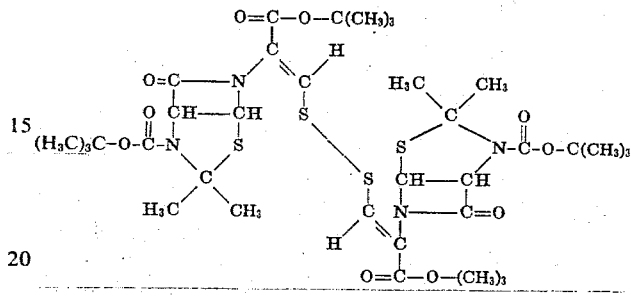

which is recystallised from a mixture of methylenechloride and hexane; it melts at 179 – 180°C. Ultraviolet absorption spectrum (in ethanol): $\lambda_{max}$ = 309 mμ. Infrared absorption spectrum (in methylenechloride): characteristic bands at 3.35–3.67, 5.68, 5.86, 6.33, 6.81 and 6.9μ.

Example 59

A solution, cooled to −10°C and stirred with a magnetic stirrer, of 0.0437 g of bis-trans-{trans-2-(3,3-dimethyl-7-oxo-2-tertiary butoxycarbonyl-4-thia-2,6-diaza-6-bicyclo [3.2.0]heptyl)-2-tertiary butoxycarbonyl-vinyl}-disulphide in 60 ml of anhydrous tetrahydrofurane is treated within 25 minutes dropwise with a solution of 0.0091 g of 3-chloroperbenzoic acid of 80% strength in 50 ml of anhydrous benzene. The solvents are removed under vacuum and the residue distributed between 15 ml of methylenechloride and a mixture of 10 ml of an aqueous phosphate buffer of pH value 7 and 5 ml of a staurated aqueous sodium chloride solution. The organic phase is dried over sodium sulphate and evaporated. The mixture obtained as a residue is purified by preparative thin-layer chromatography (silica gel; system benzene:ethyl acetate 5:1), to yield (rising polarity) starting material, with Rf = 0.25 the S-monoxide of bis-trans-{trans-2-(3,3-dimethyl-7-oxo-2-tertiary butoxycarbonyl-4-thia-2,6-diaza-6-bicyclo[3.2.0]heptyl-2-tertiary butoxycarbonyl-vinyl}-disulphide of the probable formula

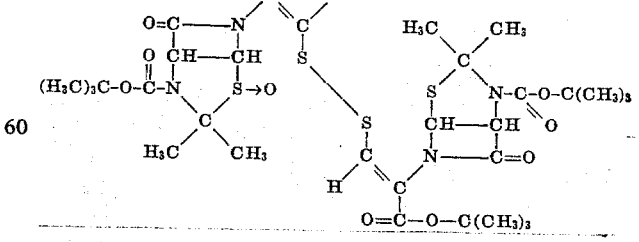

Ultraviolet absorption spectrum (in ethanol): $\lambda_{max}$ = 308 mμ. Infrared absorption spectrum (in methylenechloride): characteristic bands at 3.30–3.65, 5.65, 5.68 (shoulder), 5.87, 6.34 6.81 and 6.91μ; and with Rf =

0.07 the S,S'-diode of bis-trans-{trans-2-(3,3-dimethyl-7-oxo-2-tertiary butoxycarbonyl-4-thia-2,6-diazo-6-bicyclo[3.2.0]heptyl)-2-tertiary butoxylcarbonyl-vinyl}-disulphide having the probable formula

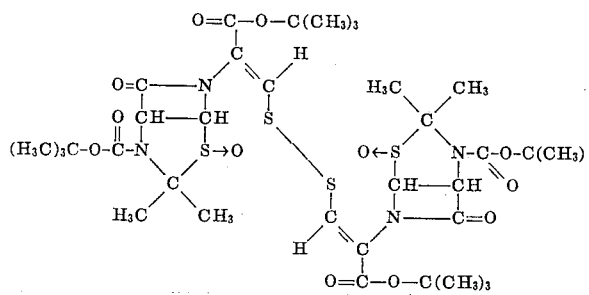

Ultraviolet absorption spectrum (in ethanol): $\lambda_{max}$ = 310 m$\mu$. Infrared absorption spectrum (in methylenechloride): characteristic bands at 3.30–3.65, 5.63, 5.87, 6.33, 6.82 and 6.91$\mu$.

Example 60

Pure nitrogem is bubbled for 10 minutes through a solution of 0.058 g of α-(2-tertiary butoxylcarbonyl-3,3-dimethyl-7-oxo-2,6-diaza-4-thia-6-bicyclo[3.2.0]heptyl)-α-(1-phenacylthio-2-methoxyethyl)-acetic acid tertiary butyl ester in 100 ml of anhydrous benzene then 0.0079 g of pyridine is added and the mixture is irradiated for 14 minutes at 20°C with a high pressure mercury vapour lamp (70 Watt) through a pyrex filter. Immediately after completion of the photolysis 0.023 g of methanesulphonylchloride and 0.4 ml of anhydrous pyridine are added and the whole is concentrated to a volume of about 5 ml under vacuum. Then further 2 equivalents of methanesulphonylchloride (in form of a standard solution in benzene) and 0.13 ml of pyridine are added. The mixture is kept for 1 hour at room temperature and then evaporated to dryness under a high vacuum. The residue is dissolved in 30 ml of methylenechloride and the solution is washed with 2 × 30 ml of water, dried over sodium sulphate and evaporated. The residue is chromatographed on a column of 10 g of acid-washed silica gel, first washing the column with 150 ml of benzene and then eluting it with 100 ml of a 19:1-mixture of benzene and ethyl acetate, to furnish the colourless, oily bis-trans-{trans-2-tertiary butoxycarbonyl-2-(2tertiary butoxycarbonyl-3,3-dimethyl-7-oxo-2,6-diaza-4-thia-6-bicyclo[3.2.0]heptyl)-1-methoxymethylethenyl}-disulphide of the formula

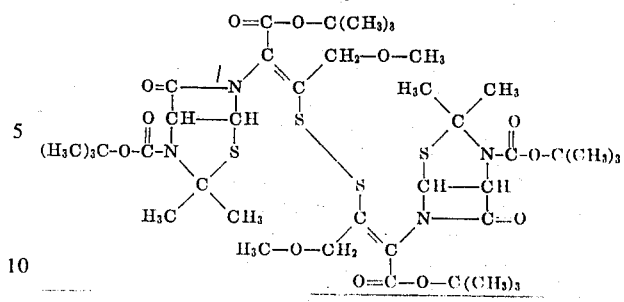

which is combined with the product from another batch and once more purified by preparative thin-layer chromatography (silica gel): Rf = 0.31; system benzene:ethyl acetate 10:1). Ultraviolet absorption spectrum (in ethanol): $\lambda_{max}$ = 260 m$\mu$. Infrared absorption spectrum (in methylenechloride, about 3%): characteristic bands at 3,45, 5.64, 5.82 (shoulder), 5.87, 6.30 and 7.34$\mu$.

Example 61

Pure nitrogen is bubbled for 10 minutes through a solution of 0.350 g of the isomer mixture of α-(2-acetyloxy-1-phenacylthioethyl)-α-(2-tertiary butoxycarbonyl-3,3-dimethyl-7-oxo-2,6-diaza-4-thia-6-bicyclo[3.2.0]heptyl)-acetic acid tertiary butyl ester in 500 ml of anhydrous benzene containing 0.045 g of pyridine. The mixture is then irradiated for 12 minutes at 20°C with a high pressure mercury vapour lamp (120 Watt) through a pyrex filter and immediately thereafter 0.135 g of methanesulphonylchloride and 3 ml of pyridine are added. The reaction mixture is concentrated under reduced pressure to a volume of about 5 ml, treated with 1 ml of pyridine and 0.1 ml of methanesulphonylchloride and then kept for 1 hour under nitrogen. The crystalline precipitate is filtered off and discarded and the filtrate is evaporated under reduced pressure. The residue is dissolved in 40 ml of methylenechloride and the organic solution washed with 2 × 50 ml of water. The aqueous phase is back-extracted with 2 × 50 ml of methylenechloride and the combined organic solutions are dried over sodium sulphate and evaporated. The residue is chromatographed on 40 g of acid-washed silica gel. The column is washed with 400 ml of benzene and 100 ml of a 19:1-mixture of benzene and ethyl acetate to remove acetophenone and eluted with 480 ml of a 19:1-mixture of benzene and ethyl acetate to furnish bis-trans-{trans-1-acetyloxymethyl-2-tertiary butoxycarbonyl-2-(2-tertiary butoxycarbonyl-3,3-dimethyl-7-oxo-2,6-diaza-4-thia-6-bicyclo [3.2.0]heptyl)-ethenyl}-disulphide of the formula

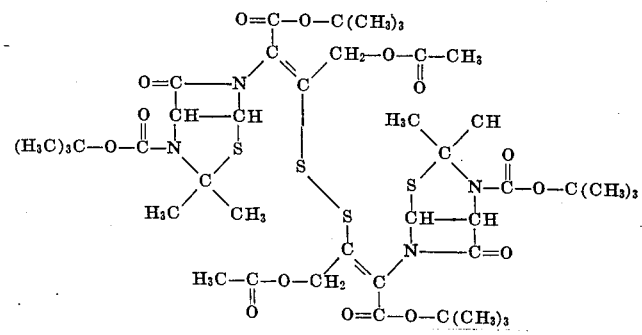

which on crystallisation from hexane is obtained in form of prisms melting at 158 – 159°C. $[\alpha]_D^{20} = -664°$ ± 2° ($c = 0.543$ in chloroform). Thin-layer chromatogram (silica gel): Rf = 0.35 (system benzene:ethyl acetate 9:1). Ultraviolet absorption spectrum (in ethanol): $\lambda_{max} = 257$ m$\mu$ ($\epsilon = 17750$). Infrared absorption spectrum (in methylenechloride; about 3%): characteristic bands at 3.40, 5.60, 5.76, 5.85, 6.29, 6.90 and 7.32$\mu$.

I claim:

1. A member selected from the group consisting of compounds of the formula

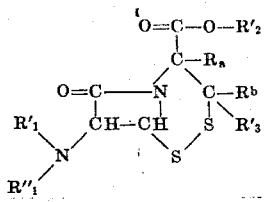

in which $R_a$ and $R_b$ are each hydrogen or $R_a + R_b$ form a covalent carbon-to-carbon bond, $R_1'$ represents hydrogen and $R_1''$ stands for a member selected from the group consisting of cyanoacetyl, bromoacetyl and an acyl group of the formula

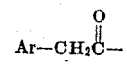

in which Ar represents a member selected from the group consisting of phenyl, 3-hydroxyphenyl, 4-hydroxyphenyl, 3-chloro-4-hydroxyphenyl, 3,5-dichloro-4-hydroxyphenyl and 2-thienyl, $R_2'$, stands for hydrogen, and $R_3'$ represents a member selected from the group consisting of hydrogen and lower alkyl, and pharmacetucally acceptable carboxylic acid salts thereof.

2. A compound as claimed in claim 1 and being a member selected from the group consisting of 7$\beta$-(N-phenylacetylamino)-2-thiaceph-3-em-4-carboxylic acid and pharmaceutically acceptable carboxylic acid salts thereof.

3. A compound as claimed in claim 1 and being a member selected from the group consisting of 7$\beta$-(N-cyanoacetylamino)-2-thiaceph-3-em-4-carboxylic acid and pharmaceutically acceptable carboxylic acid salts thereof.

4. A compound as claimed in claim 1 and being a member selected from the group consisting of 3-methyl-7$\beta$-(N-phenylacetylamino)-2-thiaceph-3-em-4-carboxylic acid and pharmaceutically acceptable carboxylic acid salts thereof.

* * * * *